US011982057B1

(12) United States Patent
Sperling et al.

(10) Patent No.: US 11,982,057 B1
(45) Date of Patent: May 14, 2024

(54) METHOD AND APPARATUS FOR RETRIEVING AND PLACING TIE PLATES

(71) Applicant: Sperling Railway Services, Inc., Canton, OH (US)

(72) Inventors: Fred S. Sperling, Canton, OH (US); Chad H. Sperling, Caton, OH (US)

(73) Assignee: Sperling Railway Services, Inc., Canton, OH (US)

( * ) Notice: Subject to any disclaimer, the term of this patent is extended or adjusted under 35 U.S.C. 154(b) by 785 days.

(21) Appl. No.: 17/100,092

(22) Filed: Nov. 20, 2020

Related U.S. Application Data

(63) Continuation-in-part of application No. 16/169,407, filed on Oct. 24, 2018, now Pat. No. 11,015,298.

(51) Int. Cl.
*E01B 29/32* (2006.01)
*B65G 47/04* (2006.01)
*B65G 47/24* (2006.01)

(52) U.S. Cl.
CPC .............. *E01B 29/32* (2013.01); *B65G 47/04* (2013.01); *B65G 47/24* (2013.01)

(58) Field of Classification Search
CPC .......... E01B 29/32; B65G 47/04; B65G 47/24
See application file for complete search history.

(56) References Cited

U.S. PATENT DOCUMENTS

| | | | | |
|---|---|---|---|---|
| 3,943,858 | A | 3/1976 | Dieringer et al. | |
| 4,241,663 | A | 12/1980 | Lund et al. | |
| 4,691,639 | A | 9/1987 | Holley | |
| 4,942,822 | A | 7/1990 | Cotic | |
| 4,974,518 | A | 12/1990 | Cotic et al. | |
| 5,331,899 | A | 7/1994 | Holley | |
| 8,220,397 | B2 * | 7/2012 | Sperling | E01B 29/32 104/16 |
| 10,077,532 | B2 | 9/2018 | Irion | |
| 2010/0224096 | A1 | 9/2010 | Helmick | |
| 2012/0204752 | A1 | 8/2012 | Helmick | |
| 2013/0247791 | A1 | 9/2013 | Coots | |
| 2019/0153678 | A1 | 5/2019 | Coots | |
| 2019/0382962 | A1 | 12/2019 | Coots | |
| 2020/0131713 | A1 | 4/2020 | Sperling et al. | |
| 2020/0131714 | A1 | 4/2020 | Sperling et al. | |
| 2020/0131715 | A1 | 4/2020 | Sperling et al. | |
| 2020/0141065 | A1 | 5/2020 | Coots | |

* cited by examiner

*Primary Examiner* — Robert J McCarry, Jr.
(74) *Attorney, Agent, or Firm* — Sand, Sebolt & Wernow Co., LPA

(57) ABSTRACT

A method and apparatus for singulating and transferring railroad tie plates is disclosed. The singulating system includes a front chute configured to collect one or more articles, a singulating frame, a pickup assembly operably engaged with the singulating frame, a magnetic roller of the pickup assembly and a roller belt of the pickup assembly wrapped, at least in part, around the magnetic roller. The magnetic roller and the roller belt are configured to pick up the one or more articles from the front chute and transfer the one or more articles to a different location.

20 Claims, 36 Drawing Sheets

METHOD AND APPARATUS FOR RETRIEVING AND PLACING TIE PLATES

CROSS REFERENCE TO RELATED APPLICATIONS

This application is a Continuation-in-part of U.S. patent application Ser. No. 16/169,407 filed Oct. 24, 2018.

BACKGROUND

Technical Field

The present disclosure relates to railroads. More particularly, the present disclosure relates to a machine configured for retrieving railroad tie plates and placing them on a railroad tie. Specifically, the present disclosure relates to a semi-autonomous machine configured to retrieve railroad tie plates and travel down the track to precisely place railroad tie plates on railroad ties.

Background Information

Generally, railroad track systems typically include track ballast, railroad ties, railroad tie plates, and rails. The track ballast, which includes various layers of materials, forms a railroad trackbed upon which the railroad ties are placed. The track ballast typically, amongst other things, bears the load from the railroad ties and allows proper drainage of water from the track.

Generally, railroad ties are typically used to transfer loads to the track ballast, hold the rails upright and keep them spaced to the correct gauge, which is defined as the distance, or width, between inner sides of the rails. Railroad ties are typically elongated rectangular members placed over the track ballast and perpendicular to the rails.

Generally, railroad tie plates are typically used as support for the rails and to maintain the correct gauge between the rails. Railroad tie plates are typically placed over the railroad ties. Railroad tie plates typically include a top surface having an angled outer portion and a pair of angled stops defining a slot that has a base. The railroad tie plates typically further include a plurality of notches located within stops for securing rails to the railroad tie plates. Railroad tie plates typically include a pair of through holes located on the angled outer portion to receive fastening mechanisms, such as spikes or lag screws, to secure the railroad tie plate to the railroad tie. The base of the railroad tie plates is typically angled to one side to permit rails to be angled slightly inward and ensure that railroad wheels are biased slightly inward to keep the railroad wheels on the rails. Railroad tie plates can weigh between approximately twenty and forty pounds and there are typically thousands of railroad tie plates per mile of railroad track.

As stated above, the rails are typically supported by the railroad tie plates by placing the rails within the base of the railroad tie plates. In one example, the rails may typically be operatively engaged with the railroad tie plates with spikes that extend through the notches and the railroad tie plates may typically be operatively engaged with the railroad ties with spikes that extend through the through holes. In another example, spring clips may typically be used to attach the rails to the railroad tie plates and the rail road tie plates may typically be secured to the rail road tie plates using spikes or lag screws. When the spring clip is used, no spike or lag screw contacts the rails.

One of the drawbacks associated with the above-described railroad track systems is the required maintenance associated with the systems. For example, a common required maintenance task is to replace rails after becoming worn and/or unsuitable for continued use. In order to replace the rails, the railroad tie plates need to be removed and replaced once the railroad ties are adjusted.

One of the current methods of installing railroad tie plates on railroad ties is to have a laborer carry the heavy railroad tie plates and lay them on each individual railroad tie. This is a very laborious and costly process inasmuch as the weight of the plates is very heavy and there are thousands of railroad tie plates to be laid. Therefore, it is typically burdensome for a laborer to lift a heavy railroad tie plate and precisely place thousands of railroad tie plates in an efficient and effective manner.

Further, a number of prior machines have been used to locate tie plates on railroad ties using a variety of methods. Some of these methods use magnets to travel over the railroad tie plates resting on the railroad ties after the rail has been removed to pick up the plates and dispose of them accordingly. Still other machines use magnets on a drum to locate the tie plate as the drum rotates during forward movement of the machine. These prior machines utilize a stop-and-go methodology wherein the device stops in order to permit the tie plate to be released during operation.

SUMMARY

A need continues to exist for methods and apparatuses for retrieving and precisely placing railroad tie plates. The methods and apparatuses for retrieving and precisely placing railroad tie plates of the present disclosure addresses the shortcomings of previously known methods and apparatuses for retrieving and precisely placing railroad tie plates.

In one aspect, the present disclosure provides a railroad maintenance machine designed to pick up railroad tie plates located proximate the machine, such as, for example, tie plates located on a shoulder of the railroad track. The machine is configured to precisely place the railroad tie plates in a proper position on the railroad ties in a high production laborer assembly, which is sometimes referred to as a high production rail gang operation. The machine includes a front chassis, a middle chassis, and a rear chassis. The front chassis is connected to the middle chassis via a tow bar and the middle chassis is connected to the rear chassis via a tow bar. The machine is supported by three crawlers on the side where the rail has been removed, while the other side of the machine rides on rail wheels on the rail still in place. The machine includes double flanged guide wheels which act on the rail still in place to prevent the machine from derailing. The front chassis includes a power plant and material handler. The material handler is configured to retrieve the railroad tie plates from the shoulder using a thirty-six inch diameter electro-magnet. The middle chassis includes four hopper assemblies for railroad tie plate storage and transfer. The hopper assemblies are pivotable to pivot and transfer the stored railroad tie plates onto a steel conveyor assembly for further storage and transfer. In one example, the hopper assemblies and conveyor assembly is designed to hold at least 800 railroad tie plates. The middle chassis may further include a cab with a vibrating plate feeder assembly positioned at a downward angle for singulating and properly orienting the railroad tie plates. The rear chassis may act as a labor platform where the railroad tie plates are rotated, oriented, and transferred to a gravity conveyor. More specifically, the vibrating plate feeder may receive the railroad tie plates from the steel conveyor assembly and a laborer may flip the railroad tie plates upright and singulate them. The vibrating plate feeder may the transfer the railroad tie plates onto an inclined conveyor assembly which transfers the railroad tie plates onto a horizontal conveyor. The railroad tie plates may then be properly oriented on a ball transfer table assembly by a laborer standing adjacent to the ball transfer table assembly. The laborer transfers the railroad tie plates from the ball transfer table assembly to the gravity conveyor assembly which slopes vertically downward at an angle. A lower end of the gravity conveyor is supported by a trolley which rides on rollers on the railroad ties and a double flanged wheel on the existing rail. As the gravity conveyor passes over a railroad tie, a trigger releases the railroad tie plate. The machine is operated by three laborers. A first laborer is positioned on the middle chassis flipping and singulating the plates, a second laborer is positioned on the rear chassis aligning plates at the ball transfer table assembly, and a third laborer following the machine to assure all plates are properly in place to be further operatively engaged with the railroad ties and rails. The machine is configured to retrieve and precisely place railroad tie plates for either rail. The machine includes a diesel engine which may power hydraulic pumps and an air compressor. The machine is self-propelled for on track movement at speeds up to twenty-two mph. Seating is provided for two people in the front cab, two people in the middle cab, and one person in the rear cab. Further, a plurality of lift points is provided on each chassis for lifting.

In one aspect, the present disclosure provides positioning a machine for laying tie plates on at least a portion of a railroad track, placing at least one railroad tie plate in a hopper assembly provided on the machine, transferring the at least one railroad tie plate from the hopper assembly to a conveyor assembly provided on the machine, conveying the at least one rail road tie plate to a vibration plate feeder assembly provided on the machine, uprighting the at least one railroad tie plate, conveying the at least one railroad tie plate from the vibration plate feeder assembly to a ball transfer table assembly provided on the machine, orienting the at least one railroad tie plate to a desired orientation with the ball transfer table assembly, conveying the oriented at least one railroad tie plate from the ball transfer table assembly to a tie plate placing mechanism operably coupled to the machine; and placing the oriented at least one railroad tie plate onto a railroad tie of the railroad track with the tie plate placing mechanism. The method includes singulating the at least one railroad tie plate. The singulating is accomplished on the vibration plate feeder assembly.

The method includes vibrating the vibration plate feeder assembly to convey the at least one railroad tie plate from the vibration plate feeder assembly to the conveyor assembly.

The uprighting includes rotating the at least one railroad tie plate about a horizontal axis. The uprighting of the at least one railroad tie plate is accomplished on the vibration plate feeder assembly. The orienting includes rotating the at least one railroad tie plate about a vertical axis such that a gauge side of the at least one railroad tie plate is closer to a central longitudinal axis of the machine than a field side of the at least one railroad tie plate.

The method includes separating debris from the at least one railroad tie plate. The separating is accomplished by the vibration plate feeder assembly.

The method includes deflecting the debris with a material deflector assembly provided on the machine. The method includes dropping the debris from a first elevation on the vibration plate feeder to a second elevation on the material deflector assembly, where the first elevation is higher than the second elevation.

The method includes determining a size of the at least one railroad tie plate, selecting an exit width of the ball transfer table assembly to be substantially the same as a length of the at least one railroad tie plate, where the length is measured from a first side of the at least one railroad tie plate to a second side thereof, and setting the exit width of the ball transfer table assembly to the selected exit width.

The method includes aligning the conveyor assembly with a placement path of the tie plate placing mechanism.

In another aspect, the present disclosure provides a method comprising placing a plurality of railroad tie plates in a hopper assembly of a machine for placing tie plates, progressively transferring the plurality of railroad tie plates from the hopper assembly onto a conveyor assembly provided on the machine, progressively uprighting each of the plurality of railroad tie plates, progressively singulating the plurality of railroad tie plates, progressively orienting the plurality of railroad tie plates, and sequentially placing each of the oriented railroad tie plates onto one of an associated plurality of railroad ties.

The uprighting includes rotating each of the plurality of tie plates about a horizontal axis. The orienting includes rotating each of the plurality of tie plates about a vertical axis such that a gauge side of each of the plurality of tie plates is closer to a central longitudinal axis of the machine than is a field side of each of the plurality of tie plates.

The method includes aligning a field side of each of the plurality of tie plates with an alignment mechanism provided on the machine.

In another aspect, the present disclosure provides a method comprising placing at least one railroad tie plate in a hopper assembly of a machine that lays railroad tie plates, transferring the at least one railroad tie plate from the hopper assembly to a first conveyor assembly provided on the machine, conveying the at least one rail road tie plate from the first conveyor assembly to a vibration plate feeder assembly provided on the machine, conveying the at least one railroad tie plate from the vibration plate feeder assembly to a second conveyor assembly provided on the machine, conveying the at least one railroad tie plate from the second conveyor assembly to a ball transfer table assembly provided on the machine, orienting the at least one railroad tie plate to a desired orientation, transferring the at least one railroad tie plate from the ball transfer table assembly to a third conveyor assembly operably coupled to the machine, conveying the railroad tie from the third conveyor assembly to a tie plate placing mechanism operably coupled to the machine, and placing the railroad tie plate on a railroad tie utilizing the tie plate placing mechanism.

The method includes vibrating the vibration plate feeder assembly to convey the at least one railroad tie plate from the vibration plate feeder assembly to the second conveyor assembly.

In another aspect, the present disclosure provides a machine comprising a machine frame having a first end and a second end defining a longitudinal direction therebetween, a first side and a second side defining a transverse direction therebetween, and a top and a bottom defining a vertical direction therebetween, a plurality of wheels provided on the bottom of the machine frame, at least one hopper assembly operatively engaged with the machine frame proximate the first end, a conveyor assembly operatively engaged with the machine frame positioned downstream from the at least one hopper assembly, a vibration plate feeder assembly operatively engaged with the machine frame positioned downstream from the conveyor assembly, a ball transfer table assembly operatively engaged with the machine frame positioned downstream from the vibration plate feeder assembly, and a tie plate placing mechanism operatively engaged with the machine frame positioned downstream from the ball transfer table assembly and proximate the second end of the machine frame.

The machine further includes a material handler operatively engaged with the machine frame positioned upstream from the at least one hopper assembly. The material handler is adapted to place at least one tie plate in the at least one hopper assembly.

The machine further includes a conveyor support trolley operatively engaged with the machine frame positioned downstream from the ball transfer table assembly and upstream from the tie plate placing mechanism. The conveyor support trolley is adapted to support and align the conveyor assembly.

The machine further includes a material deflector assembly operatively engaged with the machine frame and positioned vertically below the vibration plate feeder assembly.

The machine further includes a waste transfer mechanism operatively engaged with the vibration plate feeder assembly. The material deflector assembly is positioned vertically below the waste transfer mechanism.

In one embodiment, at least a portion of the conveyor assembly is positioned vertically above the vibration plate feeder assembly and at least a portion of the conveyor assembly is longitudinally aligned with the ball transfer table assembly. The conveyor assembly further includes a first conveyor assembly positioned between the at least one hopper assembly and the vibration plate feeder assembly. At least a portion of the first conveyor assembly is positioned vertically above the vibration plate feeder assembly. The conveyor assembly further includes a second conveyor assembly positioned between the vibration plate feeder assembly and the ball transfer table assembly. At least a portion of the second conveyor assembly is positioned vertically below the vibration plate feeder assembly. The conveyor assembly further includes a third conveyor assembly positioned between the ball transfer table assembly and the tie plate placing mechanism.

The machine further includes a first base frame, a second base frame operatively engaged with the first base frame, and a third base frame operatively engaged with the second base frame.

In one embodiment, the at least one hopper assembly is positioned on the second base frame, the vibration plate feeder is positioned on the second base frame, and the ball transfer table assembly is positioned on the third base frame.

The machine frame has a central longitudinal axis extending between the front end of the machine frame and the rear end of the machine frame. At least a portion of the conveyor assembly extends longitudinally along at least a portion of the central longitudinal axis.

In one embodiment, the at least one hopper assembly further includes a first hopper assembly and a second hopper assembly. The first hopper is positioned transversely offset from the central longitudinal axis proximate the first side of the machine frame, the second hopper assembly is positioned transversely offset from the central longitudinal axis proximate the second side of the machine frame, and the first hopper assembly and the second hopper assembly are transversely aligned with each other.

In one embodiment, the at least one hopper assembly further includes a first hopper assembly and a second hopper assembly. The first hopper assembly is positioned transversely offset from the central longitudinal axis proximate the first side of the machine frame, the second hopper assembly is positioned transversely offset from the central longitudinal axis proximate the first side of the machine frame, and the first hopper assembly and the second hopper assembly are longitudinally aligned with each other.

In another aspect, the present disclosure provides a machine comprising a machine frame having a first end and a second end defining a longitudinal direction therebetween, a first side and a second side defining a transverse direction therebetween, and a top and a bottom defining a vertical direction therebetween, a plurality of wheels provided on the bottom of the machine frame, a conveyor assembly mounted on the machine frame and oriented to convey articles in a direction from the first end toward the second end, and at least one hopper assembly mounted on the machine frame upstream of the conveyor assembly. The hopper assembly is adapted to store and transfer at least one railroad tie plate to the conveyor assembly.

The at least one hopper assembly further includes a hopper, the hopper including an inner surface defining at least one compartment adapted to store the at least one railroad tie plate, at least one pivot member; the pivot member having a pivot axis, and at least one translation mechanism. The at least one translation mechanism causes the hopper to pivot about the pivot axis to transfer the at least one railroad tie plate out of the at least one compartment to the conveyor assembly.

The at least one translation mechanism includes a first moveable cylinder and a second moveable cylinder.

The hopper further includes a first side and a second side. The first moveable cylinder is operably connected to the first side and the second moveable cylinder is operably connected to the second side.

The at least one pivot member includes a first pivot member and a second pivot member. The hopper further includes a front surface and the first pivot member and the second pivot member are operably connected to the front surface of the hopper.

The machine further includes a vibration plate feeder assembly mounted on the machine frame and positioned between the at least one hopper assembly and the second end. The vibration plate feeder assembly is adapted to receive and translate railroad tie plates.

The vibration plate feeder assembly includes a vibration plate feeder frame and at least one translation assembly operably engaged with the vibration plate feeder frame. The at least one translation assembly provides translational movement to the vibration plate feeder frame. The at least one translation assembly is a motor. The vibration plate feeder assembly further includes at least one tension assembly operably engaged to the vibration plate feeder frame. The at least one tension assembly restricts movement of the vibration plate feeder frame. The vibration plate feeder assembly further includes a front end, a rear end, and a plate receiving surface operably engaged with the vibration plate feeder frame. The plate receiving surface extends downwardly at an angle from the front end of the vibration plate feeder assembly to the rear end of the vibration plate feeder assembly and relative to the horizontal.

The machine further includes a ball transfer table assembly operably engaged with machine and positioned between the vibration plate feeder assembly and the second end. The ball transfer table assembly is adapted to orient and align at least one railroad tie plate. The ball transfer table assembly further includes a ball mounting plate. The ball transfer table assembly further includes a plurality of transfer mechanisms operably engaged with the ball mounting plate. The plurality of transfer mechanisms are adapted to transfer and orient the at least one railroad tie plate. The plurality of transfer mechanisms is bearings. The plurality of transfer mechanisms is positionable in rows and the rows are substantially transversely aligned.

The machine further includes a conveyor assembly operably engaged to the machine frame and a conveyor support trolley assembly operably engaged with the conveyor assembly adapted to align the conveyor assembly. The conveyor support trolley assembly further includes a trolley frame and a roller assembly operably engaged with the trolley frame, wherein the roller assembly and the trolley frame support the conveyor assembly. The conveyor assembly is operably engaged with the trolley frame vertically above the roller assembly. The trolley frame further includes a moveable support member. The conveyor assembly is operably engaged with the moveable support member. The conveyor support trolley assembly further includes an adjustment assembly operatively engaged with the moveable support member. The adjustment assembly moves the moveable support member in a transverse direction.

In another aspect, the present disclosure provides a method and apparatus for retrieving and placing tie plates. The machine may place at least one railroad tie plate in a hopper assembly for storage and transfer of the at least one railroad tie plate, transfer the at least one railroad tie plate from the hopper assembly to a conveyor assembly, upright the at least one railroad tie plate, singulate the at least one railroad tie plate, orient the at least one railroad tie plate, and place the at least one railroad tie plate on a railroad tie. The term "singulate" is used herein to identify a process that in some manner separates the tie plates from each other such that the tie plates may subsequently be handled as individual components.

In another aspect, the present disclosure provides a singulating system, comprising: a front chute configured to collect one or more articles; a singulating frame; a pickup assembly operably engaged with the singulating frame; a magnetic roller of the pickup assembly; and a roller belt of the pickup assembly wrapped, at least in part, around the magnetic roller; wherein the magnetic roller and the roller belt are configured to pick up the one or more articles from the front chute and transfer the one or more articles to a different location. In one example, the magnetic roller and the roller belt are configured to pick up the one or more articles one at a time. The singulating system may further include a rear chute configured to transfer the one or more articles to the different location. The front chute may further include a plate receiving area, one or more voids defined by the plate receiving area, and one or more rib members provided proximate the one or more voids. The front chute may further include an angled portion and a substantially horizontal portion. The pickup assembly may move in a substantially horizontal rotational movement, a substantially vertical rotational movement, and a substantially horizontal linear movement. In one example, the pickup assembly may be capable of moving in a first movement, a second movement different than the first movement, and a third movement different than the first movement and the second movement. In one example, the one or more articles is one or more railroad tie plates. The singulating system may further include a control configured to control one or more movements of the pickup assembly.

In another aspect, the present disclosure may provide a machine comprising: a machine frame; a first end of the machine frame; a second end of the machine frame; a bottom of the machine frame; a plurality of wheels provided on the bottom of the machine frame; a conveyor assembly mounted on the machine frame and oriented to convey articles in a direction from the first end toward the second end; at least one hopper assembly mounted on the machine frame upstream of the conveyor assembly; the hopper assembly being adapted to store and transfer at least one railroad tie plate to the conveyor assembly; and a singulating system mounted on the machine frame and positioned between the at least one hopper assembly and the second end; the singulating system being adapted to singulate the at least one railroad tie plate.

The machine may further include a front chute of the singulating system configured to collect one or more articles; a singulating frame of the singulating system; a front chute of the singulating system configured to collect one or more articles; a pickup assembly of the singulating system operably engaged with the singulating frame; a magnetic roller of the pickup assembly; and a roller belt of the pickup assembly wrapped, at least in part, around the magnetic roller; wherein the magnetic roller and the roller belt are configured to pick up the at least one railroad tie plate from the front chute and transfer the at least one railroad tie plate to a different location.

In another aspect, the present disclosure may provide a method comprising: collecting, by a front chute, one or more articles; picking up, by a roller belt wrapped, at least in part, around a magnetic roller, the one or more articles from the front chute; and transferring the one or more articles to a different location. The method may further include singulating, by the roller belt wrapped, at least in part, around the magnetic roller, the one or more article from the front chute. In one example, picking up, by the roller belt wrapped, at least in part, around the magnetic roller, is accomplished by picking up the one or more articles one at a time. The method may further include moving the pickup assembly in a substantially horizontal rotational movement, moving the pickup assembly in a substantially vertical rotational movement, and/or moving the pickup assembly in a substantially horizontal linear movement.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element is designed as multiple elements or that multiple elements are designed as one element. In some examples, an element shown as an internal component of another element is implemented as an external component and vice versa. Furthermore, elements may not be drawn to scale.

Similar numbers refer to similar parts throughout the drawings.

DETAILED DESCRIPTION

Referring to FIG. 1-FIG. 19, there is shown a machine for retrieving and precisely placing railroad tie plates, which may also be referred to as tie plates, in accordance with one aspect of the present disclosure, with the machine generally indicated at 10. It will be understood that the attached figures and the following description are not exhaustive and, while describing some components and systems in detail, this disclosure also only identifies other components and systems in passing. With respect to the components that are merely identified in passing, these components are well-known in the art, both with respect to structure and function, and therefore will not be described in detail. Alternatively, the components mentioned in passing may not be directly relevant to the specific apparatus, system, or method being discussed herein. Yet other components that are present on machine 10 may not be identified at all in this disclosure.

Figure 1:
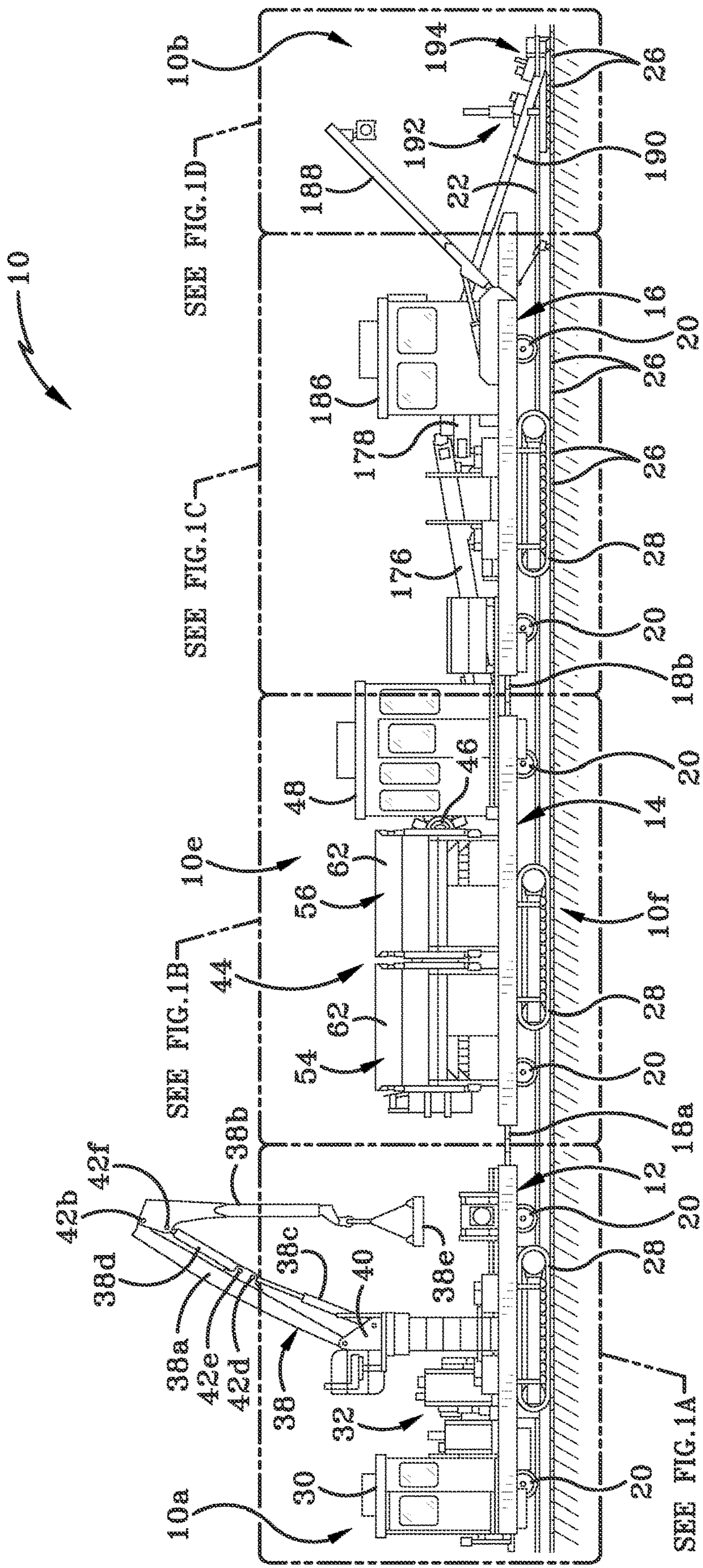
FIG. 1 is a side elevation view of a machine in accordance with one aspect of the present disclosure.

With reference to FIG. 1, machine 10 includes a machine frame 10A having a front end 10*a* and a rear end 10*b* defining a longitudinal direction therebetween, a first side 10*c* and a second side 10*d* defining a transverse direction therebetween, and a top 10*e* and a bottom 10*f* defining a vertical direction therebetween. The machine frame 10A includes a central longitudinal axis X1 extending between the front end 10*a* and the rear end 10*b*.

Figure 1A:
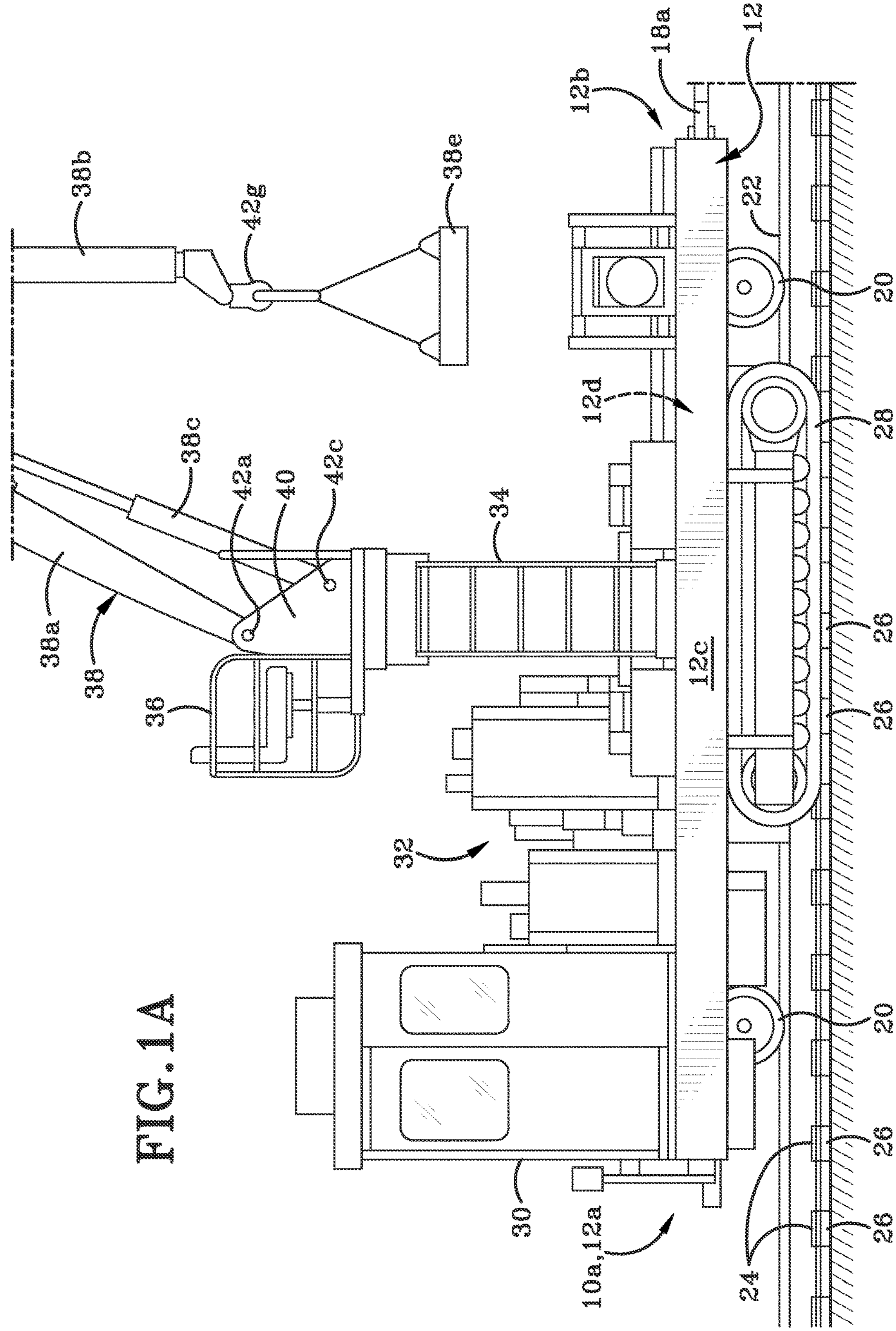
FIG. 1A is an enlarged fragmentary view of a portion of the machine highlighted by the dashed box labeled SEE FIG. 1A.
Figure 1B:
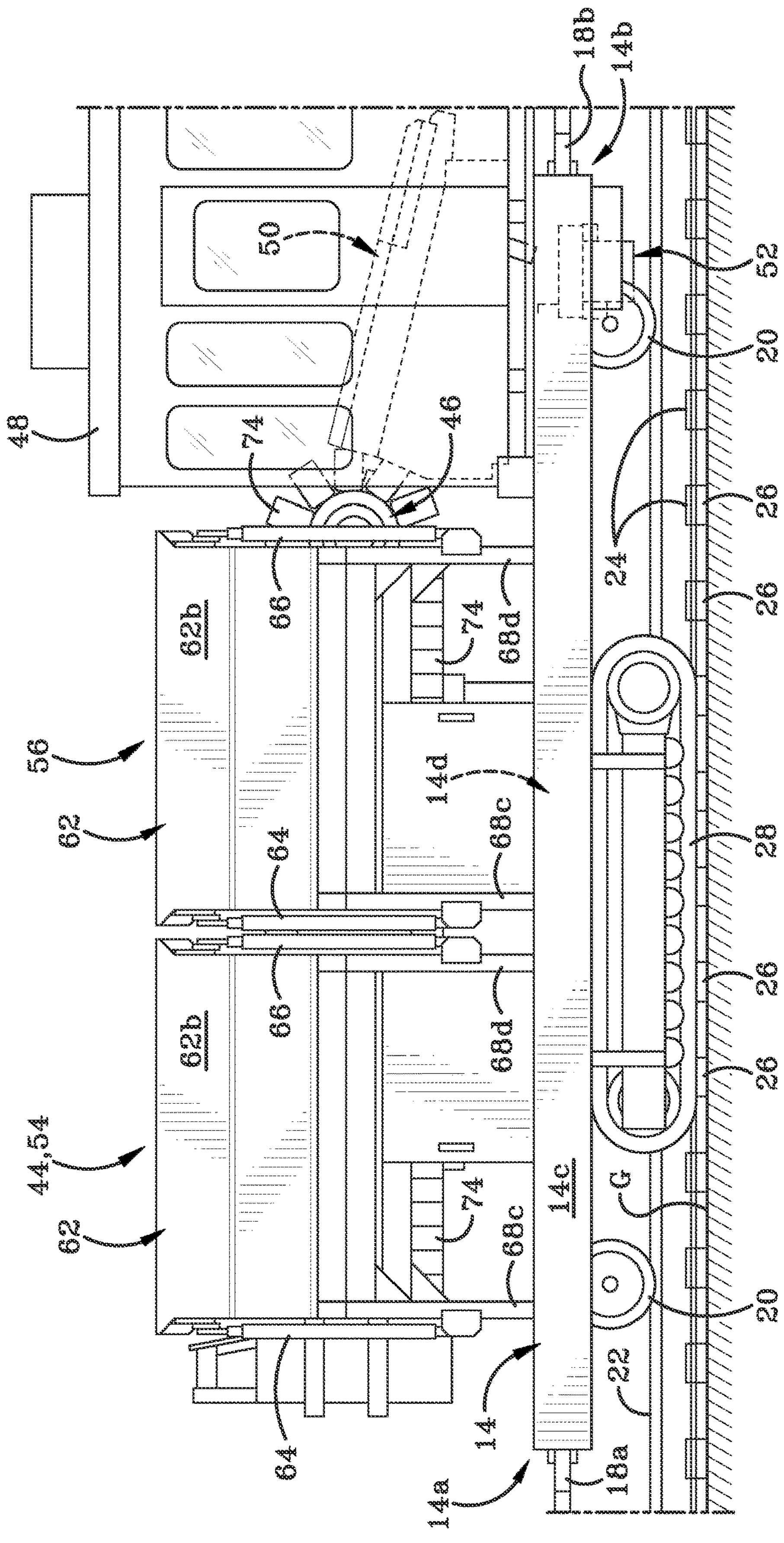
FIG. 1B is an enlarged fragmentary view of a portion of the machine as highlighted by the dashed box labeled SEE FIG. 1B.
Figure 1C:
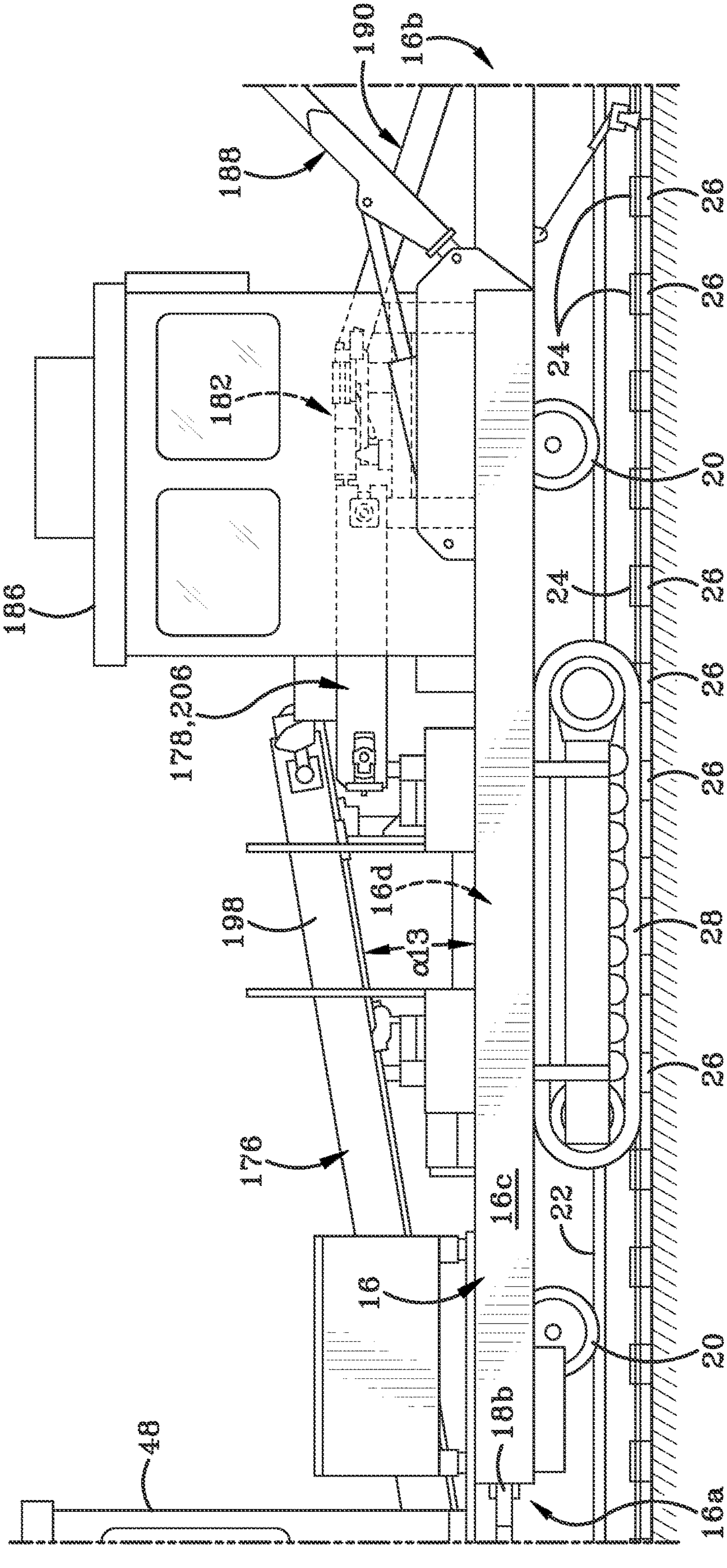
FIG. 1C is an enlarged fragmentary side elevation view of a portion of the machine as highlighted by the dashed box labeled SEE FIG. 1C.

With continued reference to FIGS. 1 to 1C, machine 10 includes a longitudinally extending first base frame 12 having a front end 12*a*, a rear end 12*b*, a first side 12*c*, and a second side 12*d*; a longitudinally extending second base frame 14 including a front end 14*a*, a rear end 14*b*, a first side 14*c*, and a second side 14*d*, and a longitudinally extending third base frame 16 including a front end 16*a*, a rear end 16*b*, a first side 16*c*, and a second side 16*d*.

First base frame 12 is positioned longitudinally forward of second base frame 14, and second base frame 14 is positioned longitudinally forward of third base frame 16. Front end 12*a* of the first base frame 12 is proximate the front end 10*a* of machine 10 and rear end 12*b* of first base frame 12 is connected to the front end 14*a* of second base frame 14 via a first connecting mechanism 18*a*. The first connecting mechanism 18*a* may be any suitable connector, such as a tow bar. The rear end 14*b* of second base frame 14 is connected to the front end 16*a* of third base frame 16 via a second connecting mechanism 18*b*. The second connecting mechanism 18*b* may be any suitable connector, such as a tow bar. The rear end 16*b* of third base frame 16*b* is proximate the rear end 10*b* of machine 10.

Although machine 10 is described as having three separate base frames 12, 14, and 16, connected by first and second connecting mechanisms 18*a*, and 18*b*, it is to be understood that machine 10 may have a singular base frame or any other suitable number of base frames connected in any suitable manner.

With continued reference to FIG. 1, machine 10 includes a plurality of rail-engaging wheels 20 carried by first base frame 12, second base frame 14, and third base frame 16. The wheels 20 may be disposed along the first side 10*c* and the second side 10*d* of machine 10. The wheels 20 are selectively adapted to engage rails 22 that rest on tie plates 24 and railroad ties 26, as is well known in the art.

With continued reference to FIG. 1, machine 10 includes a plurality of crawlers 28 carried by first base frame 12, second base frame 14, and third base frame 16 along the first side 10*c* and the second side 10*d* of machine 10. The crawlers 28 is selectively adapted to engage railroad ties 26, or the ground "G" proximate rail road ties 26, where tie plates 24 and rail 22 have been removed as is well known in the art.

In one embodiment, machine 10 is configured to retrieve and precisely place tie plates 24 on either side of rails 22, depending on which rail 22 is removed. For example and with reference to FIG. 1A, machine 10 is configured to place tie plates 24 along the first side 10*c* of machine 10 where the rail has been removed. Therefore, in this embodiment, the wheels 20 is configured to engage the rail 22 while the crawlers 28 is configured to travel over the railroad ties 26 or proximate the railroad ties 26 where the rail has been removed. In the event the other rail 22 was removed, the wheels 20 and crawlers 28 would function in a substantially identical manner on opposite sides (i.e., the crawlers would be lowered on the second side 10*d* of machine 10 and the wheels 20 would engage the rail on the first side 10*c* of machine 10).

Machine 10 may further include double flanged guide wheels (not shown) carried by first base frame 12, second base frame 14, and third base frame 16, in addition to other portions or components of machine 10. The guide wheels are adapted to engage rails 22 to prevent machine 10 from derailing.

With reference to FIG. 1 and FIG. 1A, first base frame 12 includes a first cab 30, a power assembly 32, a first control assembly (not shown), a support member 34, an operator chair 36, and a material handler 38. In one embodiment, the cab 30 is positioned near front end 12*a* of first base frame 12. Although not shown, cab 30 may house various components, valves, and controls for controlling various operations of machine 10. These operations include, but are not limited to, the speed of travel of machine 10, various conveyors of the machine, and hydraulic or pneumatic cylinders of machine 10. Some of these operations and systems are more fully described below. Within the first cab 30, an operator can manipulate the various controls, valves, etc., of machine 10.

Power assembly 32 is positioned longitudinally rearward of the first cab 30 and longitudinally forward of support member 34. Power assembly 32 provides power where required for various operations of machine 10. For example, power assembly 32 provides power to an engine (not shown) of machine 10 as well as to various hydraulic and/or pneumatic cylinders of machine 10.

Support member 34 is positioned approximately midway between front end 12*a* and rear end 12*b* of first base frame 12. The operator chair 36 may include a mount 40 for operably connecting material handler 38 to the operator chair 36. The operator chair 36 may be pivotally connected to a top surface 34*a* of support member 34 and is adapted to pivotably move about support member 34 so that an operator can rotate material handler 38 about support member 34 through 360 degrees of movement.

Material handler 38 is operable via hydraulics or other mechanisms to transfer tie plates 24 from the ground "G" or from other locations to a desired location as more fully described below. In one example, material handler 38 includes a first member 38*a*, a second member 38*b*, a first moveable cylinder 38*c*, a second moveable cylinder 38*d*, and a transfer mechanism 38*e*. In one example, the components of material handler 38 are connected to one another via connecting mechanisms 42, such as pins, as further described below.

As shown in FIGS. 1 and 1A, the first member 38*a* is connected on one end to mount 40 via connecting mechanism 42*a* and on the other end to the second member 38*b* via connecting mechanism 42*b*. The first cylinder 38*c* is connected on one end to mount 40 via connecting mechanism 42*c* and on the other end to the first member 38*a* via connecting mechanism 42*d*. The second cylinder 38*d* is connected on one end to the first member 38*a* via connecting mechanism 42*e* and on the other end to the second member 38*b* via connecting mechanism 42*f*. The transfer mechanism 38*e* is connected to the second member 38*b* via connecting mechanism 42*g*.

In one embodiment, the first cylinder 38*c* and the second cylinder 38*d* are hydraulic cylinders adapted to provide pivotal movement of material handler 38. Although the first cylinder 38*c* and the second cylinder 38*d* have been described as being hydraulic cylinders, the first and second cylinder 38*c*, 38*d*, are any suitable moveable cylinders such as pneumatic or electric linear actuators. In one embodiment, the transfer mechanism 38*e* is a thirty-six inch electromagnet; however, the electromagnet may be any suitable size. Although the transfer mechanism 38*e* has been described as an electromagnet, it is to be understood that the transfer mechanism 38*e* may be any suitable transfer mechanism.

With primary reference to FIG. 1 and FIG. 1B, second base frame 14 includes at least one hopper assembly 44, a first conveyor assembly 46, which may also be referred to as a plate conveyor assembly, a second cab 48, a second control assembly (not shown), a vibration plate feeder assembly 50, and a material deflector assembly 52.

In one particular embodiment, the at least one hopper assembly 44 includes a first hopper assembly 54, a second hopper assembly 56, a third hopper assembly 58, and a fourth hopper assembly 60. First hopper assembly 54 and the second hopper assembly 56 are longitudinally aligned, positioned proximate the first side 14*c* of second base frame 14, and offset from the longitudinal axis X1. First hopper assembly 54 is positioned longitudinally forward of the second hopper assembly 56. The third hopper assembly 58 and the fourth hopper assembly 60 are longitudinally aligned, positioned proximate the second side 14*c* of second base frame 14, and offset from the longitudinal axis X1. The third hopper assembly 58 is positioned longitudinally forward of the fourth hopper assembly 60.

First hopper assembly 54, the second hopper assembly 56, the third hopper assembly 58, and the fourth hopper assembly 60 are substantially identical to one another, and, therefore, only first hopper assembly 54 will be further described herein but it should be understood that the description applies equally to all of the other hopper assemblies 56, 58, 60.

Figure 3:
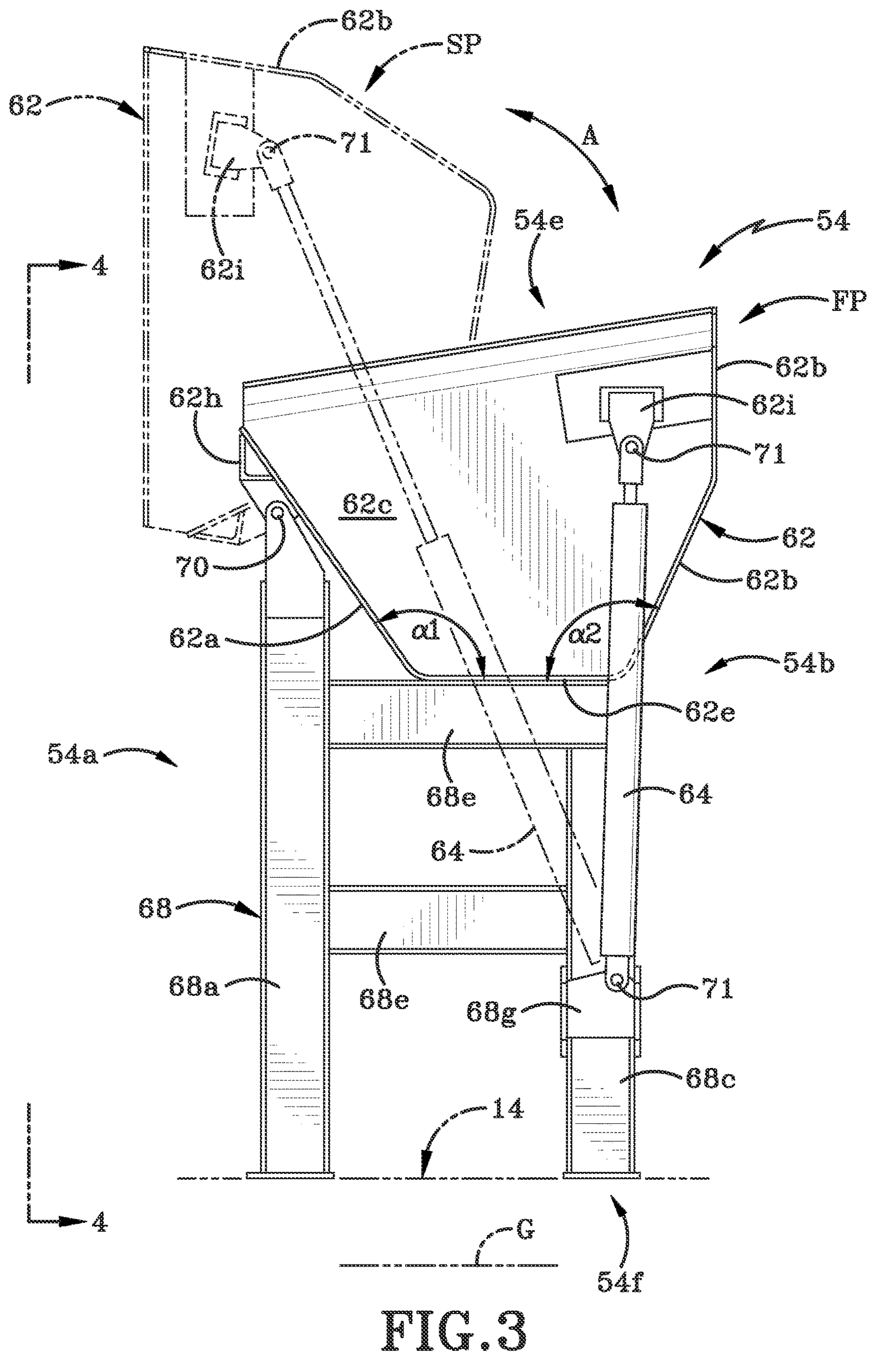
FIG. 3 is a rear elevation view of a hopper assembly taken along line 3-3 of FIG. 2.
Figure 4:
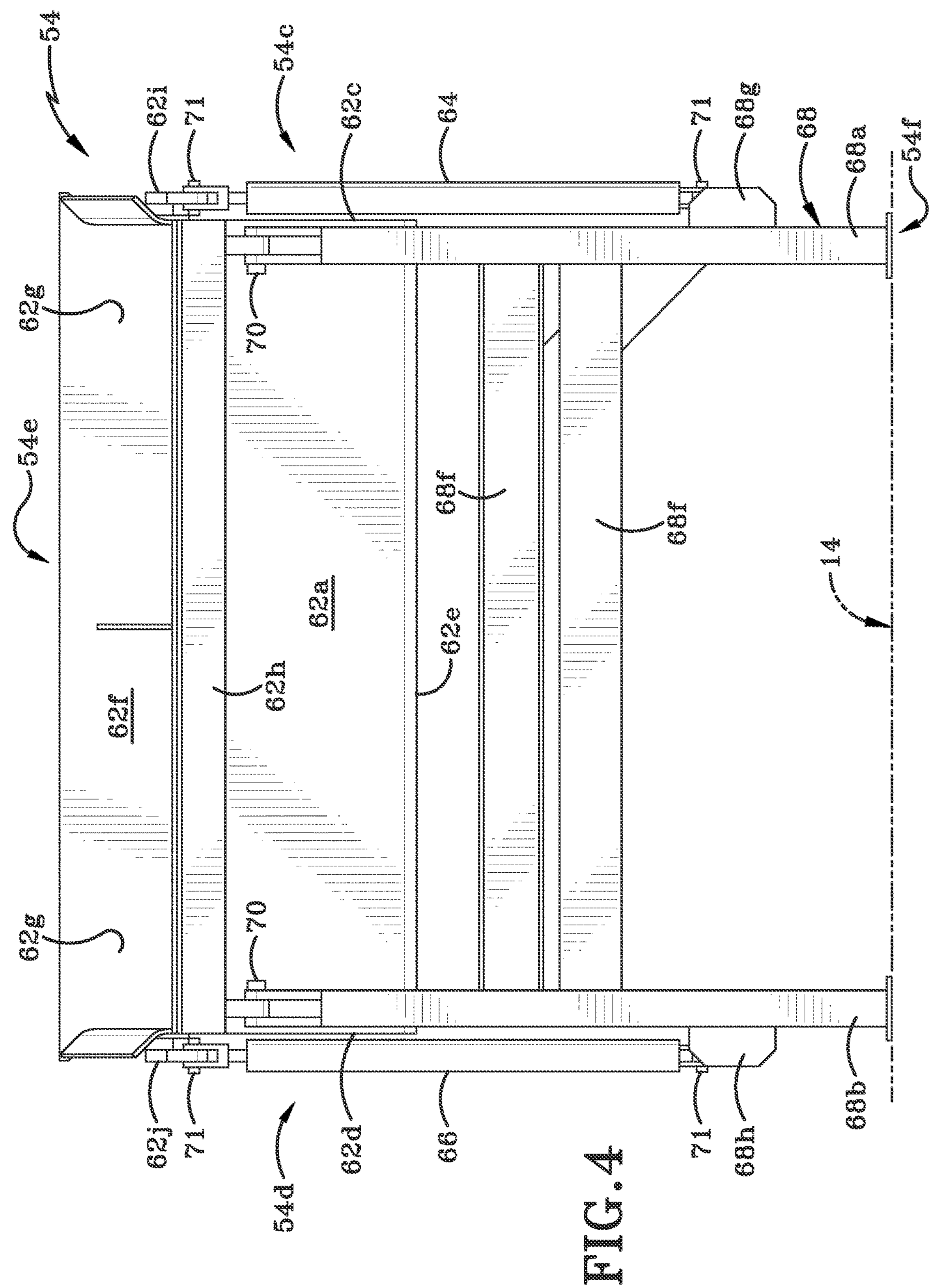
FIG. 4 is an elevation view taken along line 4-4 of FIG. 3.
Figure 5:
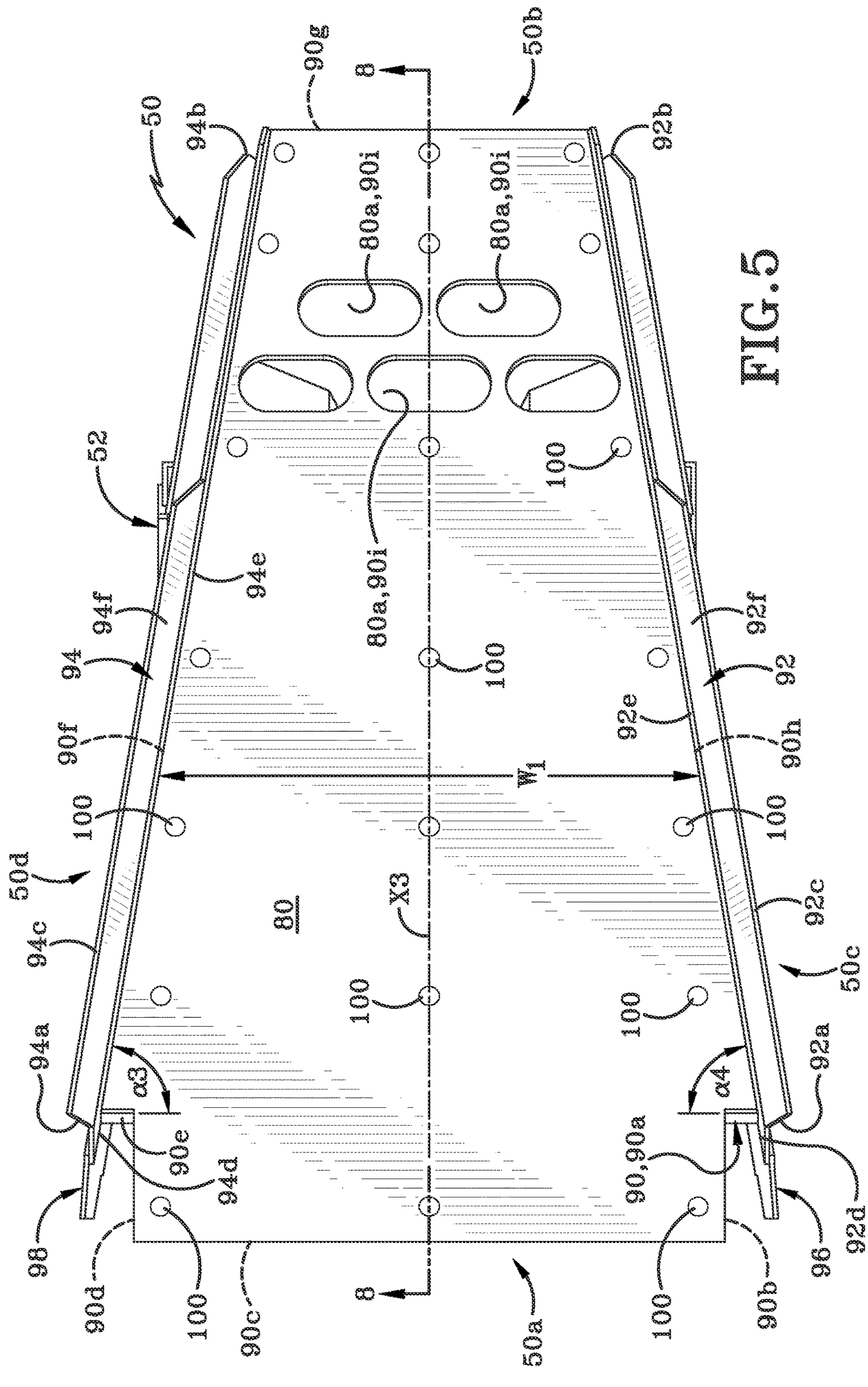
FIG. 5 is a top view of a vibration plate feeder assembly in accordance with one aspect of the present disclosure.
Figure 6:
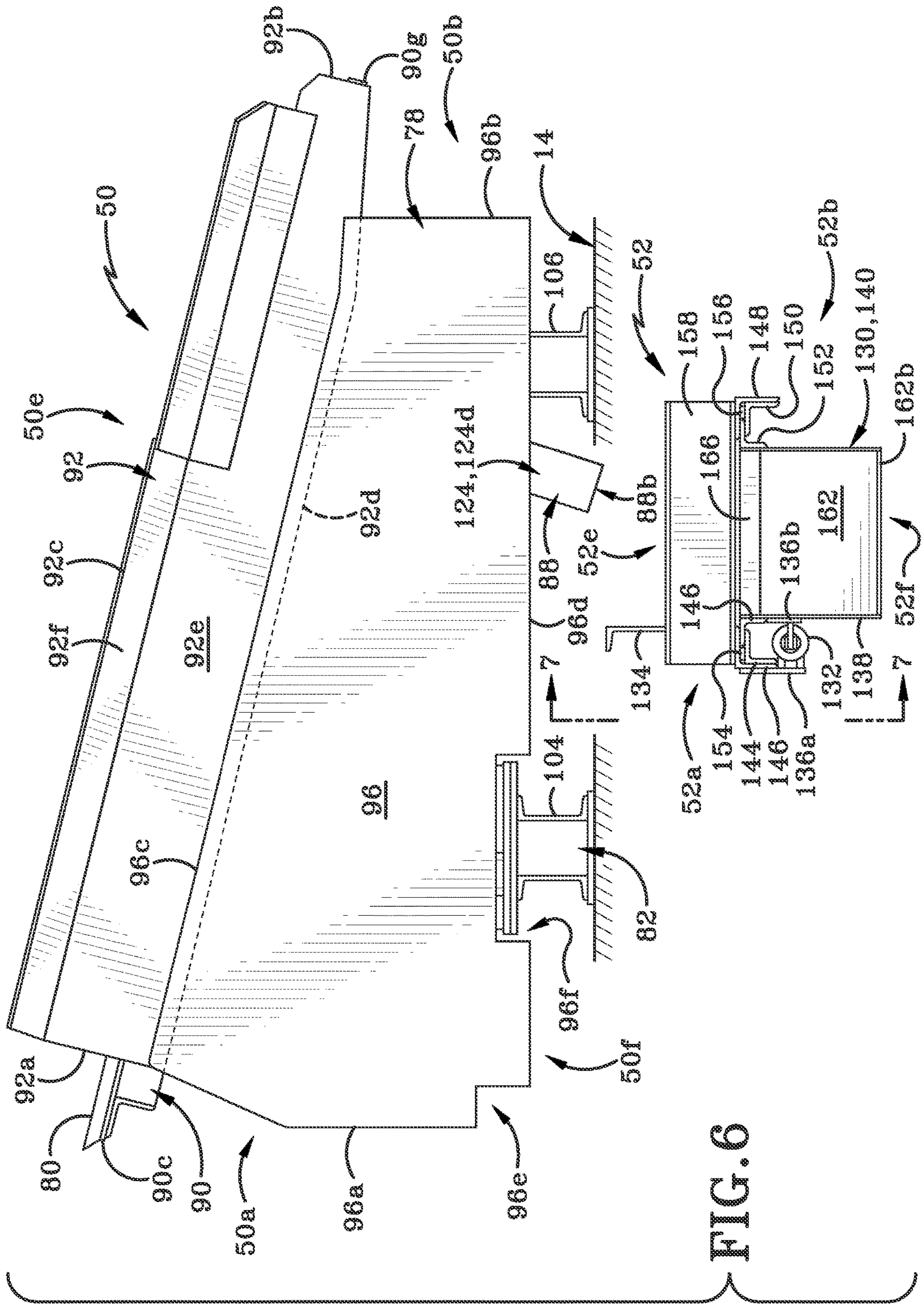
FIG. 6 is a side elevation view of FIG. 5.
Figure 7:
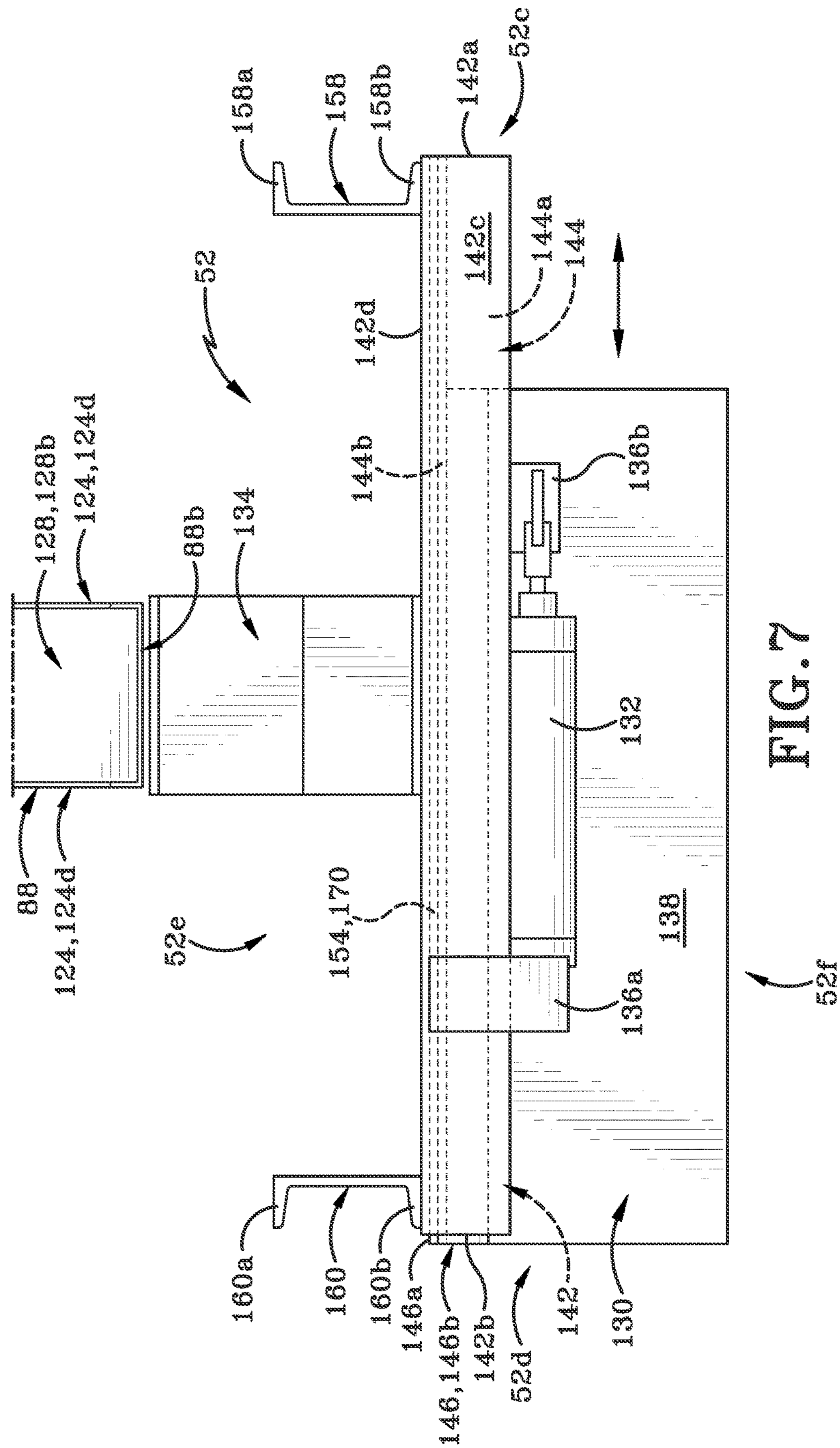
FIG. 7 is an elevation view taken along line 7-7 of FIG. 6.

With primary reference to FIG. 1B, FIG. 3 and FIG. 4, first hopper assembly 54 includes a front end 54*a*, a rear end 54*b*, a first side 54*c*, a second side 54*d*, a top 54*e*, a bottom 54*f*, a hopper 62, a first moveable cylinder 64, a second moveable cylinder 66, and a hopper assembly frame 68 operatively engaged with second base frame 14. First hopper assembly 54 is moveable between a first position "FP" and a second position "SP". This relative movement is shown in FIG. 3 by the arrow "A" and the phantom figure. While first hopper assembly 54 is in the first position "FP", material handler 38 may place retrieved tie plates 24 within the hopper of first hopper assembly 54. First hopper assembly 54 may then be moved into the second position "SP" to transfer tie plates 24 onto the first conveyor assembly 46 as more fully described below.

Hopper 62 includes a front surface 62*a*, a rear surface 62*b*, a first side surface 62*c*, a second side surface 62*d*, a bottom surface 62*e*, an inner surface 62*f* defining at least one compartment 62*g*, a first pivot mount 62*h*, a second pivot mount 62*i*, and a third pivot mount 62*j*. In one embodiment, the at least one compartment 62*g* includes two compartments 62*g* defined by the inner surface 62*f*. Each of the two compartments 62*g* is sized to receive a plurality of tie plates 24 therein.

While first hopper assembly 54 is in the first position "FP", the front surface 62*a* of hopper 62 may generally face away from the first side 14*c* of second base frame 14 and toward the longitudinal axis X1. The rear surface 62*b* of hopper 62 may generally face toward the first side 14*c* of second base frame 14 and away from the longitudinal axis X1. The first side surface 62*c* of hopper 62 may generally face toward the front end 14*a* of second base frame 14 and perpendicular to the longitudinal axis X1. The second side surface 62*d* of hopper 62 may generally face toward the rear end 14*b* of second base frame 14 and perpendicular to the longitudinal axis X1. The bottom surface 62*e* may generally face toward the bottom 10*f* of machine 10.

With primary reference to FIG. 3, the bottom surface 62*e* is a generally planar surface and is substantially horizontal relative to the ground "G". The front surface 62*a* is a generally planar surface and may extend transversely vertically upwardly from the bottom surface 62*e* toward the longitudinal axis X1 at an angle $\alpha_1$ relative to the bottom surface 62*e*. The angle $\alpha_1$ may be approximately 125 degrees. The rear surface 62*b* is a generally planar surface and may extend transversely vertically upwardly from the bottom surface 62*e* away from the longitudinal axis X1 at an angle $\alpha_2$ for a portion of the rear surface 62*b* relative to the bottom surface 62*e* and vertically upward and generally perpendicular to the bottom surface 62*e* for another portion of the rear surface 62*b*. The angle $\alpha_2$ may be approximately 115 degrees. The first side surface 62*c* includes a generally planar surface portion and a generally arcuate surface portion. The generally planar surface portion may extend vertically upwardly and generally perpendicular to the bottom surface 62*e* and the generally arcuate surface portion may curve toward the front end 14*a*. The second side surface 62*d* includes a generally planar surface portion and a generally arcuate surface portion. The generally planar surface portion may extend vertically upwardly and generally perpendicular to the bottom surface 62*e* and the generally arcuate surface portion may curve toward the rear end 14*b*. The first pivot mount 62*h* is operatively engaged with the front surface 62*a* of hopper 62 near a top portion of the front surface 62*a*, such as by welding. The second pivot mount 62*i* is operatively engaged with the first side surface 62*c* near the generally arcuate surface portion of the first side surface 62*c* and proximate the rear surface 62*b*, such as by welding. The third pivot mount 62*j* is operatively engaged with the second side surface 62*d* near the generally arcuate surface portion of the second side surface 62*d* and proximate the rear surface 62*b*, such as by welding.

The frame 68 includes a vertically extending first support member 68*a*, a vertically extending second support member 68*b*, a vertically extending third support member 68*c*, a vertically extending fourth support member 68*d*, a plurality of transversely extending support members 68*e*, a plurality of a longitudinally extending support members 68*f*, a first pivot mount 68*g*, and a second pivot mount 68*h*. The vertically extending first support member 68*a* is positioned proximate the front end 54*a* and the first side 54*c* of first hopper assembly 54, the vertically extending second support member 68*b* is positioned proximate the front end 54*a* and the second side 54*c* of first hopper assembly 54, the vertically extending third support member 68*c* is positioned proximate the rear end 54*b* and the first side 54*c* of first hopper assembly 54, and the vertically extending fourth support member 68*d* is positioned proximate the rear end 54*b* and the second side 54*d* of first hopper assembly 54.

The vertically extending first support member 68*a* and the vertically extending second support member 68*b* are substantially similar in length and longitudinally spaced from one another a suitable distance. The vertically extending third support member 68*c* and the vertically extending fourth support member 68*d* are substantially similar in length and longitudinally spaced from one another a suitable distance. The vertically extending first support member 68*a* is transversely spaced from the vertically extending third support member 68*c* by a suitable distance, and the vertically extending second support member 68*c* is transversely spaced from the vertically extending fourth support member 68*d* by a suitable distance. In one example, the vertically extending first support member 68*a* and the vertically extending second support member 68*b* are longer in length compared to the vertically extending third support member 68*c* and the vertically extending fourth support member 68*d*. However, the vertically extending first support member 68*a*, the vertically extending second support member 68*b*, the vertically extending third support member 68*c*, and the vertically extending fourth support member 68*d* may be of any suitable lengths. The first pivot mount 68*g* is operatively engaged with the vertically extending third support member 68*c* approximately just below the midway point of the vertically extending third support member 68*c* and proximate the first side 54*c* of the hopper assembly 54. The second pivot mount 68*h* is operatively engaged with the vertically extending fourth support member 68*d* approximately just below the midway point of the vertically extending fourth support member 68*d* and proximate the second side 54*d* of the hopper assembly 54.

In one embodiment, one of the plurality of transversely extending support members 68*e* is connected with the vertically extending first support member 68*a* and the vertically extending third support member 68*c* such that the bottom surface 62*e* of hopper 62 rests on a top surface of the transversely extending support member 68*e* while hopper 62 is in the first position "FP". In this embodiment, one of the plurality of transversely extending support members 68*e* is connected with the vertically extending first support member 68*a* and the vertically extending third support member 68*c* below the transversely extending support member 68*e* that supports the bottom surface 62*e* of hopper 62. In this embodiment, one of the plurality of transversely extending support members 68*e* is connected with the vertically extending second support member 68*b* and the vertically extending fourth support member 68*d* such that the bottom surface 62*e* of hopper 62 rests on a top surface of the transversely extending support member 68*e* while hopper 62 is in the first position "FP". In this embodiment, one of the plurality of transversely extending support members 68*e* is connected with the vertically extending second support member 68*b* and the vertically extending fourth support member 68*d* below the transversely extending support member 68*e* that supports the bottom surface 62*e* of hopper 62. Although specific positions of the plurality of transversely extending support members 68*e* have been described, it is to be understood that the plurality of transversely extending support members 68*e* may be placed in any suitable position.

In one embodiment, the plurality of longitudinally extending support members 68*f* includes three longitudinally extending support members 68*f*. In this embodiment, two of the plurality of longitudinally extending support members 68*f* are connected between the vertically extending first support member 68*a* and the vertically extending second support member 68*a*. One of the plurality of the longitudinally extending support members 68*f* is connected between the vertically extending third support member 68*c* and the vertically extending fourth support member 68*d*. Although a particular number and position of longitudinally extending support members 68*f* have been described, any number of longitudinally extending support members may be utilized and connected in any suitable configuration.

As stated above, hopper 62 of first hopper assembly 54 is operably connected to the frame 68 and the frame is operatively engaged with second base frame 14. In one embodiment, the vertically extending first support member 68*a*, the vertically extending second support member 68*b*, the vertically extending third support member 68*c*, and the vertically extending fourth support member 68*d* are connected to second base frame 14, such as by welding or by being releasably secured thereto. More particularly, the vertically extending first support member 68*a* is connected on one end to second base frame 14 and on the other end to the first pivot mount 62*h* of hopper 62 proximate the first side 54*c* of first hopper assembly 54 via a pivot member 70, such as a pivot pin. The vertically extending second support member 68*b* is connected on one end to second base frame 14 and on the other end to the first pivot mount 62*h* of hopper 62 proximate the second side 54*d* of the hopper assembly 54 via a pivot member 70, such as a pivot pin. As stated above, the bottom surface 62*e* of hopper 62 may rest on two of the plurality of transversely extending support members 68*e* while first hopper assembly 54 is in the first position "FP". The first moveable cylinder 64 of first hopper assembly 54 is connected to the second pivot mount 62*i* of hopper 62 and the first pivot mount 68*g* of the frame 68 via a connecting mechanism 71, such as a pin. The second moveable cylinder 66 is connected to the third pivot mount 62*j* of hopper 62 and the second pivot mount 68*h* of the frame 68 via a connecting mechanism 71, such as a pin. In one embodiment, the first cylinder 64 and the second cylinder 66 are hydraulic cylinders adapted to provide pivotal movement about a pivot axis $X_p$ defined by the pivot members 70 of hopper 62 and shown between the solid figure and the dash figure in the directions associated with arrow "A" in FIG. 3. Although the first cylinder 64 and the second cylinder 66 have been described as being hydraulic cylinders, the first and second cylinder 64, 66, may be any suitable moveable cylinders such as pneumatic or electric linear actuators.

The first conveyor assembly 46 includes a conveying mechanism 72, a first guide wall 74, a second guide wall 76, and a drive assembly (not shown). The conveying mechanism 72 has a first end 72*a* and a second end 72*b*. The conveying mechanism 72 may extend longitudinally along at least a portion of the central axis X1 from the first end 72*a* to the second end 72*b*. The first end 72*a* of the conveying mechanism 72 is positioned proximate the front end 14*a* of second base frame 14 and the second end 72*b* is positioned be in operable communication with the vibration plate feeder assembly 50, as further described below. The conveying mechanism 72 is configured to receive tie plates 24 from any of first hopper assembly 54, second hopper assembly 56, third hopper assembly 58, and fourth hopper assembly 58 as more fully described below. In one embodiment, the conveying mechanism 72 includes a plurality of longitudinally aligned steel plates 72*c* extending transversely between the first guide wall 74 and the second guide wall 76 in order to withstand the heavy weight and movement of tie plates 24. However, the conveying mechanism 72 may utilize any materials to suitably move tie plates 24.

The second cab 48 is positioned longitudinally rearwardly of the first conveyor assembly 46. In one embodiment, at least a portion of the conveying mechanism 72 extends within the second cab 48 and above the vibration plate feeder assembly 50. As such, the vibration plate feeder assembly 50, which may also be referred to as a singulator, is positioned within the second cab 48. The vibration plate feeder assembly 50 is configured to narrow and taper vertically downward in a manner so as to allow for tie plates 24 that are coming off the first conveyor assembly 46 to be fed rearwardly as more fully described below.

In one embodiment, the vibration plate feeder assembly 50 (FIGS. 5 to 8) includes a front end 50*a*, a rear end 50*b*, a first side 50*c*, a second side 50*d*, a top 50*e*, a bottom 50*f*, a vibration plate feeder frame 78, a plate receiving surface 80, a plurality of mounting devices 82, at least one translation assembly 84, at least one tension assembly 86, and a waste transfer mechanism 88. In one embodiment, the frame 78 includes a central frame member 90, a first upper frame member 92, a second upper frame member 94, a first lower frame member 96, and a second lower frame member 98. The central frame member 90 includes a transversely extending first portion 90*a*, a longitudinally extending second portion 90*b*, a transversely extending third portion 90*c*, a longitudinally extending fourth portion 90*d*, a transversely extending fifth portion 90*e*, an angled sixth portion 90*f*, a transversely extending seventh portion 90*g*, an angled eighth portion 90*h*, and at least one aperture 90*i*. The first portion 90*a* is connected to second portion 90*b* and to the eighth portion 90*h*. The second portion 90*b* is connected to the first portion 90*a* and to the third portion 90*c*. The third portion 90*c* is connected to the second portion 90*b* and to the fourth portion 90*d*. The fourth portion 90*d* is connected to the third portion 90*c* and to the fifth portion 90*e*. The fifth portion 90*e* is connected to the fourth portion 90*d* and to the sixth portion 90*f*. The sixth portion 90*f* is connected to the fifth portion 90*e* and to the seventh portion 90*g*. The seventh portion 90*g* is connected to the sixth portion 90*f* and to the eighth portion 90*h*. The eighth portion 90*h* is connected to the seventh portion 90*g* and to the first portion 90*a*.

The sixth portion 90*f* is connected between the fifth portion 90*e* and to the seventh portion 90*g* at an angle $\alpha_3$ relative to the fifth portion 90*e*. In one embodiment, the angle $\alpha_3$ is approximately 80 degrees; however, angle $\alpha_3$ may be any suitable angle. The eighth portion 90*h* is connected between the first portion 90*a* and the seventh portion 90*g* at an angle $\alpha_4$ relative to the first portion 90*a*. In one embodiment, the angle $\alpha_4$ is approximately 80 degrees; however, angle $\alpha_4$ may be any suitable angle. As such, a width $W_1$ of the central frame 90 between the sixth portion 90*f* and the eighth portion 90*h* may decrease longitudinally toward the seventh portion 90*g*.

In one embodiment, the at least one aperture 90*i* includes five apertures all denoted as 90*i*. Each aperture 90*i* may be of a generally elongated oval shape; however, the apertures 90*i* may be any suitable shape. The apertures 90*i* is in operable communication with the waste transfer mechanism 88 as more fully described below.

The first upper frame member 92 includes a front end 92*a*, a rear end 92*b*, a top edge 92*c*, and a bottom edge 92*d*, a first guide section 92*e* and a second guide section 92*f*. In one embodiment, the first upper frame member 92 is operatively engaged with the central frame member 90. Particularly, a portion of the first guide section 92*e* is operatively engaged with the central frame 90 along a substantial portion of the eighth portion 90*h* of the central frame 90. The first guide section 92*e* may extend vertically upwardly and generally parallel to the eighth portion 90*h*. The second guide section 92*f* may extend from the first guide section 92*e* vertically upward at an angle away from the longitudinal axis X1.

The second upper frame member 94 includes a front end 94*a*, a rear end 94*b*, a top edge 94*c*, and a bottom edge 94*d*, a first guide section 94*e* and a second guide section 94*f*. In one embodiment, the second upper frame member 94 is operatively engaged with the central frame member 90. Particularly, a portion of the first guide section 94*e* is operatively engaged with the central frame 90 along a substantial portion of the sixth portion 90*f* of the central frame 90. The first guide section 94*e* may extend vertically upwardly and generally parallel to the sixth portion 90*f*. The second guide section 94*f* may extend from the first guide section 94*e* vertically upward at an angle away from the longitudinal axis X1.

The first lower frame member 96 includes a front edge 96*a*, a rear edge 96*b*, a top edge 96*c*, and a bottom edge 96*d*. The first lower frame member 96 is operatively engaged with the central frame member 90. Particularly, the top edge 96*c* of the first lower frame member 96 is operatively engaged with the central frame 90 along a substantial portion of the eighth portion 90*h* of the central frame 90. A first portion of the front edge 96*a* may extend vertically downward at an angle toward the front end of the vibration plate feeder assembly 50 and a second portion of the front edge 96*a* may extend from the angled first portion generally perpendicular to second base frame 14. The bottom edge 96*d* includes a first notched section 96*e* and a second notched section 96*f*.

The second lower frame member 98 includes a front edge 98*a*, a rear edge 98*b*, a top edge 98*c*, and a bottom edge 98*d*. The first lower frame member 96 is operatively engaged with the central frame member 90. Particularly, the top edge 98*c* of the second lower frame member 98 is operatively engaged with the central frame 90 along a substantial portion of the sixth portion 90*f* of the central frame 90. A first portion of the front edge 98*a* may extend vertically downward at an angle toward the front end of the vibration plate feeder assembly 50 and a second portion of the front edge 98*a* may extend from the angled first portion generally perpendicular to second base frame 14. The bottom edge 98*d* includes a first notched section 98*e* and a second notched section 98*f*.

In one embodiment, the plate receiving surface 80 is complementary in shape to a top surface of the central frame 90. Plate receiving surface 80 is operatively engaged with the central frame 90 via connecting mechanisms 100, such as rivets. As such, the plate receiving surface 80 has substantially the same width $W_1$ as the central frame 90. Stated otherwise, the plate receiving surface has a width $W_1$ extending between the sixth portion 90*f* and the eighth portion 90*h* and that decreases longitudinally toward the seventh portion 90*g*.

The plate receiving surface 80 may define apertures 80*a* therein that are complementary in size and shape to the apertures 90*i* defined by the central frame 90, Apertures 80*a* are positioned directly vertically above the apertures 90*i* of the central frame 90. As such, the apertures 80*a* are in operable communication with the waste transfer mechanism 88 as more fully described below. In one embodiment, the plate receiving surface 80 is made out of an ultra-high-molecular-weight polyethylene (UHMWPE), which is a subset of thermoplastic polyethylene, in order to withstand the heavy weight and movement of tie plates 24 as further described below. Although the plate receiving surface 80 has been described as being made of a certain material, it is to be understood that the plate receiving surface 80 may be made out of any suitable material.

The vibration plate feeder assembly 50 may further include a central vertical transverse axis X2 extending between the front end 50*a* and the rear end 50*b* of the vibration plate feeder assembly 50. Vibration plate feeder assembly 50 may further include a central longitudinal axis X3 extending between the first side 50*c* and the second side 50*d*. The components positioned beneath the central frame 90 will be described with primary reference to FIG. 8, which is a central longitudinal cross-section view of the vibration plate feeder assembly 50 showing the components that are positioned between the longitudinal axis X3 and the second lower frame member 98. The components positioned between the longitudinal axis X2 and the first lower frame member 96 are substantially identical and thus will not be further described herein.

Figure 8:
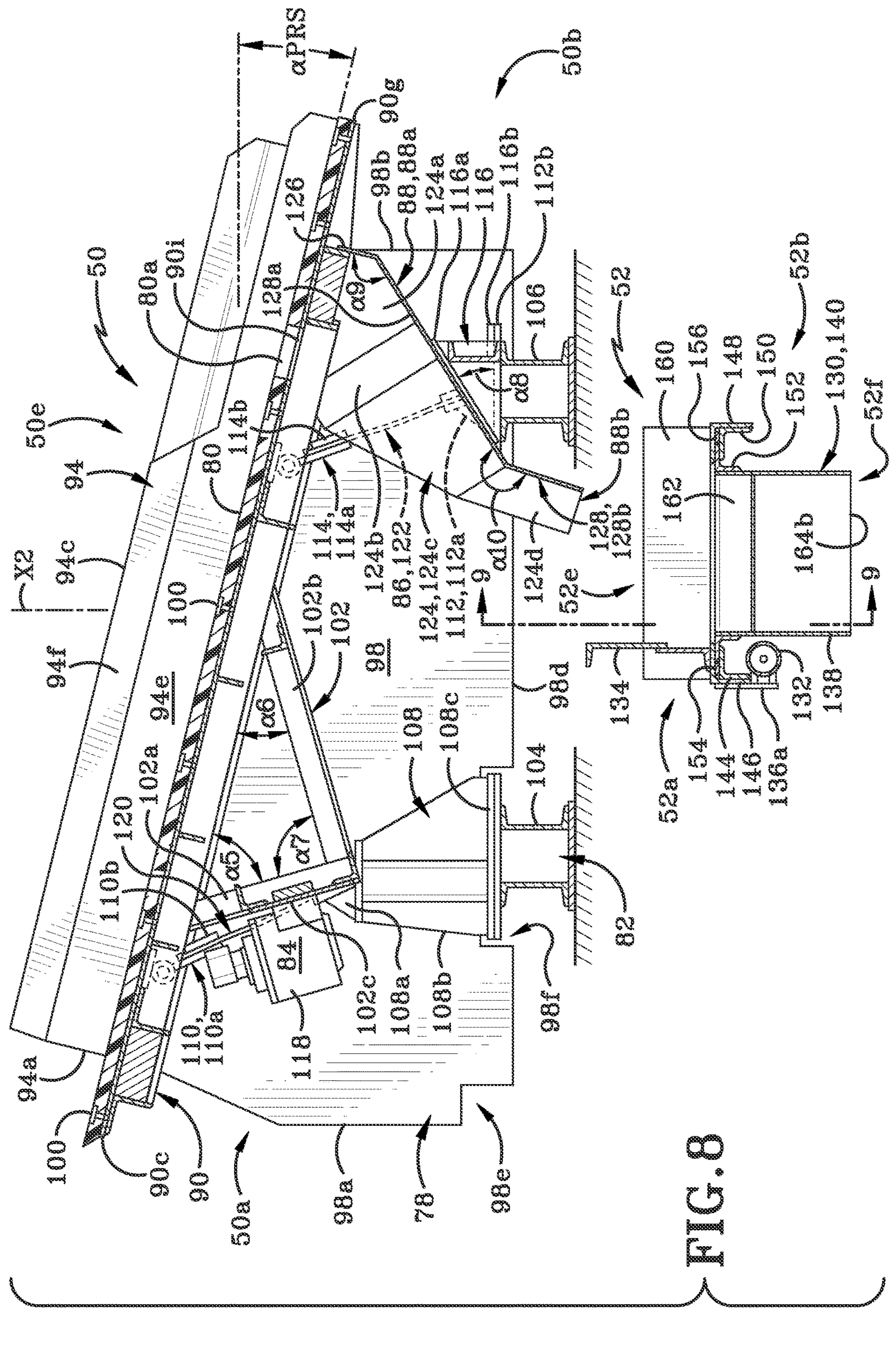
FIG. 8 is a longitudinal cross section view taken along line 8-8 of FIG. 5.
Figure 9:
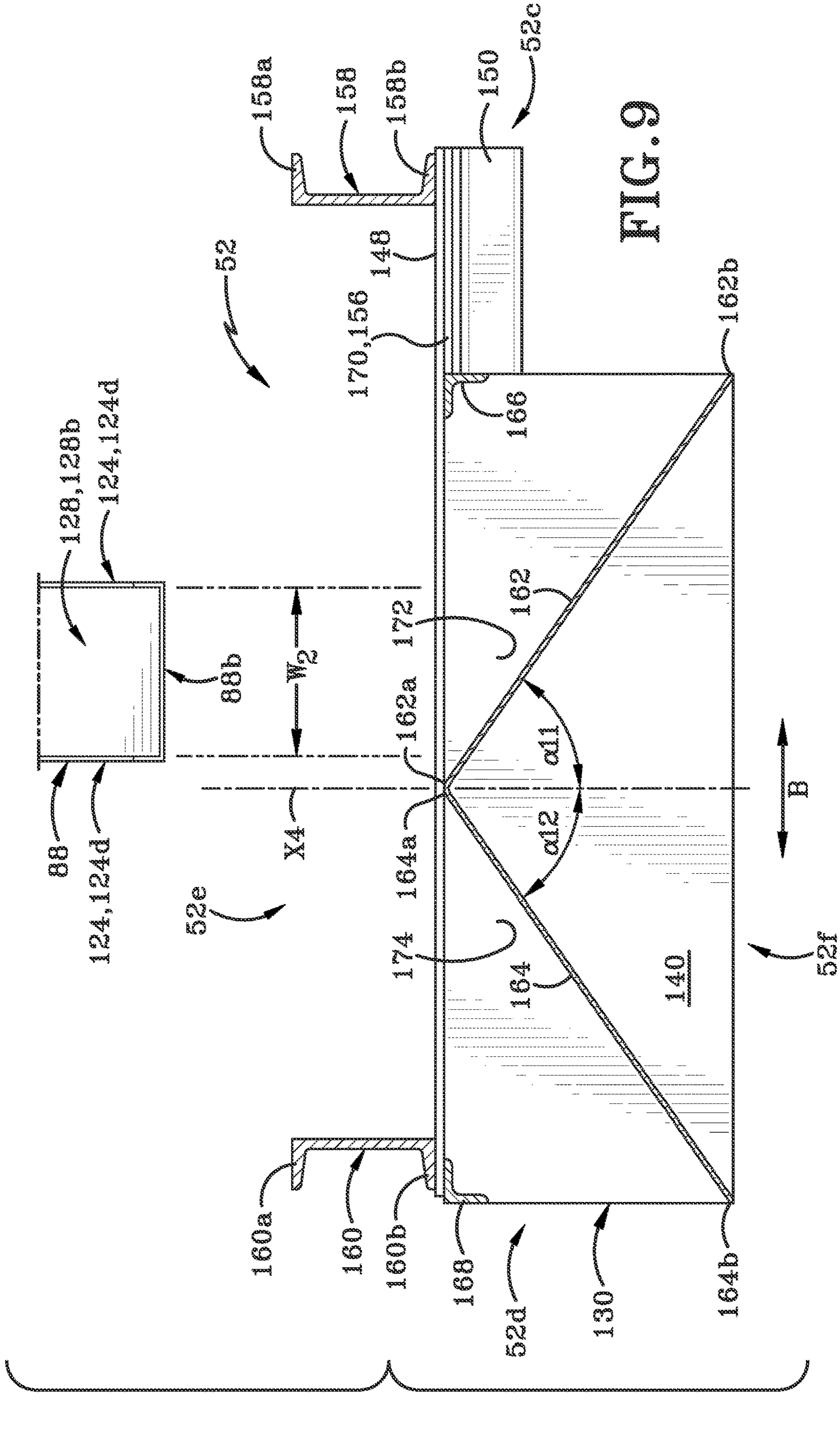
FIG. 9 is a cross section view taken along line 9-9 of FIG. 8.

With continued reference to FIG. 8, the plurality of mounting devices 82 includes a translation assembly mount 102, a first base frame mount 104, a second base frame mount 106, a first tension assembly mount 108, a second tension assembly mount 110, a third tension assembly mount 112, a fourth tension assembly mount 114, and a waste transfer mechanism mount 116. In one embodiment, the plurality of mounting devices 82 is configured to hold the vibration plate feeder assembly 50 at an inclined angle to facilitate movement of tie plates 24 from the front end 50*a* toward the rear end 50*b*. In one embodiment, the plate receiving surface 80, which is operatively engaged with the central frame 90, is positioned at an angle $\alpha_{prs}$ relative to the horizontal. In one embodiment, the angle $\alpha_{prs}$ may be approximately 15 degrees; however, the angle $\alpha_{prs}$ may be any suitable angle.

As shown in FIG. 8, the translation assembly mount 102 includes a first support member 102*a*, a second support member 102*b*, and a mounting surface 102*c*. The first support member 102*a* is operatively engaged with a bottom surface of the central frame 90 at a position located between the front end 50*a* of the vibration plate feeder assembly 50 and the transverse axis X2. The first support member 102*a* may extend vertically downward at an angle $\alpha_5$ toward the transverse axis X2. In one example, the angle $\alpha_5$ may be approximately 60 degrees relative to the bottom surface of the central frame 90; however, the angle $\alpha_5$ may be any suitable angle. The second support member 102*b* is operatively engaged with the bottom surface of the central frame 90 at a position located between the rear end 50*b* of the vibration plate feeder assembly 50 and the transverse axis X2. The second support member 102*b* may extend vertically downward at an angle $\alpha_6$ toward the transverse axis X2. In one example, the angle $\alpha_6$ may be approximately 30 degrees relative to the bottom surface of the central frame 90; however, the angle $\alpha_6$ may be any suitable angle. The first support member 102*a* and the second support 102*b* are connected to one another at an angle $\alpha_7$ approximately midway between the top edge 98*c* and the bottom edge 98*d* of the second lower frame member 98. In one example, the angle $\alpha_7$ may be approximately 90 degrees relative to the first support member 102*a* and the second support member 102*b*.

Still referring to FIG. 8, the mounting surface 102*c* is a generally planar surface and is operatively engaged with the first support member 102*a*. Therefore, the mounting surface 102*c* is mounted at the same angle $\alpha_5$ as is the first support member 102*a*. The first base frame mount 104 is a generally elongated member extending between the first lower frame member 96 (FIGS. 5 & 6) and the second lower frame member 98, approximately midway between the front end 50*a* of the vibration plate feeder assembly 50 and the transverse axis X2; and proximate the second notched section 96*f* of the bottom edge 96*d* and the second notched section 98*f* of the bottom edge 98*d*.

The second base frame mount 106 (FIG. 8) is a generally elongated member extending between the first lower frame member 96 and the second lower frame member 98, approximately midway between the rear end 50*b* of the vibration plate feeder assembly 50 and the transverse axis X2 and positioned approximately vertically below the apertures 80*a*, 90*i*.

The first tension assembly mount 108 (FIG. 8) includes an upper portion 108*a*, an intermediate portion 108*b*, and a lower portion 108*c*. The lower portion 108*c* is a generally rectangular planar member and is positioned above the first base frame mount 104 such that a portion of the second notched section 98*f* of the bottom edge 98*d* of the second lower frame member 98 rests on the lower portion 108*c* of the first tension assembly mount 108. (The first lower frame member 96 is similarly engaged with first tension assembly mount 108.) The intermediate portion 108*b* may be a generally trapezoidal member extending vertically upward from the lower portion 108*c* to the upper portion 108*a*. The upper portion 108*a* includes a generally triangular member and a first and second generally rectangular member adapted to secure the at least one tension assembly 86 as further described below.

The second tension assembly mount 110 includes a first generally rectangular member 110*a* and a second generally rectangular member 110*b*. The first member 110*a* is operatively engaged with the bottom surface of the central frame 90 between the first support member 10 of the translation assembly mount 102 and the front edge 98*a* of the second lower frame member 98. In one embodiment, the at least one tension assembly 86 is secured between the first member 110*a* and the second member 110*b*.

The third tension assembly mount 112 includes an upper portion 112*a* and a lower portion 112*b*. The lower portion 112*b* is a generally rectangular planar member and is positioned above the second base frame mount 106 such that the lower portion 112*b* is proximate the bottom edge 96*d* thereof. The upper portion 112*a* includes a generally triangular member and at least one generally rectangular member adapted to secure the at least one tension assembly 86 as further described below.

The fourth tension assembly mount 114 includes a first generally rectangular member 114*a* and a second generally rectangular member 114*b*. The first member 114*a* is operatively engaged with the bottom surface of the central frame 90 longitudinally forward of the second base frame mount 106. In one embodiment, the at least one tension assembly 86 is secured between the first member 114*a* and the second member 114*b*.

In one embodiment, the waste transfer mechanism mount 116 (FIG. 8) includes an angled upper surface 116*a* and a generally planar lower surface 116*b*. The generally planar lower surface 116*b* is mounted to a top surface of the second base frame mount 106 approximately midway between the first lower frame member 96 and the second lower frame member 98. The upper surface 116*a* may extend at an angle as relative to the lower portion 112*b* of third tension assembly mount 112. In one example, the angle as may be approximately 32 degrees; however, the angle as may be any suitable angle.

In one embodiment, the at least one translation assembly 84 (FIG. 8) includes a first translation assembly 118 and a substantially identical second translation assembly (not shown). In this embodiment, the first translation assembly 118 and the second translation assembly are motors configured to provide vibrational movement to at least the plate receiving surface 80 of the vibration plate feeder assembly 50. Although the first translation assembly 118 and the second translation assembly have been described as being motors, the first translation assembly 118 and the second translation assembly may be any other suitable translation assemblies. The first translation assembly 118 is mounted to the mounting surface 102*c* of the translation assembly mount 102 such that the first translation assembly 118 extends longitudinally forward from the mounting surface 102*c*.

In one embodiment, the at least one tension assembly 86 includes a first tension assembly 120, a second tension assembly 122, a third tension assembly (not shown), and a fourth tension assembly (not shown). In this embodiment, the first tension assembly 120, the second tension assembly 122, the third tension assembly, and the fourth tension assembly are substantially identical leaf springs configured to secure the plate receiving surface 80 while still allowing vibrational movement of the plate receiving surface 80. Although the first tension assembly 120, second tension assembly 122, the third tension assembly (not shown), and the fourth tension assembly (not shown) have been described as being leaf springs, they may, instead, be any other suitable tension assemblies.

With continued reference to FIG. 8, and in one embodiment, one end of the first tension assembly 120 is mounted to the upper portion 108*a* of the first tension assembly mount 108 by being secured between the first generally rectangular member 110*a* and the second generally rectangular member 110*b*. The other end of the first tension assembly 120 is mounted to the second tension assembly mount 110 by being secured between the first generally rectangular member 110*a* and the second generally rectangular member 110*b*. Although the first tension assembly 120 has been described as being mounted in a particular manner, it is to be understood that the first tension assembly 120 may be mounted in any other suitable manner.

With continued reference to FIG. 8, and in one embodiment, one end of the second tension assembly 122 is mounted to the upper portion 112*a* of the third tension assembly mount 112 by being secured between the first generally rectangular member and the second generally rectangular member. The other end of the second tension assembly 122 is mounted to the fourth tension assembly mount 114 by being secured between the first generally rectangular member 114*a* and the second generally rectangular member 114*b*. Although the second tension assembly 122 has been described as being mounted in a particular manner, it is to be understood that the second tension assembly 122 may be mounted in any other suitable manner.

In one embodiment, the waste transfer mechanism 88 is a chute that is in operable communication with the apertures 80*a* of the plate receiving surface 80 and the apertures 90*i* of the central frame 90. The waste transfer mechanism 88 includes a top end 88*a* and a bottom end 88*b*. In one embodiment, the top end 88*a* is wider than the bottom end 88*b* to allow waste and/or debris 302 (FIG. 16 and FIG. 17) to fall through the apertures 80*a*, 90*i*, and to travel along the waste transfer mechanism 88 to the bottom end 88*b*. In one embodiment, the waste transfer mechanism 88 includes side guide walls 124 (FIGS. 8 & 9), a rear guide wall 126, and a transfer surface 128. In one embodiment, the side guide walls 124 include a first portion 124*a*, a second portion 124*b*, a third portion 124*c*, and a fourth portion 124*d*. The transfer surface 128 includes a first portion 128*a* and a second portion 128*b*. The first portion 128*a* may extend vertically downward from the rear guide wall 126 at an angle $\alpha_9$. In one example, the angle $\alpha_9$ is approximately one hundred thirty-six degrees; however, the angle $\alpha_9$ may be any suitable angle. The second portion 128*b* may extend vertically downward from the first portion 128*a* at an angle $\alpha_{10}$. In one example, the angle $\alpha_{10}$ is approximately one hundred forty degrees; however, the angle $\alpha_{10}$ may be any suitable angle. The first portion 124*a*, the second portion 124*b*, the third portion 124*c*, and the fourth portion 124*d* are configured to guide waste 302 that falls through the apertures 80*a*, 90*i* along the transfer surface 128. As such, the first portion 124*a*, the second portion 124*b*, the third portion 124*c*, and the fourth portion 124*d* may extend vertically upward from the transfer surface 128 in any suitable manner. In one embodiment, the first guide wall 124 and the second guide wall (not shown) are operatively engaged with the first upper frame member 92 and the second upper frame member 94 such that the rear guide wall 126 is positioned proximate the apertures 80*a*, 90*i*, and such that the first portion 128*a* of the transfer surface 128 rests on the upper surface 116*a* of the waste transfer mechanism mount 116. In one embodiment, the bottom end 88*b* of the waste transfer mechanism 88 is of a width $W_2$ (FIG. 9) extending between the side guide walls 124. The bottom end 88*b* of the waste transfer mechanism 88 is configured to allow the waste/debris 302 to fall to the material deflector assembly 52 as further described below. Although the waste transfer mechanism 88 has been described as having certain components in certain orientations, it is to be understood that the waste transfer mechanism 88 may include other components in other orientations to achieve a similar result as the described waste transfer mechanism 88.

With primary reference to FIG. 6-FIG. 9, the material deflector assembly 52 includes a front end 52*a*, a rear end 52*b*, a first side 52*c*, a second side 52*d*, a top 52*e*, a bottom 52*f*, a material deflector frame 130, a moveable cylinder 132, a deflector mechanism 134, a first cylinder mount 136*a* and a second cylinder mount 136*b*.

In one embodiment, the material deflector frame 130 includes a generally planar transversely extending first wall 138 longitudinally spaced apart from a generally planar transversely extending second wall 140, a generally L-shaped transversely extending first frame member 142, a generally L-shaped transversely extending second frame member 144, a generally L-shaped transversely extending third frame member 146, a generally L-shaped transversely extending fourth frame member 148, a generally L-shaped transversely extending fifth frame member 150, and a generally L-shaped transversely extending sixth frame member 152. Material deflector frame 130 also includes a generally planar transversely extending first mount 154, a generally planar transversely extending second mount 156, a generally U-shaped longitudinally extending third mount 158, and a generally U-shaped longitudinally extending fourth mount 160. Material deflector frame 130 may also include an angled first deflecting surface 162, an angled second deflecting surface 164, a longitudinally extending seventh frame member 166, and a longitudinally extending eighth frame member 168. A vertical longitudinal axis X4 is defined by the apex of first deflecting surface 162 and the second deflecting surface 164.

In one embodiment, the third mount 158 is positioned proximate the first side 52*c* of the material deflector assembly 52 and is transversely spaced a distance from the fourth mount 160. Fourth mount 160 is positioned proximate the second side 52*d* of the material deflector assembly 52. The third mount 158 includes a top portion 158*a* and a bottom portion 158*b* and the fourth mount 160 includes a top portion 160*a* and a bottom portion 160*b*. The top portion 158*a* of the third mount 158 is operatively engaged with a portion of the vibration plate feeder assembly 50 below the central frame member 90. The top portion 160*a* of the fourth mount 160 is operatively engaged with a portion of the vibration plate feeder assembly 50 below the central frame member 90.

In one embodiment, the generally L-shaped transversely extending first frame member 142, the generally L-shaped transversely extending second frame member 144, and the generally L-shaped transversely extending third frame member 146 are operatively engaged to one another and located proximate the front end 52*a* of the material deflector assembly 52. The generally L-shaped transversely extending fourth frame member 148, the generally L-shaped transversely extending fifth frame member 150, and the generally L-shaped transversely extending sixth frame member 152 are operably connected to one another and are located proximate the rear end 52*b* of the material deflector assembly 52. Further, the operable connection of the generally L-shaped transversely extending first frame member 142, the generally L-shaped transversely extending second frame member 144, and the generally L-shaped transversely extending third frame member 146 is substantially identical to the operable connection of the generally L-shaped transversely extending fourth frame member 148, the generally L-shaped transversely extending fifth frame member 150, and the generally L-shaped transversely extending sixth frame member 152. Consequently, only the operable connection of the generally L-shaped transversely extending first frame member 142, the generally L-shaped transversely extending second frame member 144, and the generally L-shaped transversely extending third frame member 146 will be further discussed herein.

In one embodiment, the first frame member 142 includes a first end 142*a*, a second end 142*b*, a first portion 142*c* and a second portion 142*d*. The second portion 142*d* of the first frame member 142 is connected to the bottom portion 158*b* of the third mount 158 proximate the first side 52*c* of the material deflector assembly 52. The second portion 142*d* of the first frame member 142 is connected to the bottom portion 160*b* of the fourth mount 160 proximate the second side 52*d* of the material deflector assembly 52. As such, the second portion 142*d* of the first frame member 142 is generally parallel to the bottom portion 158*b* of the third mount 158 and the bottom portion 160*b* of the fourth mount 160. The first portion 142*c* of the first frame member 142 is generally perpendicular to the second portion 142*d*. Although not shown in the Figures, the third mount 158 and the fourth mount 160 are connected to the fourth frame member 148 in a similar manner.

In one embodiment, the second frame member 144 includes a first portion 144*a* and a second portion 144*b*. The second frame member 144 is generally aligned in a similar orientation to the first frame member 142. As such, the first portion 144*a* of the second frame member 144 is positioned against the first portion 142*c* of the first frame member 142. The first mount 154 is positioned between the second portion 142*d* of the first frame member 142 and the second portion 144*b* of the second frame member 144, and is connected to both of the second portion 142*d* and the second portion 144*b*. Consequently, a space 170 is defined between the second portion 142*d* of the first frame member 142 and the second portion 144*b* of the second frame member 144. The third frame member 146 is slidably retained within the space 170 as further described below.

In one embodiment, the first wall 138 includes a front surface 138*a*, a rear surface 138*b*, a first side edge 138*c*, a second side edge 138*d*, a top edge 138*e*, and a bottom edge 138*f*. The third frame member 146 includes a first portion 146*a* and a second portion 146*b*. The second portion 146*b* of the third frame member 146 is operatively engaged with the front surface 138*a* of the first wall 138 proximate the top edge 138*e*. In this embodiment, the second portion 146*b* is generally flush with and parallel to the front surface 138*a* and the first portion 146*a* may extend longitudinally away from the front surface 138*a* and is generally perpendicular thereto. The first portion 146*a* may extend within the space 170 and is slidably retained with the space 170 as further described below. As stated above, the fourth frame member 148, the fifth frame member 150, and the sixth frame member 152 are operably connected in a substantially identical as are the first frame member 142, the second frame member 144, and the third frame member 146.

In one embodiment, the first cylinder mount 136*a* is mounted to the first frame member 142 approximately midway between the second side 52*d* of the material deflector assembly 52 and the vertical axis X4. The second cylinder mount 136*b* is mounted to the front surface 138*a* of the first wall 138 approximately midway between first side 52*c* of the material deflector assembly 52 and the vertical axis X4. The moveable cylinder 132 is connected to the first cylinder mount 136*a* and the second cylinder mount 136*b*, and, as such, the moveable cylinder 132 may extend transversely between the first cylinder mount 136*a* and the second cylinder mount 136*b*. The moveable cylinder 132 is configured to move the third frame member 146 and the sixth frame member 152 along the spaces 170 in a direction shown by the arrow "B" (FIG. 9) to align the angled first deflecting surface 162 or the angled second deflecting surface 164 under the bottom end 88*b* of the waste transfer mechanism 88.

For example, when machine 10 is placing tie plates 24 along the first side 10*c* of machine 10, the moveable cylinder 132 may move the third frame member 146 and the sixth frame member 152 such that the angled first deflecting surface 162 is aligned vertically below the bottom end 88*b* of the waste transfer mechanism 88. In this orientation the waste/debris 302 that falls through the apertures 80*a*, 90*i* will be deflected towards the first side 10*c* of machine 10. In the event machine 10 is placing tie plates 24 along the second side 10*d* of machine 10, the moveable cylinder 132 may move the third frame member 146 and the sixth frame member 152 such that the angled second deflecting surface 164 is aligned vertically below the bottom end 88*b* of the waste transfer mechanism 88 such that waste/debris 302 that falls through the apertures 80*a*, 90*i* will be deflected towards the second side 10*d* of machine 10.

In one embodiment, the deflector mechanism 134 is mounted to the second portion 142*d* of the first frame member 142 proximate the vertical axis X4 and transversely away from the vertical axis X4 toward the first side 52*c* of the material deflector assembly 52. The deflector mechanism 134 is configured to deflect waste/debris 302 as the waste/debris 302 falls through the apertures 80*a*, 90*i* and out of the water transfer mechanism 88.

In one embodiment, the angled first deflecting surface 162 (FIG. 9) includes a top edge 162*a* and a bottom edge 164*b* and the angled second deflecting surface 164 includes a top edge 164*a* and a bottom edge 164*b*. The top edge 162*a* and the top edge 164*a* may meet at the vertical axis X4. The angled first deflecting surface 162 may extend vertically downward from the vertical axis X4 at an angle $\alpha_{11}$. In one embodiment, the angle $\alpha_{11}$ is approximately 55 degrees; however, the angle $\alpha_{11}$ may be any suitable angle. The angled second deflecting surface 164 may extend vertically downward from the vertical axis X4 at an angle $\alpha_{12}$. In one embodiment, the angle $\alpha_{12}$ is approximately 55 degrees; however, the angle $\alpha_{12}$ may be any suitable angle.

In one embodiment, the seventh frame member 166 may extend longitudinally between the first wall 138 and the second wall 140 approximately vertically above the bottom edge 162*b* of the angled first deflecting surface 162. The eighth frame member 168 may extend longitudinally between the first wall 138 and the second wall 140 approximately vertically above the bottom edge 164*b* of the angled second deflecting surface 164.

In one embodiment, the first wall 138, the second wall 140, the angled first deflecting surface 162, the angled second deflecting surface 164, the seventh frame member 166, and the eighth frame member 168 define a first cavity 172 and a second cavity 174. The first cavity 172 is positioned between the vertical axis X4 and the first side 52*c* of the material deflector assembly 52. The second cavity 174 is positioned between the vertical axis X4 and the second side 52*d* of the material deflector assembly 52. The first cavity 172 and the second cavity 174 are configured to be positioned below the waste transfer mechanism 88 to dispose of waste 302 as further described below. The moveable cylinder 132 is configured to move the third frame member 146 and the sixth frame member 152 along the spaces 170 in a direction shown by the arrow "B" to align the first cavity 172 or the second cavity 174 under the bottom end 88*b* of the waste transfer mechanism 88.

For example when machine 10 is placing tie plates 24 along the first side 10*c* of machine 10, the moveable cylinder 132 may move the third frame member 146 and the sixth frame member 152 such that the first cavity 172 is aligned vertically below the bottom end 88*b* of the waste transfer mechanism 88 such that waste/debris 302 that falls through the apertures 80*a*, 90*i* will be deflected towards the first side 10*c* of machine 10. In the event machine 10 is placing tie plates 24 along the second side 10*d* of machine 10, the moveable cylinder 132 may move the third frame member and the sixth frame member 152 such that the second cavity 174 is aligned vertically below the bottom end 88*b* of the waste transfer mechanism 88. Waste/debris 302 that falls through the apertures 80*a*, 90*i* will be deflected towards the second side 10*d* of machine 10.

Figure 10:
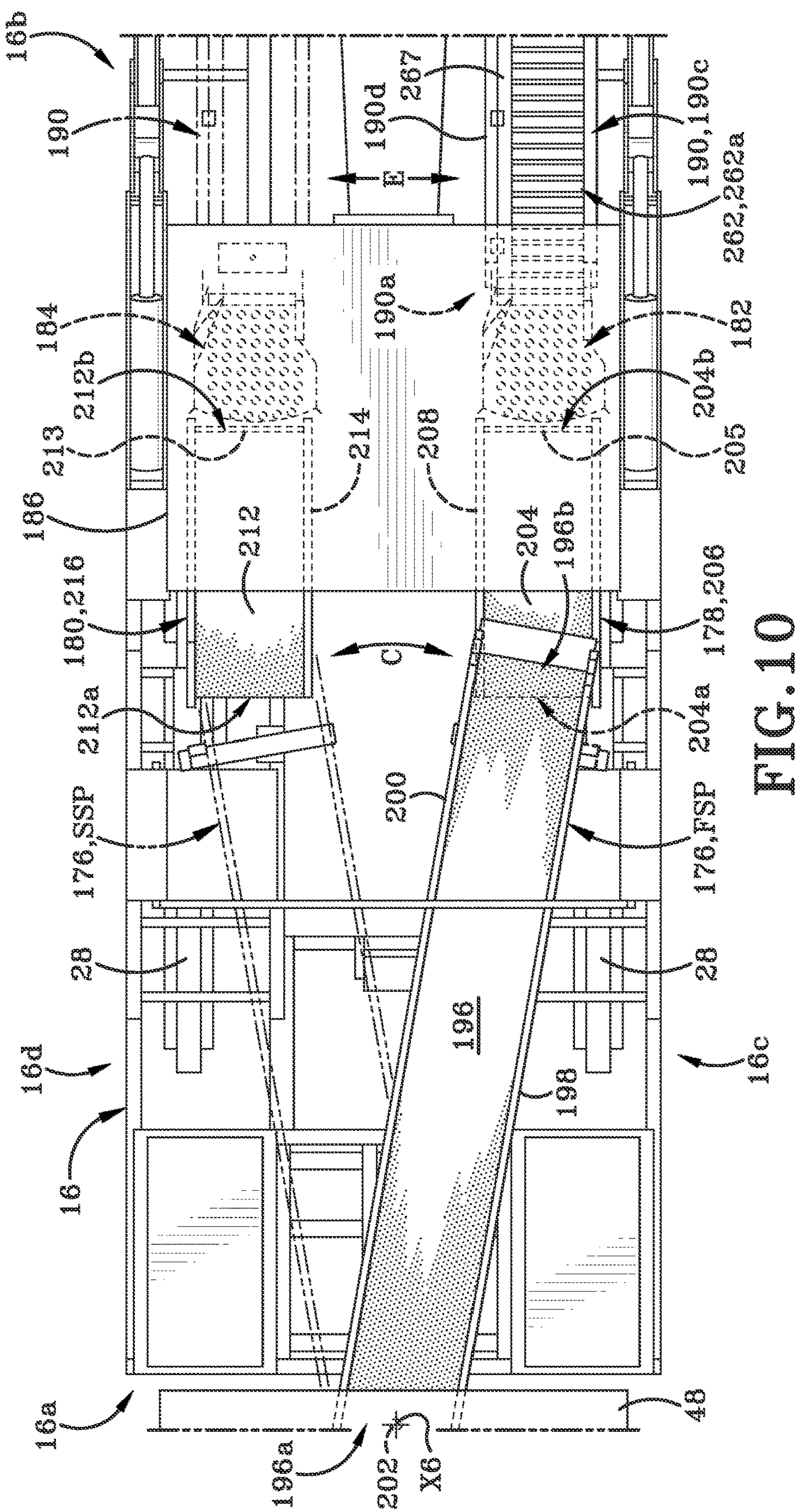
FIG. 10 is a top view of FIG. 1C.

With primary reference to FIG. 1, FIG. 1C, and FIG. 10 and in one embodiment, the rear end 50*b* of the vibration plate feeder assembly 50 is positioned vertically above a second conveyor assembly 176. Second conveyor assembly 176 is mounted partially on second base frame 14 and partially on third base frame 16. As such, third base frame 16 includes the second conveyor assembly 176, a third conveyor assembly 178, a fourth conveyor assembly 180, a first ball transfer table assembly 182, a second ball transfer table assembly 184, a third cab 186, a boom 188, a fifth conveyor assembly 190, a conveyor support trolley assembly 192, and a tie plate placing mechanism 194. A portion of the second conveyor assembly 176 is positioned within the second cab 48 and the second conveyor assembly 176 may extend longitudinally rearwardly toward the third conveyor assembly 178 and the fourth conveyor assembly 180. The third conveyor assembly 178 is positioned proximate the first side 16*c* of third base frame 16 and the fourth conveyor assembly 180 is positioned proximate the second side 16*d* of third base frame 16. The third conveyor assembly 178 is transversely aligned with the fourth conveyor assembly 180. A portion of the third conveyor assembly 178 is located forwardly of the third cab 186 and another portion is positioned within the third cab 186, as more fully described below. Likewise, a portion of the fourth conveyor assembly 180 is located forwardly of the third cab 186 and another portion is positioned within the third cab 186 as more fully described below. The first ball transfer table assembly 182 is positioned longitudinally rearwardly of the third conveyor assembly 178 and is generally longitudinally aligned with the third conveyor assembly 178. The second ball transfer table assembly 184 is positioned longitudinally rearwardly from the fourth conveyor assembly 180 and is generally longitudinally aligned with the fourth conveyor assembly 180. The boom 188 is positioned rearward from the third cab 186; however, the boom 188 is utilized to lift various components of machine 10 one of forward and rearward of the third cab 186. The fifth conveyor assembly 190 is positioned longitudinally rearward from the first ball transfer table assembly 182 or the second ball transfer table assembly 184 as more fully described below. The conveyor support trolley assembly 192 is positioned longitudinally rearward from the third cab 186 and is in operable communication with the fifth conveyer assembly 190 as more fully described below. The tie plate placing mechanism 194 is positioned longitudinally rearward of the conveyor support trolley assembly 192.

The second conveyor assembly 176 (FIG. 10) includes a conveying mechanism 196, a first guide wall 198, a second guide wall 200, a drive assembly (not shown), and a pivot pin 202. The conveying mechanism 196 includes a first end 196*a* and a second end 196*b*. The second conveyor assembly 176 includes a central axis X5 extending generally from the pivot pin 202 proximate the first end 196*a* to the second end 196*b* and between the first guide wall 198 and the second guide wall 200. As stated above, the first end 196*a* of the conveying mechanism 196 is positioned vertically below the rear end 50*b* of the vibration plate feeder assembly 50 and the second end 196*b* of the conveying mechanism 196 is positioned such that the second conveyor assembly 176 is in operable communication with the third conveyor assembly 178 or the fourth conveyor assembly 180 as further described below. As such, the conveying mechanism 196 may extend vertically upward at an angle $\alpha_{13}$ from the first end 196*a* to the second end 196*b* relative to third base frame 16. In one embodiment, the angle $\alpha_{13}$ is approximately 10 degrees relative to third base frame 16; however, the angle $\alpha_{13}$ may be any suitable angle.

The conveying mechanism 196 (FIG. 10) is configured to receive tie plates 24 from the vibration plate feeder assembly 50 as more fully described below. In one embodiment, the conveying mechanism 196 includes a conveyor track for moving tie plates 24 from the vibration plate feeder assembly 50 to the third conveyor assembly 178 or the fourth conveyor assembly 180. In one embodiment, the second conveyor assembly 176 is moveable between a first side position "FSP" (FIG. 10) and a second side position "SSP" about a pivot axis X6 defined by the pivot pin 202 such that the second conveyor assembly 176 is moved between the first side 16*c* and the second side 16*d* of third base frame 16 as shown by arrow "C". Second conveyor assembly 176 is moved to be in operable communication with the third conveyor assembly 178 or the fourth conveyor assembly 180 as further described below. In one embodiment, the boom 188 is utilized to facilitate the movement shown by the arrow "C". As shown in FIG. 10, the second conveyor assembly 176 is in the first side position "FSP" and is in operable communication with the third conveyor assembly 178. As shown by the phantom lines in FIG. 10, when the second conveyor assembly 176 is in the second side position "SSP", the second conveyor assembly 176 is in operable communication with the fourth conveyor assembly 180.

Figure 12:
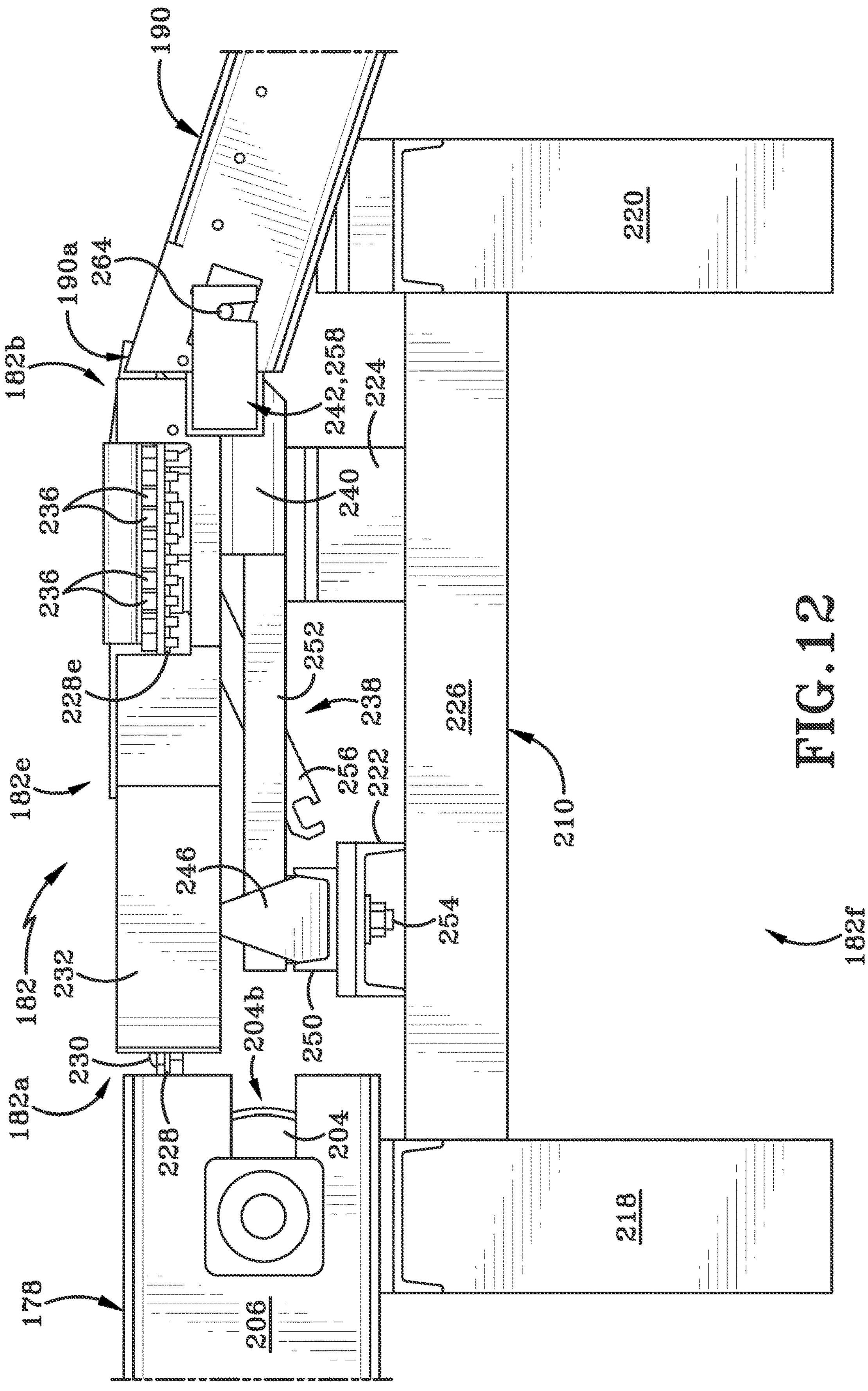
FIG. 12 is a side elevation view of the ball transfer assembly.

In one embodiment, the third conveyor assembly 178 (FIG. 10) includes a conveying mechanism 204, a transfer bar 205, a first guide wall 206, a second guide wall 208, a drive assembly (not shown), and a frame 210 (FIG. 12). The conveying mechanism 204 includes a first end 204*a* and a second end 204*b*. When the second conveyor assembly 176 is in the first side position "FSP", the first end 204*a* of conveying mechanism 204 is positioned vertically below the second end 198*b* of the conveying mechanism 196 of the second conveyor assembly 176. The transfer bar 205 may extend between the first guide wall 206 and the second guide wall 208 proximate the second end 204*b* of the conveying mechanism 204. The second end 204*b* of the conveying mechanism 204 is generally longitudinally aligned with the first ball transfer table assembly 182 as more fully described below. In one embodiment, the transfer bar 205 is configured to facilitate transfer of tie plates 24 from the third conveyor assembly 178 to the first ball transfer table assembly 182.

In one embodiment, the fourth conveyor assembly 180 includes a conveying mechanism 212, a transfer bar 213, a first guide wall 214, a second guide wall 216, a drive assembly (not shown), and a frame (not shown). The conveying mechanism 212 includes a first end 212*a* and a second end 212*b*. When the second conveyor assembly 176 is in the second side position SSP, the first end 212*a* is positioned vertically below the second end 196*b* of the conveying mechanism 196 of the second conveyor assembly 176. The transfer bar 213 may extend between the first guide wall 214 and the second guide wall 216 proximate the second end 212*b* of the conveying mechanism 212. The second end 212*b* of the conveying mechanism 212 is generally longitudinally aligned with the second ball transfer table assembly 184 as more fully described below. In one embodiment, the transfer bar 213 is configured to facilitate transfer of tie plates 24 from the fourth conveyor assembly 180 to the second ball transfer table assembly 184.

With primary reference to FIG. 10 through FIG. 14, and in one embodiment, the third conveyor assembly 178 is substantially identical to the fourth conveyor assembly 180 and, therefore, only the third conveyor assembly 178 will be discussed in greater detail with reference to the frame 210. In one embodiment, the frame 210 includes a transversely extending first support member 218, a transversely extending second support member 220, a transversely extending third support member 222, a transversely extending fourth support member 224, and a longitudinally extending fifth support member 226. The transversely extending first support member 218 may support the third conveyor assembly 178 proximate the second end 204*b* of the conveying mechanism 204 of the third conveyor assembly 178. The transversely extending second support member 220 may support the fifth conveyor assembly 190 as more fully described below. The longitudinally extending fifth support member 226 may extend between the first support member 218 and the second support member 220. The transversely extending third support member 222 is supported by the fifth support member 226 proximate the second end 204*b* of the conveying mechanism 204 of the third conveyor assembly 178. The transversely extending fourth support member 224 is supported by the fifth support member 226 a longitudinal distance away from the third support member 222. The third support member 222 includes an aperture 222*a* configured to receive a portion of the first ball transfer table assembly 182 as more fully described below.

With continued reference to FIG. 10 through FIG. 14, the first ball transfer table assembly 182 and the second ball transfer table assembly 184 are substantially identical, and, therefore, only the first ball transfer table assembly 182 will be further described herein. In one embodiment, the first ball transfer table assembly 182 includes a front end 182*a*, a rear end 182*b*, a first side 182*c*, a second side 182*d*, a top 182*e*, and a bottom 182*f*. The first ball transfer table assembly 182 may further include a ball mounting plate 228, a plurality of transfer mechanisms 230, a first guide wall 232, a second guide wall 234, a plurality of alignment mechanisms 236, a pivot assembly 238, a support member 240, at least one connecting mechanism 242, an insert 244, and a transfer roller 245. In one embodiment, the ball mounting plate 228 includes a generally transversely extending arcuate first edge 228*a*, a longitudinally extending second edge 228*b*, an angled third edge 228*c*, a transversely extending fourth edge 228*d*, a longitudinally extending fifth edge 228*e*, an angled sixth edge 228*f*, a longitudinally extending seventh edge 228*g*, a top surface 228*h*, and a bottom surface 228*i*.

The first edge 228*a* is connected to the second edge 228*b* and the seventh edge 228*g*. The second edge 228*b* is connected to the third edge 228*c* and the first edge 228*a*. The third edge 228*c* is connected to the fourth edge 228*d* and the second edge 228*b*. The fourth edge 228*d* is connected to the fifth edge 228*e* and the third edge 228*c*. The fifth edge 228*e* is connected to the sixth edge 228*f* and the fourth edge 228*d*. The sixth edge 228*f* is connected to the seventh edge 228*g* and the fifth edge 228*e*. The seventh edge 228*g* is connected to the first edge 228*a* and the sixth edge 228*f*. The third edge 228*c* may extend from the second edge 228*b* at an angle $\alpha_{14}$. The angle $\alpha_{14}$ is approximately 150 degrees relative to the second edge 228*b*; however, the angle $\alpha_{14}$ may be any suitable angle. The sixth edge 228*f* may extend from the seventh edge 228*g* at an angle $\alpha_{15}$. The angle $\alpha_{15}$ is approximately 145 degrees; however, the angle $\alpha_{15}$ may be any suitable angle.

In one embodiment, the plurality of transfer mechanisms 230 is positioned within the top surface 228*h* and is configured to allow movement of tie plates 24 over the plurality of transfer mechanisms 230. In one embodiment, the plurality of transfer mechanisms 230 is a plurality of ball bearings embedded within the top surface 228*h*. However, in other embodiments the plurality of transfer mechanisms 230 may be any suitable transfer mechanisms. In one embodiment, the plurality of transfer mechanisms 230 is positioned in rows where each row is substantially transversely aligned. In one embodiment, a tangential top surface of the plurality of transfer mechanisms 230 is substantially aligned along a horizontal plane defined by the tangential top surfaces of the plurality of transfer mechanisms 230.

In one embodiment, the first guide wall 232 may extend vertically upward from and along at least the fifth edge 228*e*, the sixth edge 228*f*, and the seventh edge 228*g*. The second guide wall 234 may extend vertically upward from and at least along the second edge 228*b* and the third edge 228*c*. The first guide wall 232 and the second guide wall 234 are configured to keep tie plates 24 on the ball mounting plate 228 as more fully described below.

In one embodiment, the plurality of alignment mechanism 236 is positioned along at least the fifth edge 228*e*. In one embodiment, the plurality of alignment mechanisms 236 is a plurality of rollers extending vertically upward from and along the fifth edge 228*e*. The rollers are configured to align tie plates 24 before moving tie plates 24 to the fifth conveyor assembly 190 as more fully described below. In one embodiment, a tangential contact surface of the plurality of rollers is longitudinally aligned.

Figure 13:
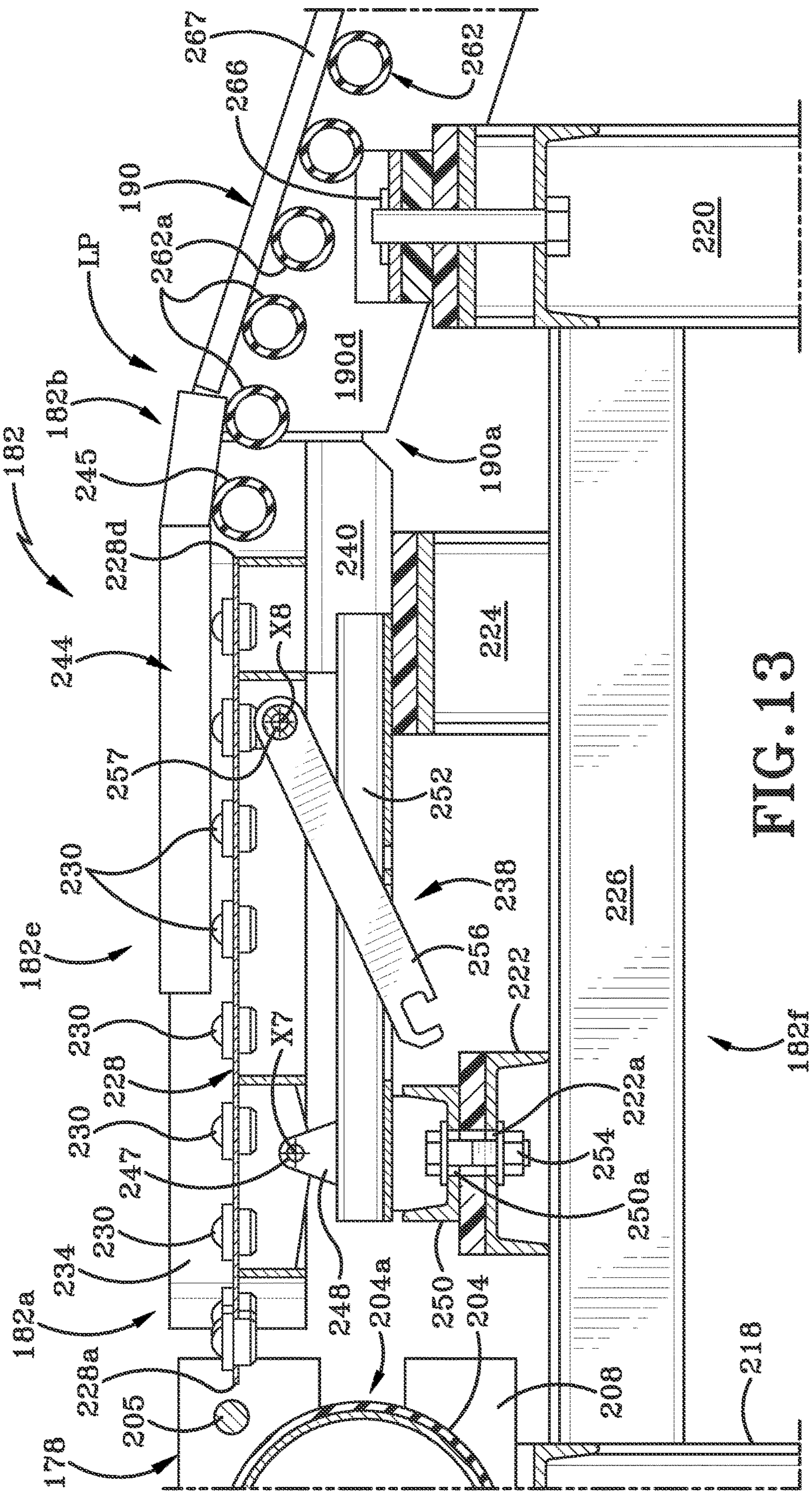
FIG. 13 is a longitudinal cross section view taken along line 13-13 of FIG. 11.

In one embodiment, the pivot assembly 238 includes a first pivot member 246, a second pivot member 248, a transversely extending support member 250, a longitudinally extending support member 252, an anchoring mechanism 254, and a locking mechanism 256. In one embodiment, the first pivot member 246 is operatively engaged with the bottom 228*i* of the ball mounting plate 228 proximate the seventh edge 228*g*. The first pivot member 246 is also operatively engaged with the front end 182*a* of the first ball transfer table assembly 182, and is located vertically above the transversely extending third support member 222 of the frame 210 of the third conveyor assembly 178. The second pivot member 248 is operatively engaged with the bottom 228*i* of the ball mounting plate 228 proximate the second edge 228*b*. The second pivot member 248 is also operatively engaged with the front end 182*a* of the first ball transfer table assembly 182, and is located vertically above the transversely extending third support member 222 of the frame 210 of the third conveyor assembly 178. The first pivot member 246 and second pivot member 248 are operatively engaged with the bottom 228*i* of the ball mounting plate 228 via pivot pins 247. This arrangement is shown in FIG. 13 but only for the second pivot member 248 and not the first pivot member 246 but it will be understood that the same arrangement applies to the first pivot member 246. The transversely extending support member 250 is positioned above the transversely extending third support member 222 of the frame 210 of the third conveyor assembly 178. The transversely extending support member 250 defines an aperture 250*a* that is positioned above the aperture 222*a* of the third support member 222. The anchoring mechanism 254 is operatively engaged with the transversely extending support member 250 and extends vertically downward through the apertures 250*a* and 222*a* to secure the pivot assembly 238 to the third support member 222. The longitudinally extending support member 252 may extend from the transversely extending support member 250 toward the rear end 182*b* of the first ball transfer table assembly 182. The longitudinally extending support member 252 may rest on the transversely extending fourth support member 224 of the frame 210 of the third conveyor assembly 178. The longitudinally extending support member 252 includes a longitudinally extending slot 252*a* configured to receive a portion of the locking mechanism 256 therein as is more fully described herein. The locking mechanism 256 is operatively engaged with the bottom 228*i* of the ball mounting plate 228 via a pivot pin 257 located vertically above a front of the transversely extending fourth support member 224 of the frame 210 of the third conveyor assembly 178.

In one embodiment, the support member 240 is operatively engaged with the bottom 228*i* of the ball mounting plate 228 and is configured to rest on the transversely extending fourth support member 224 of the frame 210 of the third conveyor assembly 178.

In one embodiment, the at least one connecting mechanism 242 includes a first connecting mechanism 258 and a second connecting mechanism 260. The first connecting mechanism 258 is operatively engaged with the first ball transfer table assembly 182 proximate the rear end 182*b* and the first side 182*c* of the first ball transfer table assembly 182. The second connecting mechanism 260 is operatively engaged with the first ball transfer table assembly 182 proximate the rear end 182*b* and the second side 182*c* of the first ball transfer table assembly 182. The first connecting mechanism 258 and the second connecting mechanism 260 are configured to releasably secure the fifth conveyor assembly 190 to the first ball transfer table assembly 182 as further described below.

Figure 11A:
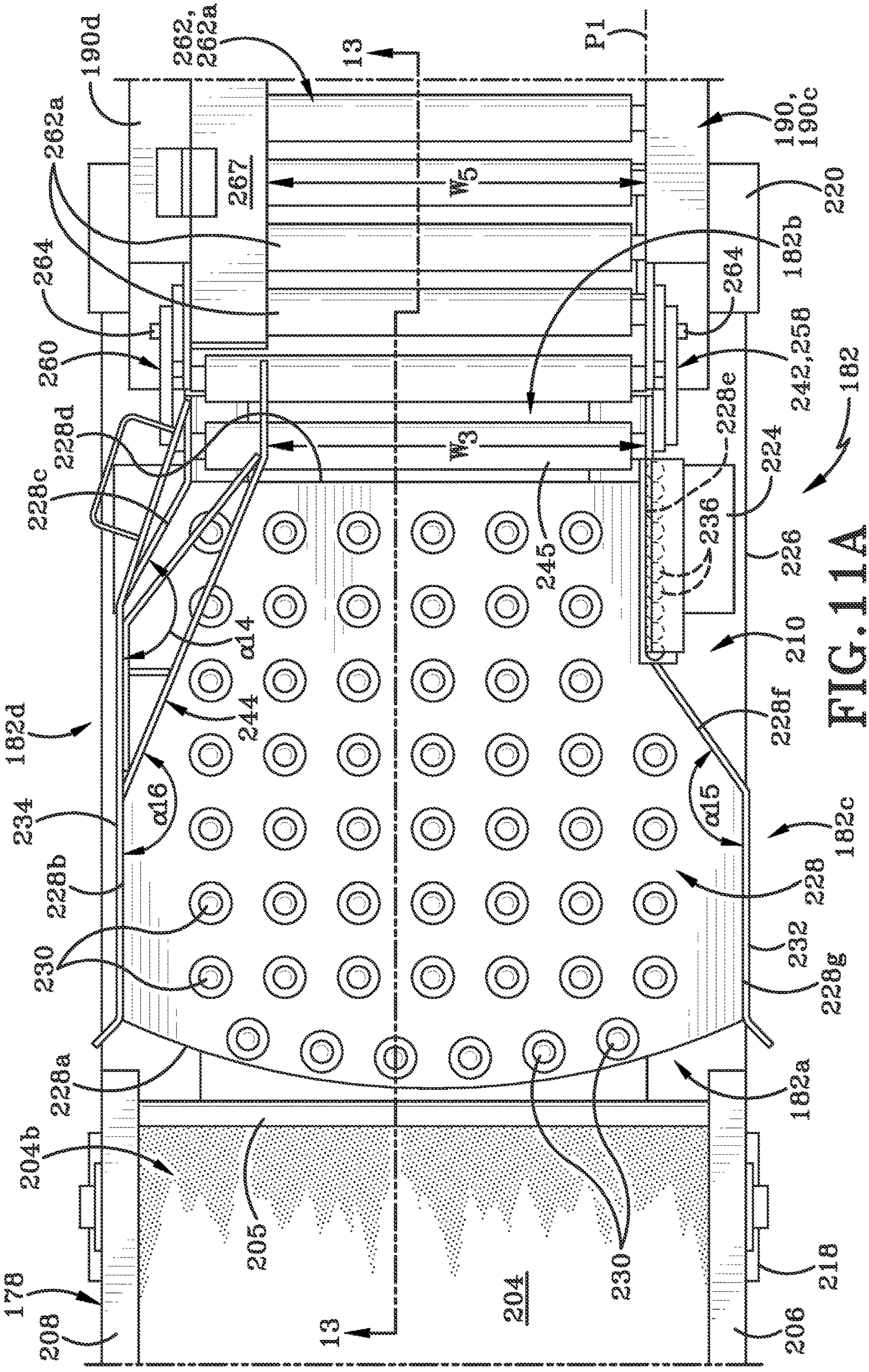
FIG. 11A is an enlarged top fragmentary view of a ball transfer table assembly in accordance with one aspect of the present disclosure.

In one embodiment, the length of the second edge 228*b*, the length of the third edge 228*c*, and the angle between the second edge 228*b* and the third edge 228*c* are changed by positioning an insert 244 on the plate receiving surface 80 that is shown in FIG. 11A. When the insert 244 is included, the third edge 228*c* may extend from the second edge 228*b* at an angle $\alpha_{16}$. The angle $\alpha_{16}$ is approximately 160 degrees relative to the second edge 228*b*; however, the angle $\alpha_{16}$ may be any suitable angle. When the insert 244 is included, the first ball transfer table assembly 182 includes a first exit width $W_3$ (FIG. 11A) extending transversely between the insert 244 and a tangential plane P1 of the alignment mechanisms 236 proximate the rear end 182*b* of the first ball transfer table assembly 182. When the insert 244 is not included, the first ball transfer table assembly 182 includes a second exit width $W_4$ (FIG. 11B) extending transversely between the connection of the third edge 228*c* and the fourth edge 228*d* and the tangential plane P1. In one embodiment, the first exit width $W_3$ is less than the second exit width $W_4$; however, the first exit width $W_3$ and the second exit width $W_4$ may be of any suitable widths. Therefore, an operator may configure the first ball transfer table assembly 182 to include the first exit width $W_3$ or the second exit width $W_4$ depending on the size of the tie plates 24 being placed by machine 10. Stated otherwise, the first exit width $W_3$ corresponds to a particularly sized tie plate 24 and the second exit width $W_4$ corresponds to a differently sized tie plate 24, and either exit width $W_3$ or $W_4$ is implemented. The size of the tie plates 24 is described in greater detail below.

In one embodiment, the transfer roller 245 may extend transversely between the first guide wall 232 and the second guide wall 234 proximate the fourth edge 228*d*. In one embodiment, the transfer roller 245 may facilitate the transfer of tie plates 24 from the first ball transfer table assembly 182 to the fifth conveyor 190.

Figure 11B:
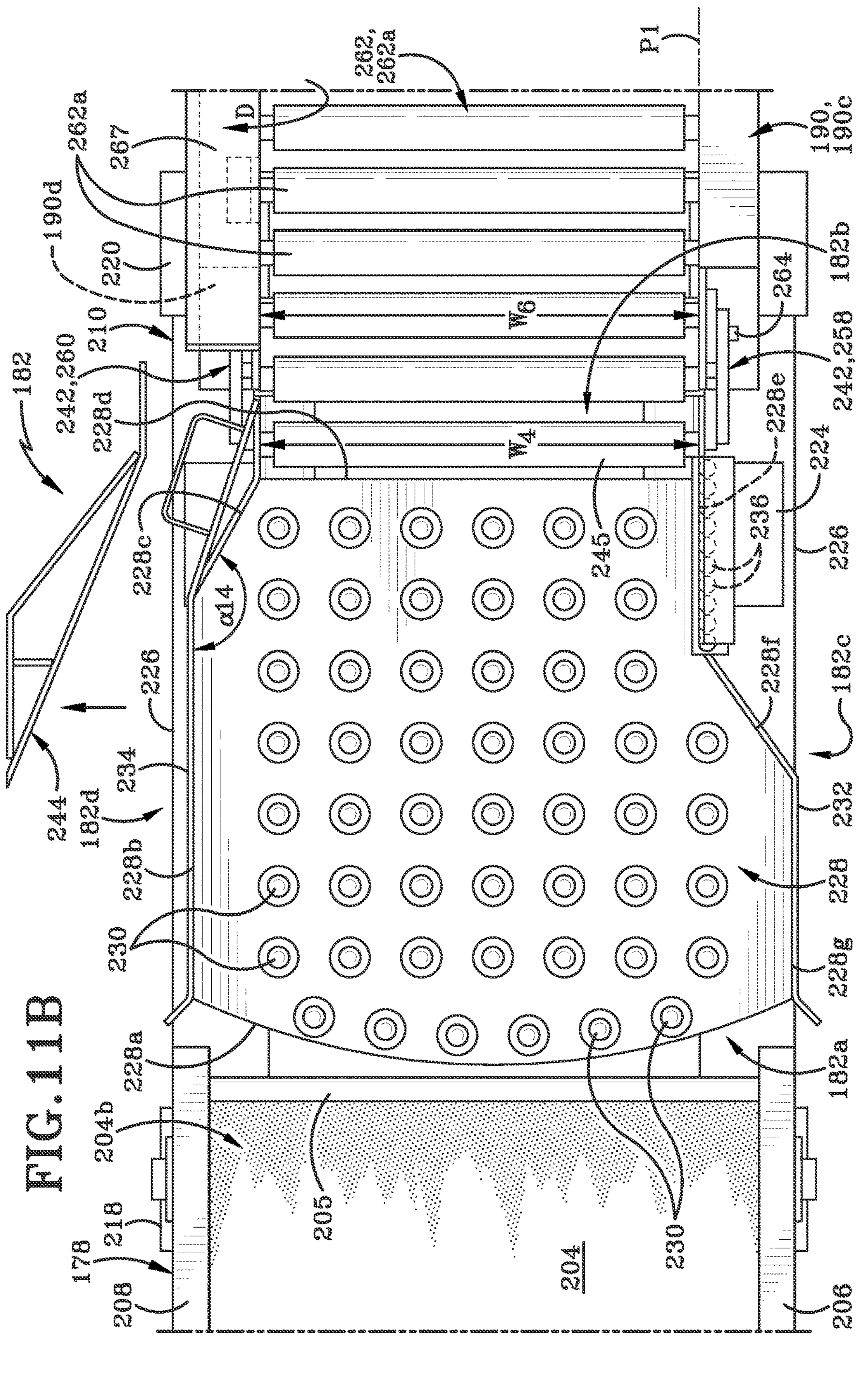
FIG. 11B is an enlarged top fragmentary view of the ball transfer table assembly with an insert removed.

In one embodiment, the fifth conveyor assembly 190 includes a front end 190*a* (FIG. 12), a rear end 190*b* (FIG. 1D), a first side 190*c* (FIG. 12), and a second side 190*d*. The fifth conveyor assembly 190 includes a conveying mechanism 262, at least one connecting mechanism 264, an anchoring mechanism 266, and a hinged insert 267. The at least one conveying mechanism 262 includes a plurality of longitudinally aligned transversely extending rollers 262*a*. The rollers 262*a* are configured to receive tie plates 24 on a tangential surface of the rollers 262*a* to be transferred to the tie plate placing mechanism 194. The at least one connecting mechanism 264 is configured to be releasably operatively engaged with the first connecting mechanism 258 and the second connecting mechanism 260. The anchoring mechanism 266 is configured to be releasably operatively engaged with the second transversely extending second support member 220 of the frame 210 of the second conveyor assembly 176. The hinged insert 267 is connected to the second side 190*d* of the fifth conveyor assembly proximate the transfer roller 245 and is configured to be moveable in a direction indicated by arrow "D" (FIG. 11B). As such, the hinged insert 267 is deployable between a position where the hinged insert 267 is parallel to the ball mounting plate 228 and a position where the hinged insert 267 is perpendicular to the ball mounting plate 228. When the insert 244 is included in the first ball transfer table assembly 182, the hinged insert 267 is deployed to the position where the hinged insert 267 is parallel to the ball mounting plate 228. When the insert 244 is not included in the first ball transfer table assembly 182, the hinged insert 267 is deployed to the position where the hinged insert 267 is perpendicular to the ball mounting plate 228. Therefore, when the hinged insert 267 is in the position parallel to the ball mounting plate 228, the fifth conveyor assembly 190 includes a first entry width $W_5$ (FIG. 11A) extending between the hinged insert 267 and the plane P1. When the hinged insert 267 is in the position perpendicular to the ball mounting plate 228, the fifth conveyor assembly 190 includes a second entry width $W_6$ (FIG. 11B) extending between the second side 190*d* of the conveyor assembly 190 and the plane P1. Thus, in one embodiment, the first exit width $W_3$ is the same as the first entry width $W_5$, and the second exit width $W_4$ is the same as the second entry width $W_6$; however, the first entry width $W_5$ and the second entry width $W_6$ may be any suitable widths. Therefore, an operator may configure the first conveyor assembly 190 to include the first entry width $W_5$ or the second entry $W_6$ width $W_6$ depending on the size of the tie plates 24 being placed by machine 10.

Figure 14:
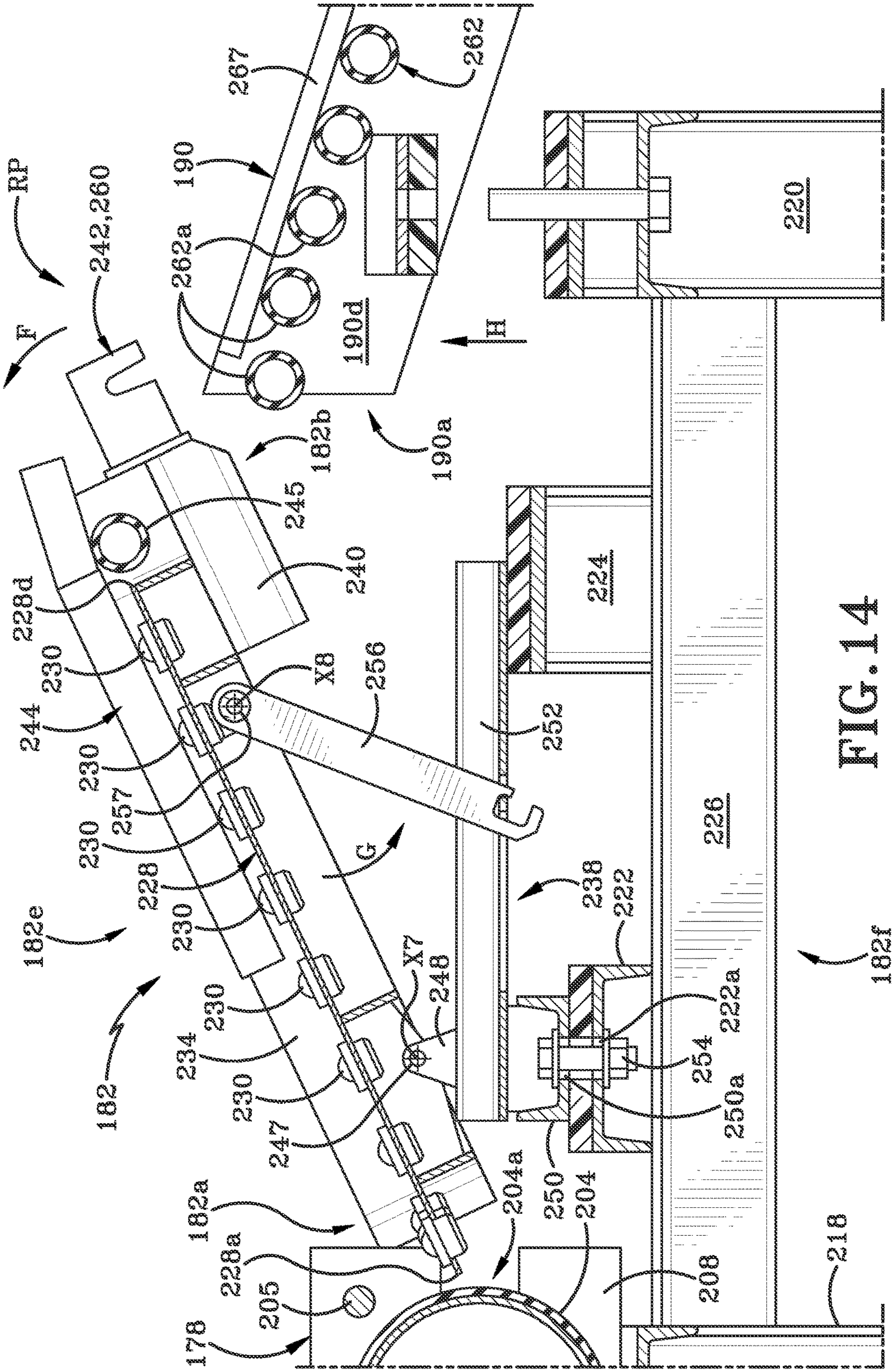
FIG. 14 is a longitudinal cross section view taken along line 13-13 of FIG. 11 with the ball transfer table assembly in a raised position.

The fifth conveyor assembly 190 is configured to be moveable in a direction indicated by arrow "E" (FIG. 10) between the first side 16*c* and the second side 16*d* of third base frame 16 to be operably connected to the first ball transfer table assembly 182 or the second ball transfer table assembly 184. For example if the fifth conveyor assembly 190 is connected to the first ball transfer table assembly 182 and needs to be operably connected to the second ball transfer table assembly 184, the first ball transfer table assembly 182 is moveable between a lowered position "LP" and a raised position "RP". As shown in FIG. 14, the first ball transfer table assembly 182 is raised from the lower position "LP" by pivoting the ball mounting plate 228 and associated components about the pivot axis X7 in the general direction shown by arrow "F". As the ball mounting plate 228 and the associated components are raised, the locking mechanism 256 moves in a general direction indicated by arrow "G", slides within the slot 252*a*, and locks on a portion of the longitudinally extending support member 252. The fifth conveyor assembly 190 is raised vertically upward as indicated by arrow "H", is disconnected from the second transversely extending second support member 220 of the frame 210 of the second conveyor assembly 176, and is transferred to the second ball transfer table assembly 184 to be operably connected thereto.

Figure 1D:
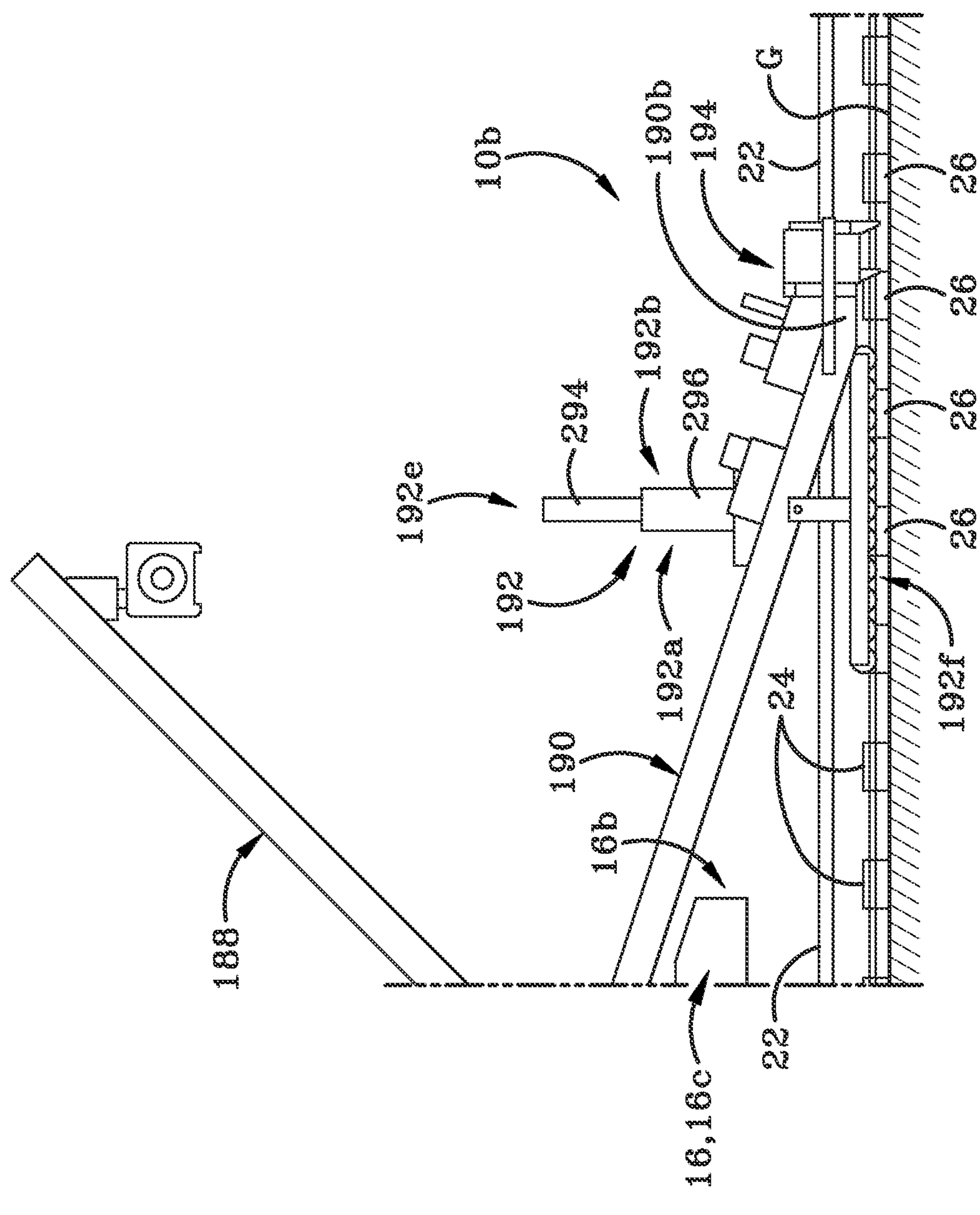
FIG. 1D is an enlarged fragmentary side elevation view of a portion of the machine as highlighted by the box labeled SEE FIG. 1D.
Figure 2:
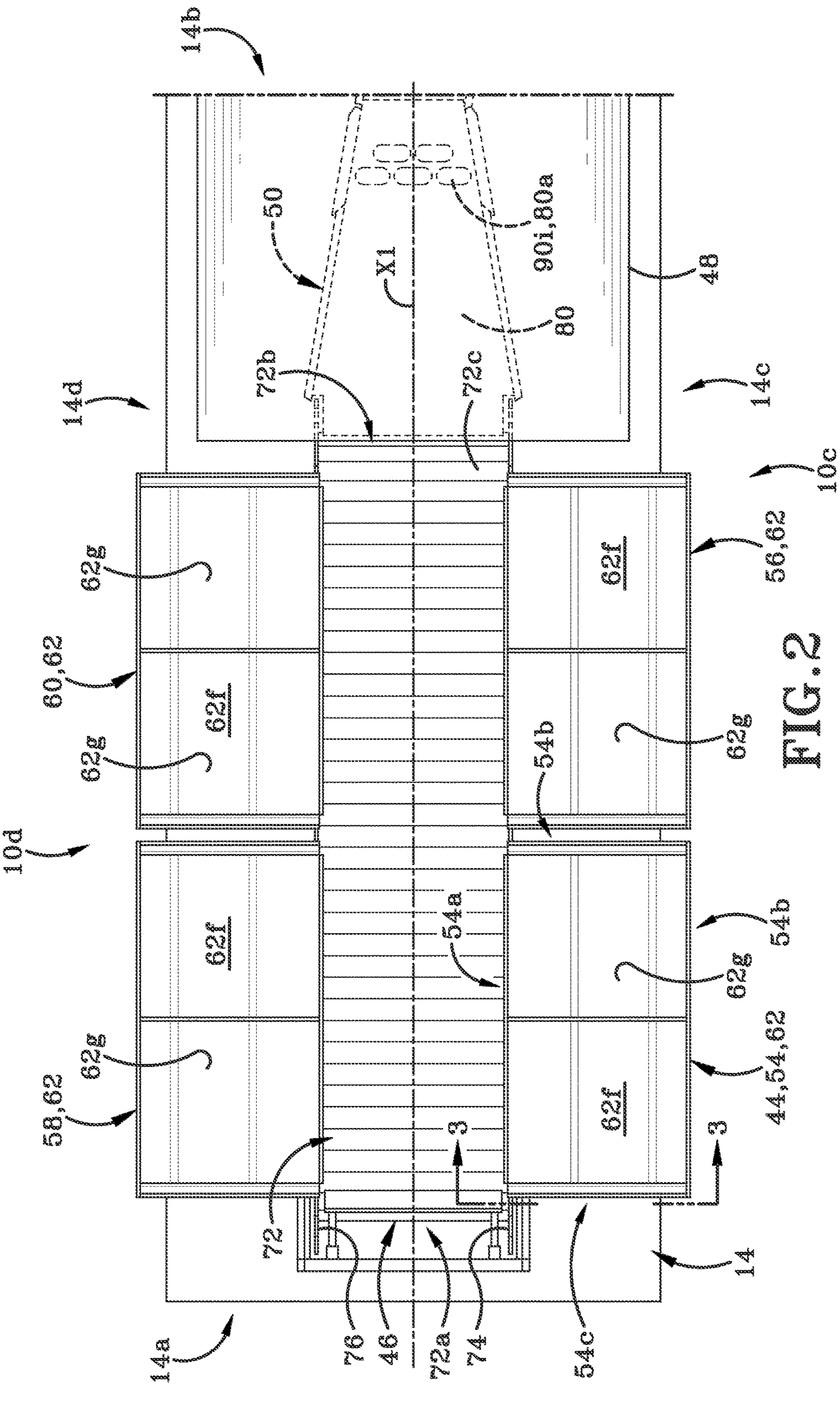
FIG. 2 is a top plan view of FIG. 1B.
Figure 15:
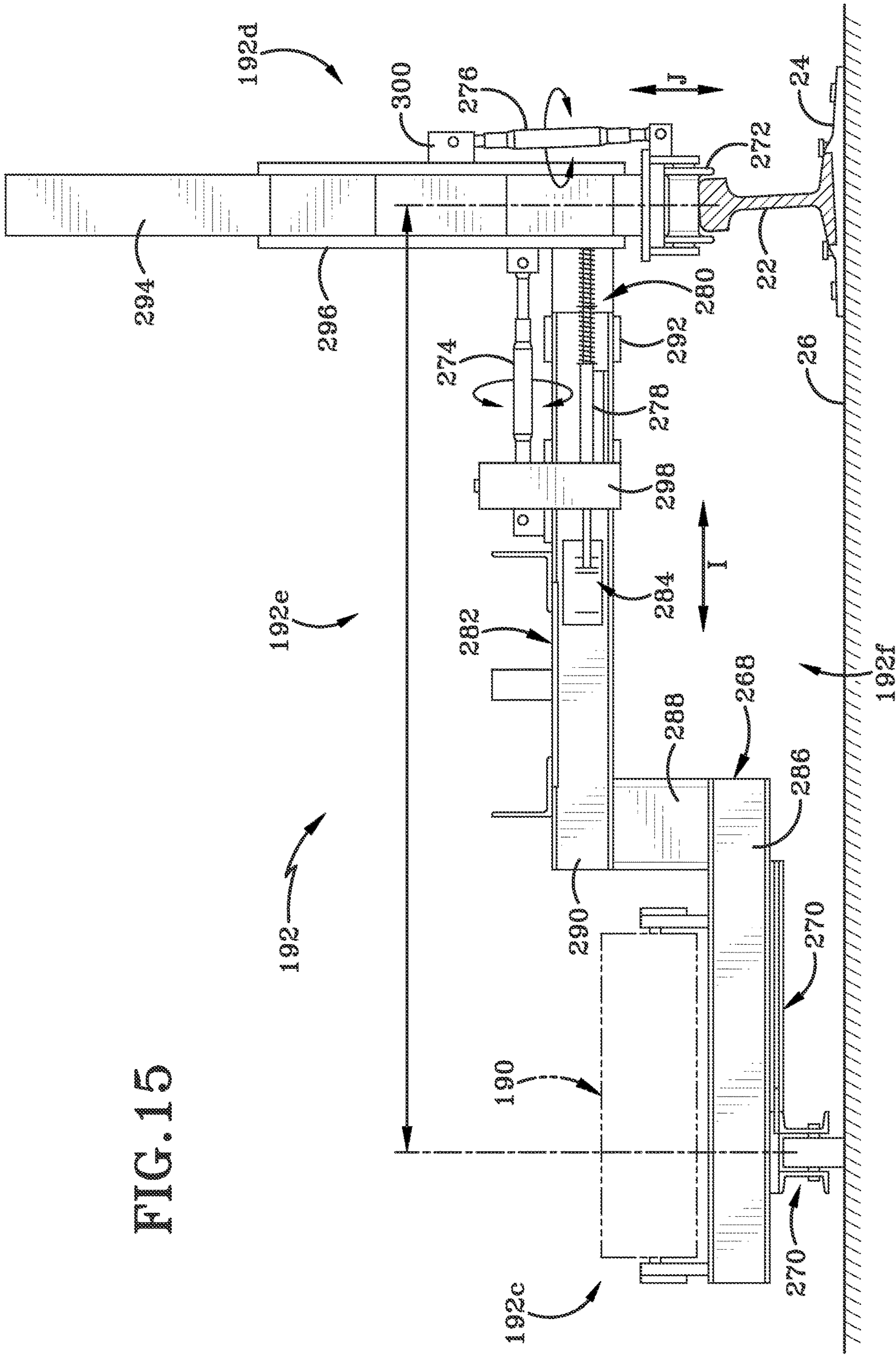
FIG. 15 is a rear end elevation view of a conveyor support trolley assembly.

With primary reference to FIG. 1D and FIG. 15, the conveyor support trolley assembly 192 includes a front end 192*a*, a rear end 192*b*, a first side 192*c*, a second side 192*d*, a top 192*e*, and a bottom 192*f*. The conveyor support trolley assembly 192 includes a trolley frame 268, a roller assembly 270, a guide wheel 272, a first adjustment assembly 274, a second adjustment assembly 276, an indicator 278, a tension assembly 280, a tie plate box 282, and indicia 284.

In one embodiment, the frame 268 includes a transversely extending first support member 286, a vertically extending second support member 288, a transversely extending third support member 250, a transversely extending sleeve 252, a vertically extending fourth support member 254, and a vertically extending sleeve 256. In one embodiment, the transversely extending first support member 286 is connected to the vertically extending second support member 288, and the vertically extending second support member 288 is connected to the transversely extending third support member 250. The roller assembly 270 is connected to a bottom of the transversely extending first support member 286. The conveying mechanism 262 of the fifth conveyor assembly 190 is connected to a top of the transversely extending first support member 286. The transversely extending third support member 250 is operably connected to the transversely extending sleeve 252 such that the transversely extending first support member 286, the vertically extending second support member 288, the transversely extending third support member 250, the roller assembly 270, and the conveying mechanism 262 are moveable in the directions indicated by arrow "I". Specifically, the first adjustment assembly 274 is operably connected to the transversely extending third support member 250 via a mount 258. In one embodiment, the first adjustment assembly 274 is a turnbuckle that rotates to vary the movement in the directions indicated by arrow "I". This movement may adjust a distance "D1" between the rail 22 and a roller 270*a* of the roller assembly 270. In one embodiment, the distance "D1" is dependent upon the size of the tie plate 24 that is being placed on the railroad ties 26. In one embodiment, the indicia 284 may indicate various positions that the transversely extending third support member 250 needs to be located for placement of various size tie plates 24. The indicator 278 is operably connected to the tension assembly 280 and the indicator 278 is configured to indicate a correct position by aligning the indicator 278 with the indicia 284 for a particular size plate. In one embodiment, the plate box 282 is mounted above the indicia 284 to indicate whether the indicia 284 are accurately placed.

In one embodiment, the indicia 284 are operatively engaged with the third support member 250 and the indicia 284 may indicate a desired tie plate setting. In one embodiment, the desired tie plate setting includes a plurality of tie plate settings. The first adjustment assembly 274 may move the third support member 250 in the transverse direction relative to one of the plurality of tie plate settings. In one example, the first adjustment assembly 274 may adjust the distance "D1" between the rail 22 and a roller 270*a* of the roller assembly 270. In one embodiment, the plurality of tie plate settings may correspond to a first size of a first railroad tie plate 24 and another of the plurality of tie plate settings may correspond to a second size of a second railroad tie plate 24. The first size and second size are not the same. In one embodiment, the first size of the first railroad tie plate 24 is a first length measured from a first side of the first railroad tie plate 24 to a second side thereof. The second size of the second railroad tie plate 24 is a second length measured from a first side of the second railroad tie plate 24 to a second side thereof. The size of the railroad tie plates 24 is more fully described below. In one embodiment, the moveable indicator 278 is operatively engaged with third support member 250 and the indicator 278 may indicate a correct indicia setting. In one embodiment, the correct indicia setting includes a plurality of correct indicia settings. One of the plurality of correct indicia settings may correspond to the first size of the first railroad tie plate 24 and another of the plurality of correct indicia settings may correspond to the second size of the second railroad tie plate 24.

In one embodiment, the transversely extending sleeve 252 is connected to the vertically extending sleeve 256. The vertically extending sleeve 256 is operably connected to the vertically extending fourth support member 254. The guide wheel 272 is operably connected to a bottom of the vertically extending fourth support member 254. The vertically extending fourth support member 254 is operably connected to the vertically extending sleeve 256 such that the vertically extending fourth support member 254 and the guide wheel 272 are moveable in the directions indicated by arrow "J". Specifically, the second adjustment assembly 276 is operably connected to the vertically extending fourth support member 254 via a mount 300. In one embodiment, the second adjustment assembly 276 is a turnbuckle that rotates to vary the movement in the directions indicated by arrow "J". This movement may adjust a distance "D2" between the rail and the guide wheel 272.

In operation, and with reference to FIG. 1A through FIG. 19, machine 10 may retrieve and place tie plates 24 along the first side 10*c* of machine 10 where the rail 22 has been lifted or removed. Therefore, in this embodiment, the wheels 20 are configured to engage the rail 22 while the crawlers 28 are configured to travel over the railroad ties 26 or proximate the railroad ties 26 where the rail 22 has been lifted or removed.

An operator (not shown) may sit in the operator chair 36 and control material handler 38. Material handler 38 is manipulated by the operator to retrieve a plurality of tie plates 24 from an area proximate first base frame 12. Specifically, the operator may utilize the transfer mechanism 38*e*, which may be an electromagnet, to retrieve tie plates 24 and place them in one of first hopper assembly 54, the second hopper assembly 56, the third hopper assembly 58, or the fourth hopper assembly 60. Although the operator may place tie plates 24 in any of first hopper assembly 54, the second hopper assembly 56, the third hopper assembly 58, or the fourth hopper assembly 60, the operation will be further described as if tie plates 24 were placed in first hopper assembly 54.

With primary reference to FIG. 3, an operator may transfer tie plates 24 from first hopper assembly 54 to the first conveyor assembly 46. Specifically, the operator may actuate the first moveable cylinder 64 and the second moveable cylinder 66 to pivot hopper 62 about the pivot axis $X_p$. This rotation causes hopper 62 to dump tie plates 24 onto the conveying mechanism 72 of the first conveyor assembly 46. The conveying mechanism 72 may transfer tie plates 24 longitudinally rearward toward the vibration plate feeder assembly 50.

Figure 16:
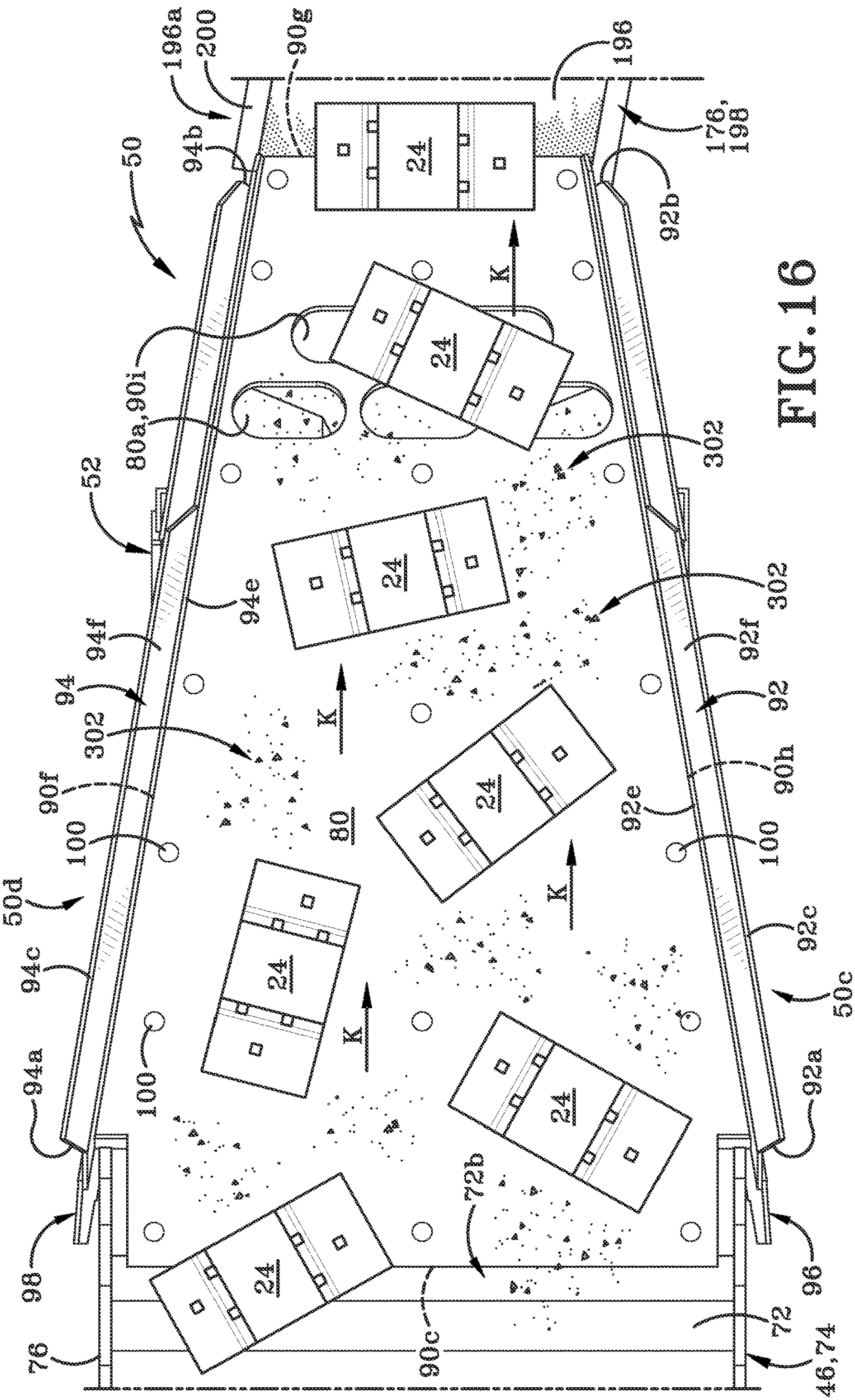
FIG. 16 is an enlarged top plan view of the vibration plate feeder assembly showing railroad tie plates moving from a first conveyor assembly to the vibration plate feeder assembly to a second conveyor assembly.

With primary reference to FIG. 16, the conveying mechanism 72 may drop tie plates 24 on the vibration plate feeder assembly 50 via gravity. The at least one translation assembly 84 may cause the central frame 90 and the plate receiving surface 80 to move in various directions. More particularly, and in one embodiment, the at least one translation assembly 84 is a motor having an offset or cammed head that imparts vibrational motion to the central frame 90, and thereby in turn, to the plate receiving surface 80. The at least one tension assembly 86 may allow the central frame 90 and, in turn, the plate receiving surface 80, to move in a restricted manner. The restricted movement of the central frame 90, and, in turn, the plate receiving surface 80, causes tie plates 24, and any waste 302 that was picked up by material handler 38 and dumped by first hopper assembly 54, to move along the plate receiving surface 80. In particular, the tie pates 24 and any waste 302 move vertically downward at an angle in a controlled manner toward the apertures 80*a*, 90*i* as generally indicated by arrow "K" (FIG. 16). While tie plates 24 are moving down the plate receiving surface 80, an operator may orient and singulate tie plates 24 to be transferred to the second conveyor assembly 176.

Figure 17:
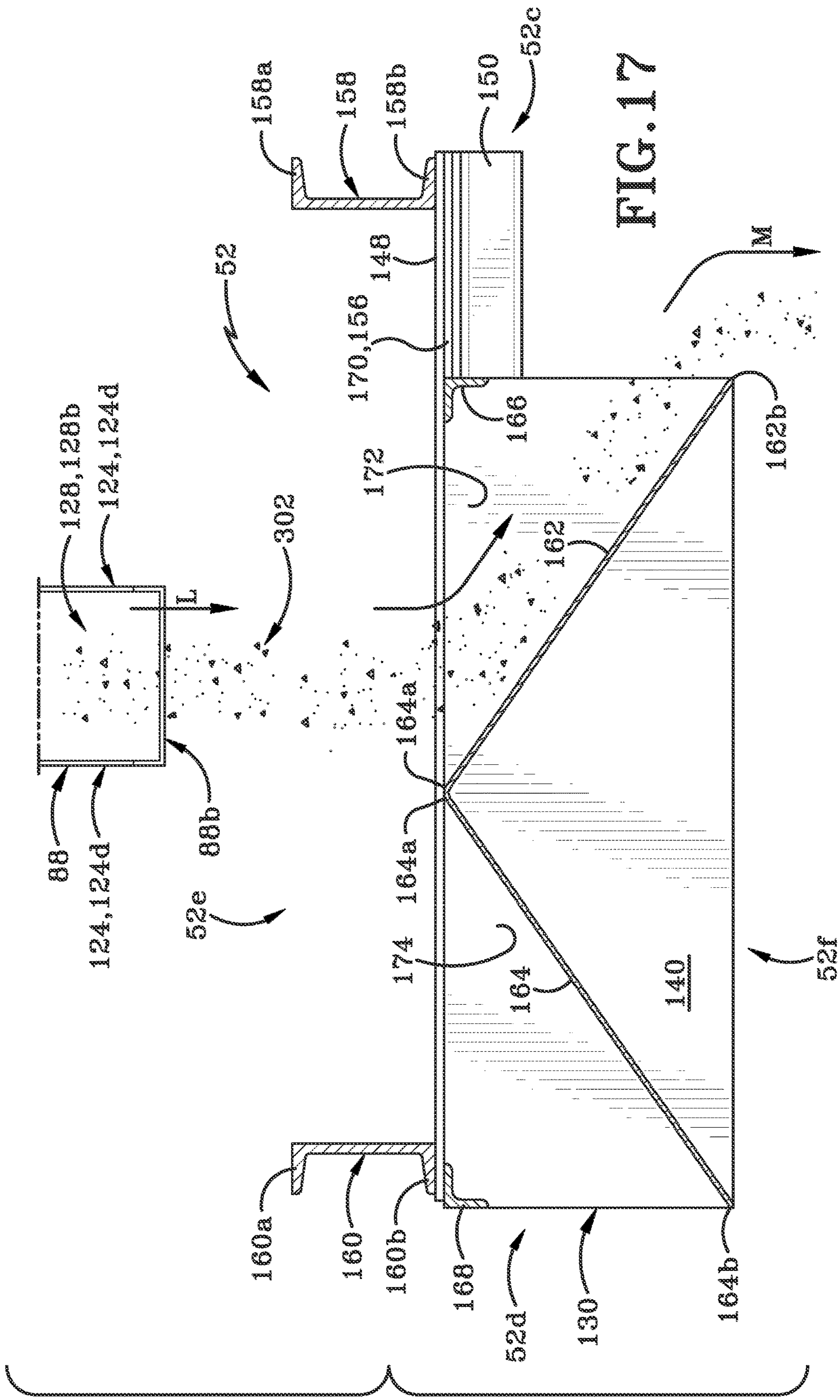
FIG. 17 is an operational view of FIG. 9 showing debris falling through a waste transfer mechanism and being deflected.

With primary reference to FIG. 17, the waste 302 may fall through the apertures 80*a*, 90*i* and down the waste transfer mechanism 88 towards the material deflector assembly 52 in a general direction indicated by arrow "L". In this embodiment, the angled first deflecting surface 162 and the first cavity 172 are aligned under the bottom end 88*b* of the waste transfer mechanism 88. As shown in FIG. 17, as the waste/debris 302 falls through the apertures 80*a*, 90*i*, the waste/debris 302 is deflected towards the first side 10*c* of machine 10 in a general direction indicated by arrow "M".

As stated above, as tie plates 24 are moving down the plate receiving surface 80, an operator may orient and singulate tie plates 24 to be transferred to the second conveyor assembly 176 that is positioned vertically below the vibration plate feeder assembly 50.

Figure 18:
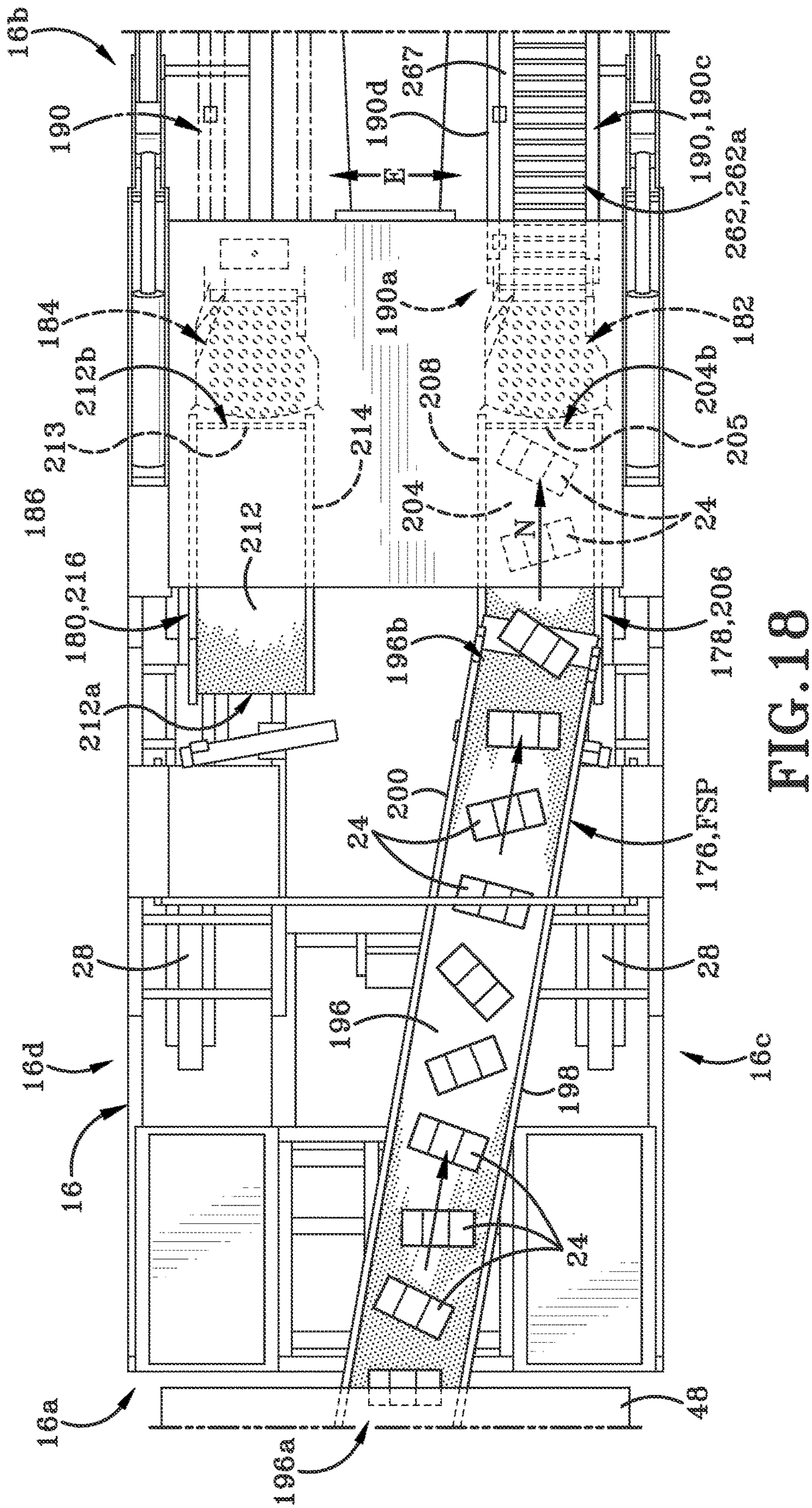
FIG. 18 is an operational view of FIG. 10 showing railroad tie plates moving from the second conveyor assembly to a third conveyor assembly.

With primary reference to FIG. 18, the second conveyor assembly 176 may transfer the tie plates 24 along the conveying mechanism 196 to the third conveyor assembly 178. The second conveyor assembly 176 is at an incline and tie plates 24 are transferred to the third conveyor assembly 178 via gravity because the third conveyor assembly 178 is positioned vertically below the second conveyor assembly 176. The conveying mechanism 204 of the third conveyor assembly 178 conveys tie plates 24 over the transfer bar 205 in a general direction indicated by arrow "N" towards the first ball transfer table assembly 182. In one example, the transfer bar 205 prevents tie plates 24 from falling off of the conveying mechanism 204 and facilitates transfer of tie plates 24 to the first ball transfer table assembly 182.

Figure 19:
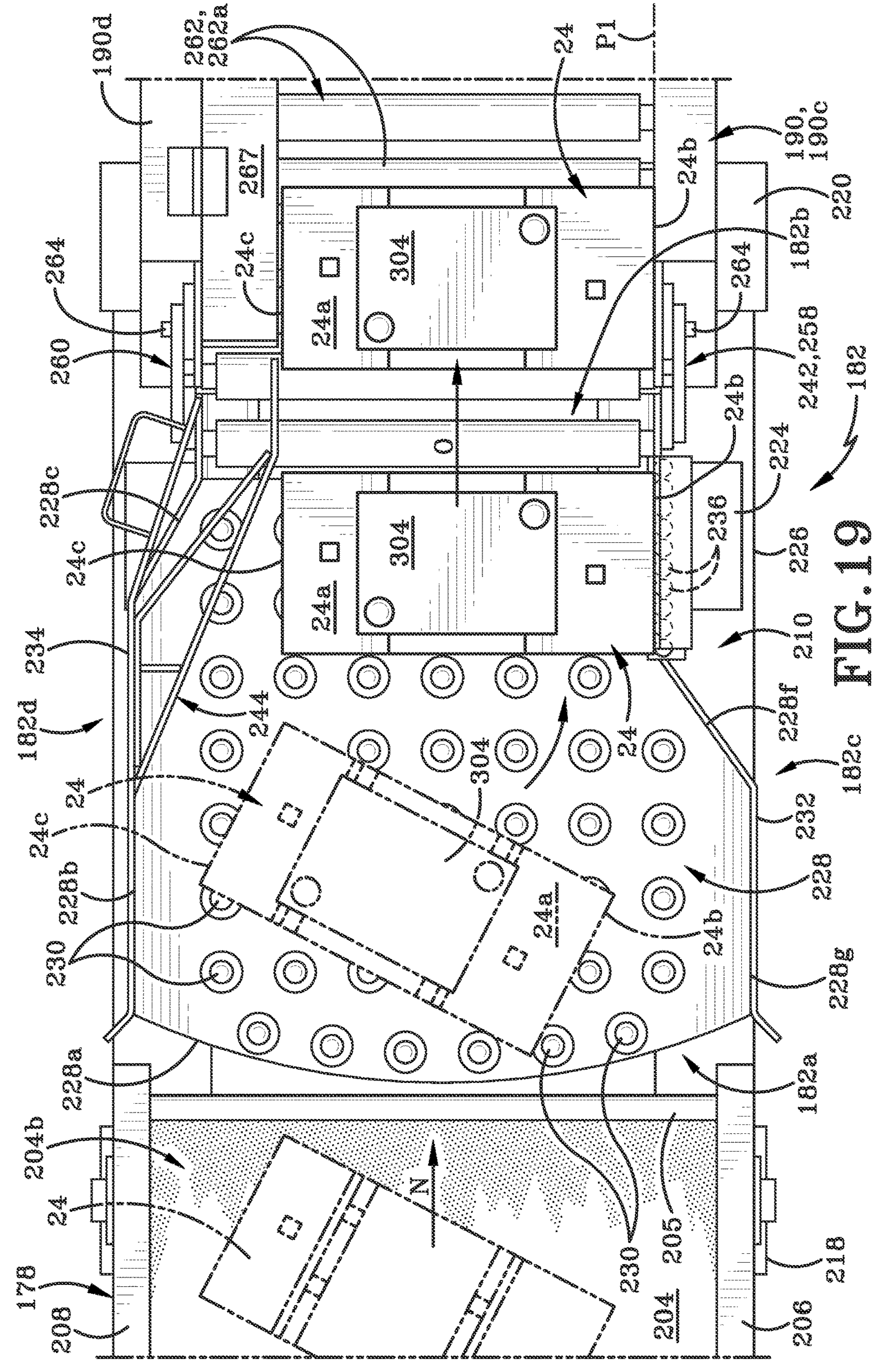
FIG. 19 is a top plan view of FIG. 11 showing the railroad tie plates being oriented on the ball transfer table assembly and placed on a fifth conveyor assembly.
Figure 19A:
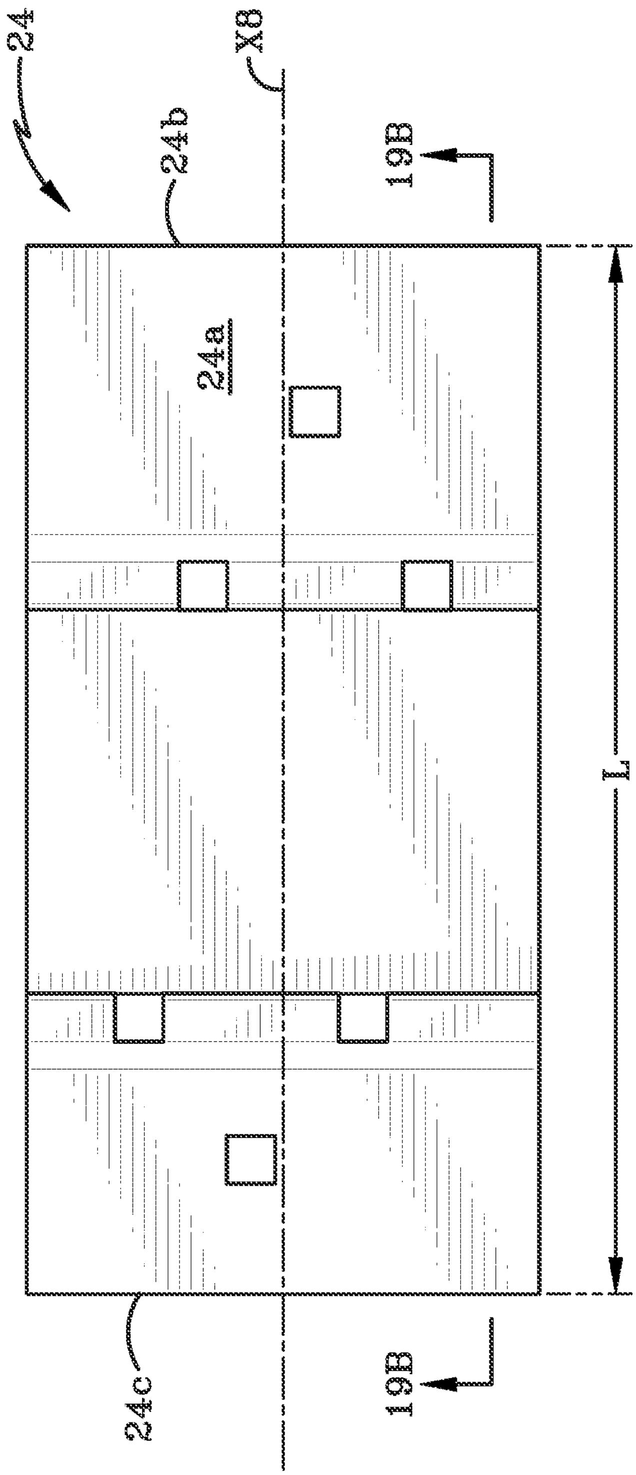
FIG. 19A is a top plan view of a conventional railroad tie plate.
Figure 19B:
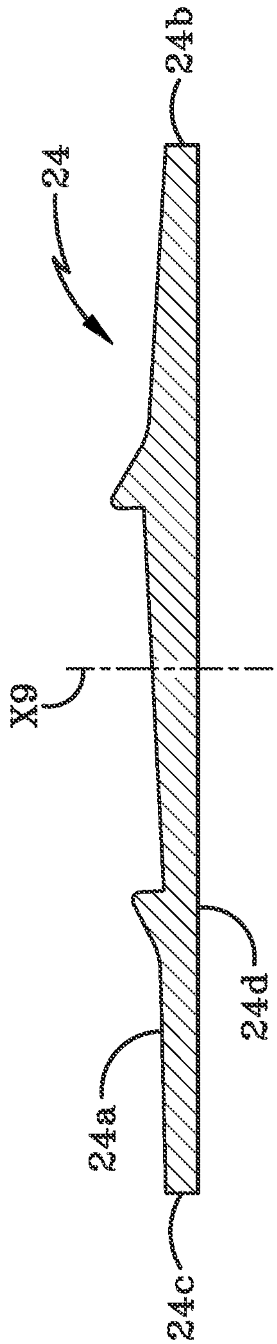
FIG. 19B is a cross-sectional view of the tie plate taken generally about line 19B-19B in FIG. 19A.

With primary reference to FIG. 19, an operator (not shown) standing proximate to the first ball transfer table assembly 182 may utilize an orienting device 304 to orient tie plates 24 to a desired orientation. In one example, and with reference to FIG. 19A and FIG. 19B, the desired orientation of the tie plate 24 may be related a top surface 24*a*, a first side 24*b*, a second side 24*c*, a bottom surface 24*d*, a central horizontal axis X8, and a central vertical axis X9 of tie plate 24. The first side 24*b* may also be referred to as "field side" and the second side 24*c* may also be referred to as "gauge side." In one embodiment, the size of tie plates 24 may correspond to a length L (FIG. 19A) measured from the first side 24*b* of the railroad tie plate 24 to the second side 24*c* of the railroad tie plate 24.

As such, and in one example, the orienting of tie plates 24 may be accomplished by utilizing the orienting device 304 to move tie plates 24 over the plurality of transfer mechanisms 230. The operator may move tie plates 24 such that the top surface 24*a* thereof is facing vertically upward. In this orientation, the first side 24*b* or the second side 24*c* of the tie plate 24 contacts the alignment mechanisms 236 at a tangential surface of the alignment mechanisms 236 and align tie plates 24 along the tangential plane P1.

Further, and in one example, the desired orientation is based, at least in part, on whether the machine is laying tie plates 24 proximate the first side 10*c* or the second side 10*d* of machine 10. For example and with reference to FIG. 19, if machine 10 is laying tie plates 24 proximate the first side 10*c* of machine 10, the top surface 24*a* faces vertically upward and the first side 24*b* of the tie plate 24 contacts the alignment mechanisms 236. In the event machine 10 is laying tie plates 24 on the second side of machine 10, the top surface 24*a* would be facing vertically upward and the second side 24*c* would contact the alignment mechanisms 236.

Tie plates 24 are conveyed over the transfer roller 245 in a general direction indicated by arrow "O" to the fifth conveyor assembly 190. It should be noted that in FIG. 19, the insert 244 is included and, therefore, the first ball transfer table assembly 182 has a first exit width $W_3$. Further, as shown in FIG. 19, the hinged insert 267 is deployed such that the hinged insert 267 is parallel to the ball mounting plate 228 and, therefore, the fifth conveyor assembly 190 has a first entry width $W_5$.

The fifth conveyor assembly 190 may convey tie plates 24 vertically downward at an angle to be placed by the placing mechanism 194. The placing mechanism 194 may precisely place tie plates 24 in a similar manner to the manner described in U.S. Pat. No. 8,220,397, which is incorporated herein by reference.

Also, various inventive concepts may be embodied as one or more methods, of which an example has been provided. The acts performed as part of the method is ordered in any suitable way. Accordingly, embodiments may be constructed in which acts are performed in an order different than illustrated, which includes performing some acts simultaneously, even though shown as sequential acts in illustrative embodiments.

Figure 20:
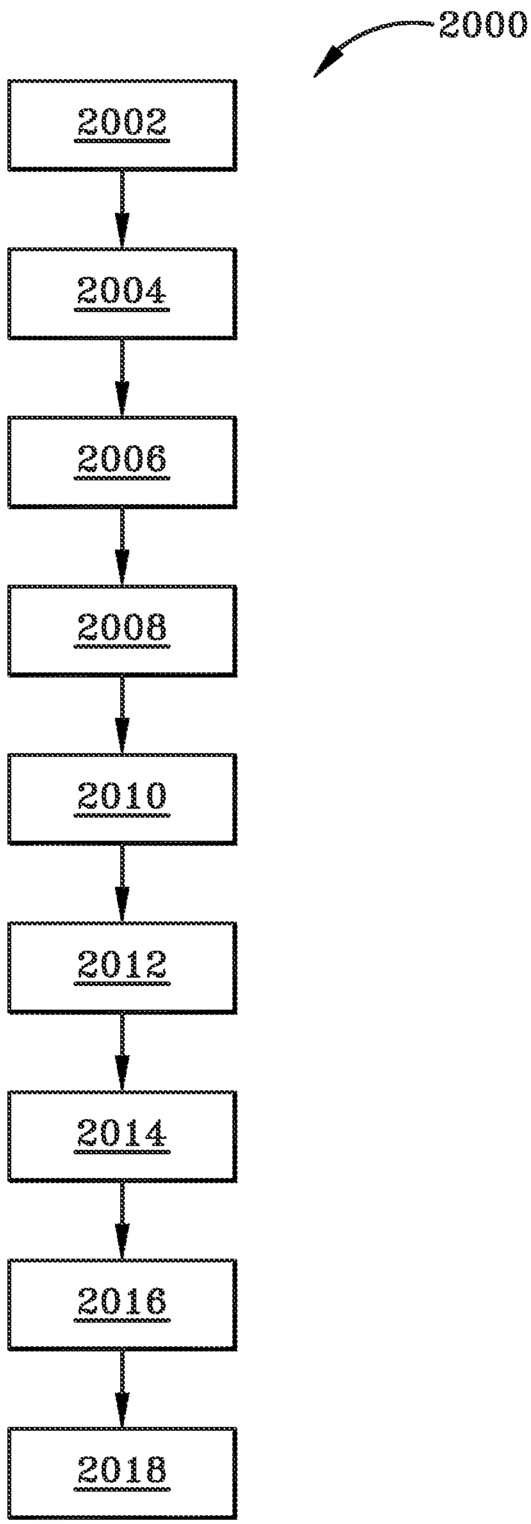
FIG. 20 is a flow chart of one method or process in accordance with the present disclosure.

FIG. 20 depicts an exemplary method or process of retrieving and precisely placing tie plates 24 generally at 2000. The method 2000 includes placing at least one railroad tie plate 24 in at least one hopper assembly 44, which is shown generally at 2002. The method 2000 includes transferring the at least one railroad tie plate 24 from the at least one hopper assembly 44 to a first conveyor assembly 46, which is shown generally at 2004. The method 2000 includes conveying the at least one rail road tie plate 24 from the first conveyor assembly 46 to a vibration plate feeder assembly 50, which is shown generally at 2006. The method 2000 includes conveying the at least one railroad tie plate 24 from the vibration plate feeder assembly 50 to a second conveyor assembly 176, which is shown generally at 2008. The method 2000 includes conveying the at least one railroad tie plate 24 from the second conveyor assembly 176 to a ball transfer table assembly 182, 184, which is shown generally at 2010. The method 2000 includes orienting the at least one railroad tie plate 24 to a desired orientation, which is shown generally at 2012. The method 2000 includes transferring the at least one railroad tie plate 24 from the ball transfer table assembly 182, 184, to a third conveyor assembly 178, 180, which may also be referred to as an intermediate conveyor assembly 178, 180, which is shown generally at 2014. The method 2000 includes conveying the at least one railroad tie 24 from the third conveyor assembly 178, 180 to a tie plate placing mechanism 194, which is shown generally at 2016. The method 2000 includes placing the at least one railroad tie plate 24 on a railroad tie 26, which is shown generally at 2018.

In accordance with one aspect of the present disclosure, another exemplary method or process of retrieving and precisely placing tie plates 24 is described herein. The method includes placing at least one railroad tie plate 24 in at least one hopper assembly 44. The method includes transferring the at least one railroad tie plate 24 from the at least one hopper assembly 44 to a first conveyor assembly 46. The method includes conveying the at least one rail road tie plate 24 from the first conveyor assembly 46 to a vibration plate feeder assembly 50. The method includes vibrating the vibration plate feeder assembly 50 to convey the at least one railroad tie plate 24 from the vibration plate feeder assembly 50 to the second conveyor assembly 176. The method includes separating waste/debris 302 from the at least one railroad tie plate 24. In one example, this is accomplished by vibrating the vibration plate feeder assembly 50 such that the at least one railroad tie plate 24 and any waste/debris 302 travels along the inclined plate receiving surface 80 of the vibration plate feeder assembly 50 and over the apertures 80*a*, 90*i*. The apertures 80*a*, 90*i* are sized such that the at least one railroad tie plate 24 passes over the apertures 80*a*, 90*i* while any waste/debris 302 falls through the apertures 80*a*, 90*i* to the waste transfer mechanism 88. The method includes deflecting the waste/debris 302 with a material deflector assembly 52. The material deflector assembly 52 is configured to deflect the waste/debris 302 towards the first side 10*c* of machine 10 or the second side 10*d* of machine 10. For example if machine 10 is laying tie plates 24 proximate the first side 10*c* of machine 10, the material deflector assembly 52 is configured such that the angled first deflecting surface 162 and the first cavity 172 are aligned under the bottom end 88*b* of the waste transfer mechanism 88 and the waste/debris 302 is deflected towards the first side 10*c* of machine 10. In another example, if machine 10 is laying tie plates 24 proximate the second side 10*d* of machine 10, the material deflector assembly 52 is configured such that the angled second deflecting surface 164 and the second cavity 174 are aligned under the bottom end 88*b* of the waste transfer mechanism 88 and the waste/debris 302 is deflected towards the second side 10*d* of machine 10. The method may include uprighting the at least one railroad tie plate 24 on the vibration plate feeder assembly 50. For example an operator may upright the at least one railroad tie plate 24 as the at least one railroad tie plate 24 travels down the plate receiving surface 80 of the vibration plate feeder assembly 50 by rotating each of the at least one railroad tie plate 24 about the central horizontal axis X8 extending from the first side 24*b* to the second side 24*c* of the tie plate 24. In one example, the at least one railroad tie 24 includes a plurality of railroad tie plates 24 and the method may further include singulating the plurality of railroad tie plates. For example an operator may singulate the plurality of railroad tie plates 24 as the plurality of railroad tie plates 24 travel down the plate receiving surface 80 of the vibration plate feeder assembly 50. The method includes moving the second conveyor assembly 176 to be in operable communication with either the third conveyor assembly 178 or the fourth conveyor assembly 180 with the boom 188. For example if machine 10 is laying tie plates 24 proximate the first side 10*c* of machine 10, the second conveyor assembly 176 is in operable communication with the third conveyor assembly 178 and if the if machine 10 is laying tie plates 24 proximate the second side 10*d* of machine 10, the second conveyor assembly 176 is in operable communication with the fourth conveyor assembly 180. If the second conveyor assembly 176 is in operable communication with the third conveyor assembly 178, the method includes conveying the at least one railroad tie plate 24 from the third conveyor assembly 178 to the first ball transfer table assembly 182. If the second conveyor assembly 176 is in operable communication with the fourth conveyor assembly 180, the method includes conveying the at least one railroad tie plate 24 from the fourth conveyor assembly 180 to the second ball transfer table assembly 184. The method includes selecting a desired orientation of the at least one railroad tie plate 24. As stated above the desired orientation of the at least one tie plate 24 is selected based on the top surface 24*a* of the at least one railroad tie plate 24 facing vertically upward and the first side 24*b* or the second side 24*c* of the tie plate 24 contacts the alignment mechanisms 236 at a tangential surface of the alignment mechanisms 236 to align tie plates 24 along the tangential plane P1. The method includes orienting the at least one railroad tie plate 24 based on the selected orientation. In one example, the orienting is accomplished by rotating each of the plurality of tie plates about the central vertical axis X9 extending from the bottom surface 24*d* to the top surface 24*a* of the tie plate 24 such that the second side 24*c*, or the gauge side, of each of the plurality of tie plates 24 is closer to the central longitudinal axis X1 of the machine 10 than is the first side 24*b*, or the field side, of each of the plurality of tie plates 24. The method includes aligning the first side 24*b* or the second side 24*c* of the at least one railroad tie plate 24 with the alignment mechanisms 236. The method includes selecting an exit width such as a first exit width $W_3$ or a second exit width $W_4$, of the ball first transfer table assembly 182 or the second ball transfer assembly 184 based on the size of the at least one railroad tie plate 24. The method includes moving the fifth conveyor assembly 190 to be in operable communication with the first ball transfer table assembly 182 or the second ball transfer table assembly 184 with the boom 188. For example if machine 10 is laying tie plates 24 proximate the first side 10*c* of machine 10, the fifth conveyor assembly 190 is in operable communication with the first ball transfer table assembly 182 and if the if machine 10 is laying tie plates 24 proximate the second side 10*d* of machine 10, the fifth conveyor assembly 190 is in operable communication with the second conveyor assembly 180. The method includes transferring the at least one railroad tie plate 24 from the first ball transfer table assembly 182 or the second ball transfer table assembly 184 to the fifth conveyor assembly 190. The method includes aligning the fifth conveyor assembly 190 with a placement path, which is designated by a distance "D1" between the rail 22 and a roller 270*a* of the roller assembly 270 of the conveyor support trolley 192. The distance "D1" is adjusted to accommodate placing various sized railroad tie plates 24. The method includes placing the at least one railroad tie plate 24 on a railroad tie 26.

In accordance with one exemplary embodiment, and with primary reference to FIG. 21-FIG. 27, the second cab 48 and the vibration plate feeder assembly 50 may be replaced by a singulating system 11. As stated above, at least a portion of the conveying mechanism 72 extends within the second cab 48. However, instead of the conveying mechanism 72 extending within the second cab and above the vibration plate feeder assembly 50, the conveying mechanism extends above the singulating system 11. As such, the singulating system 11, which may also be referred to as a singulator, is positioned within the second cab 48. The singulating system 11 is configured to allow for tie plates 24 that are coming off the first conveyor assembly 46 to be fed rearwardly as more fully described below.

With continued reference to FIG. 21-FIG. 27, the singulating system 11 includes a front end 11*a*, a rear end 11*b*, a first side 11*c*, a second side 11*d*, a top 11*e*, a bottom 11*f*, a singulating frame 13, a front chute 15, a pickup assembly 17, a rear chute 19, and a control station 21.

The singulating frame 13 includes a plurality of support frame members 23. In one example, the singulating frame 13 includes a plurality of vertical support frame members 25 and a plurality of horizontal support frame members 27. The plurality of vertical support frame members 25 are engaged with the second base frame 14 such that one of the plurality of vertical support frame members 25 is positioned in a corner proximate the front end 11*a* and first side 11*c* of the singulating system 11, one of the plurality of vertical support frame members 25 is positioned in a corner proximate the front end 11*a* and second side 11*c* of the singulating system 11, one of the plurality of vertical support frame members 25 is positioned in a corner proximate the rear end 11*b* and first side 11*c* of the singulating system 11, and one of the plurality of vertical support frame members 25 is positioned in a corner proximate the rear end 11*a* and first side 11*c* of the singulating system 11.

Figure 24:
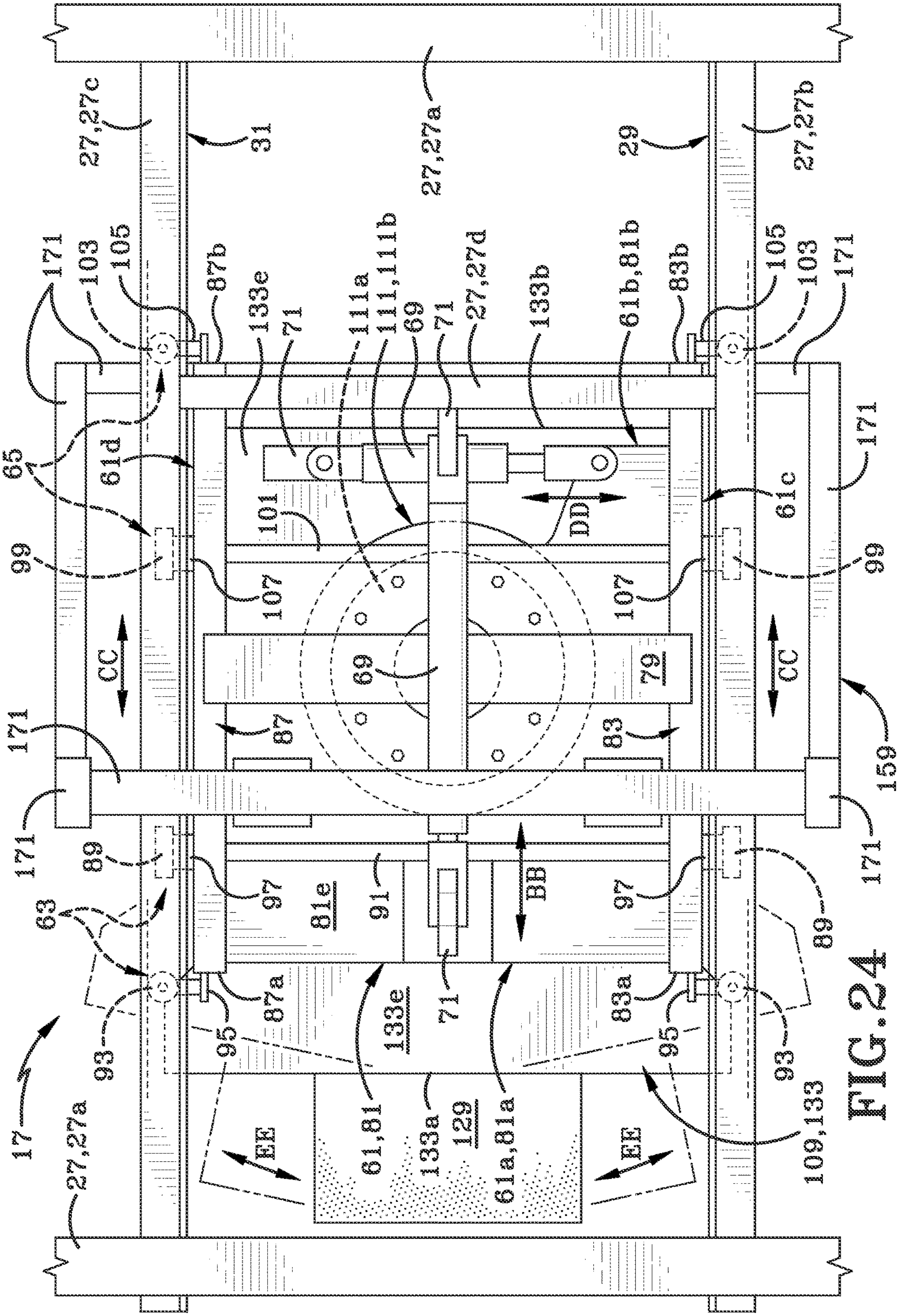
FIG. 24 is a top plan view of the singulating system and surrounding environment with parts of the singulating system removed for clarity.

With primary reference to FIG. 24, the plurality of horizontal support frame members 27 further include outer horizontal support frame members 27*a*, a first inner support frame member 27*b*, a second inner support frame member 27*c*, and a third inner support frame member 27*d*. The outer horizontal support frame members 27 are engaged with the plurality of vertical support frame members 25 such that one of the plurality of horizontal support frame members 27*b* extends transversely and connects the vertical support members 25 proximate the front end 11*a*, one of the plurality of horizontal support frame members 27*b* extends transversely and connects the vertical support members 25 proximate the rear end 11*b*, one of the plurality of horizontal support frame members 27*b* extends longitudinally and connects the vertical support members 25 proximate the first side 11*c*, and one of the plurality of horizontal support frame members 27*b* extends longitudinally and connects the vertical support members 25 proximate the second side 11*d*. As such, when viewed from the top 11*e*, the connection of the outer horizontal support frame members 27 to the vertical support frame members 25 forms a generally rectangular shape along a perimeter of the singulating frame 13.

With primary reference to FIG. 24, the first inner horizontal support frame member 27*b* and the second inner horizontal support frame member 27*c* are engaged with, and extend longitudinally between, the outer horizontal support frame member 27*a* positioned proximate the first end 11*a* and the outer horizontal support frame member 27*a* positioned proximate the second end 11*b*. The first inner support frame member 27*b* is positioned between the central longitudinal axis X1 and the first side 10*c* of the machine frame 10A. The second inner support frame member 27*c* is positioned between the central longitudinal axis X1 and the second side 10*d* of the machine frame 10A. The third inner support frame member 27*d* is engaged with, and extends transversely between, the first inner horizontal support frame member 27*b* and the second inner horizontal support frame member 27*c*.

Figure 25:
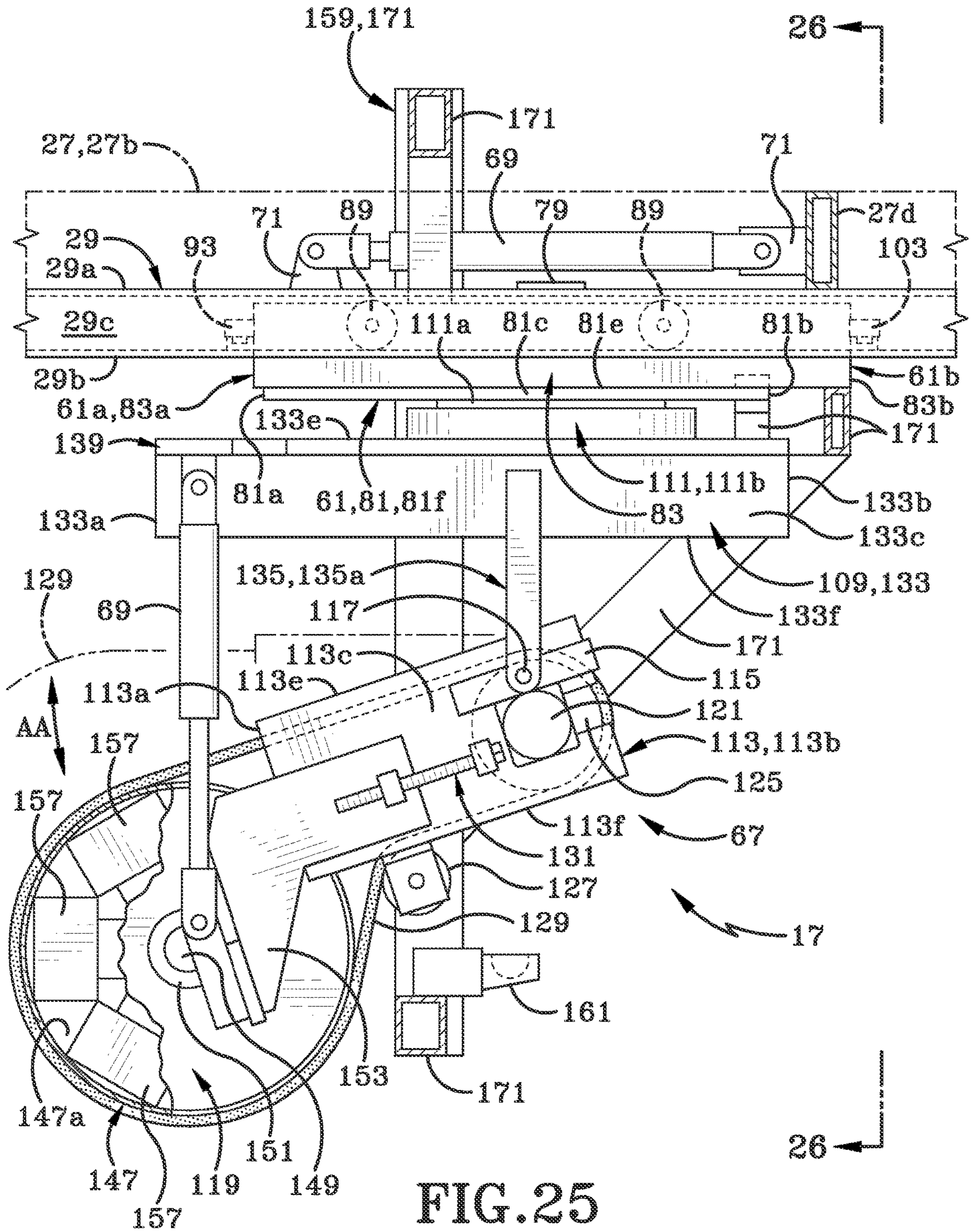
FIG. 25 is a side elevation view of a pickup assembly of the singulating system with parts of the singulating system removed for clarity.
Figure 26:
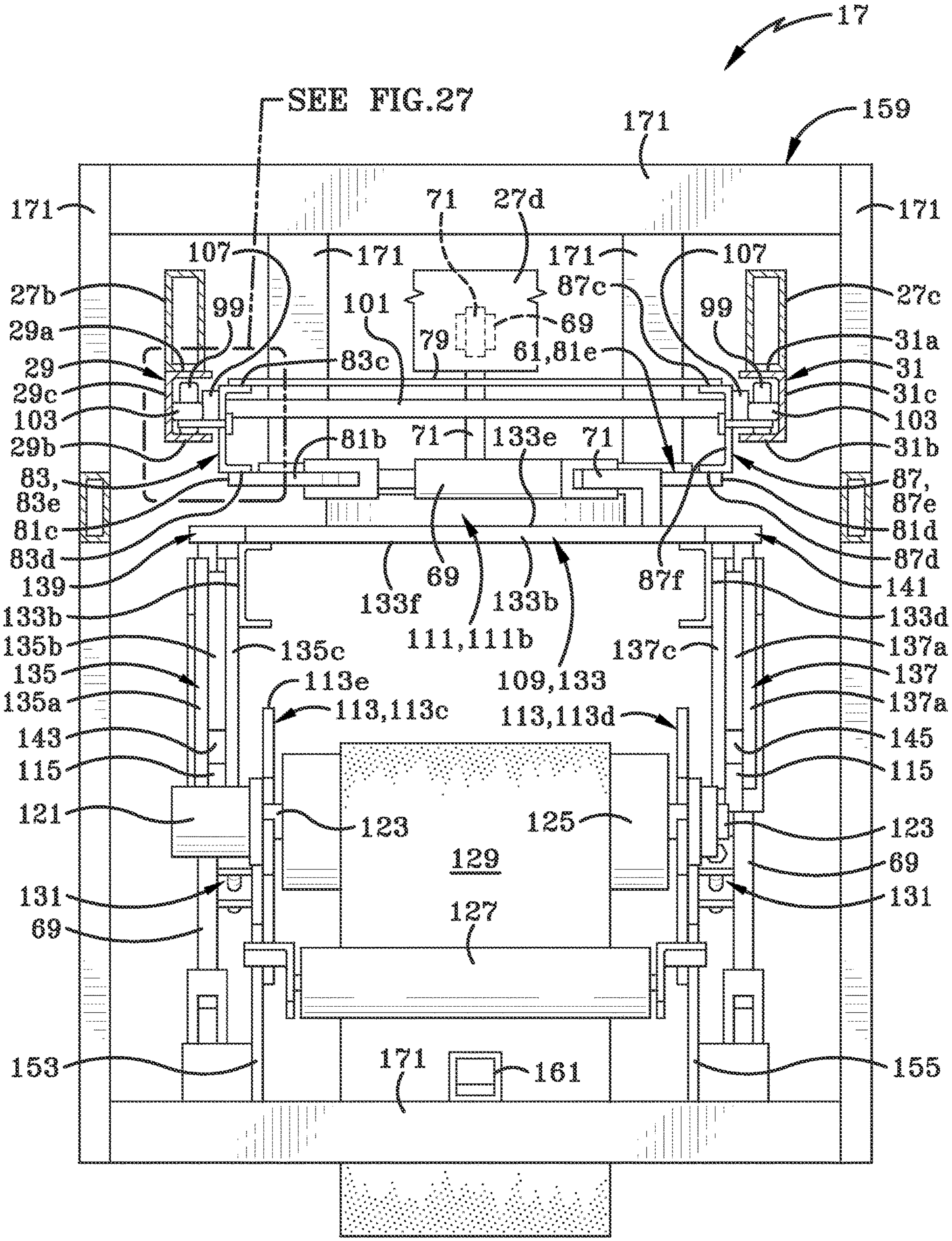
FIG. 26 is a rear elevation view taken along line 26-26 of FIG. 25.
Figure 27:
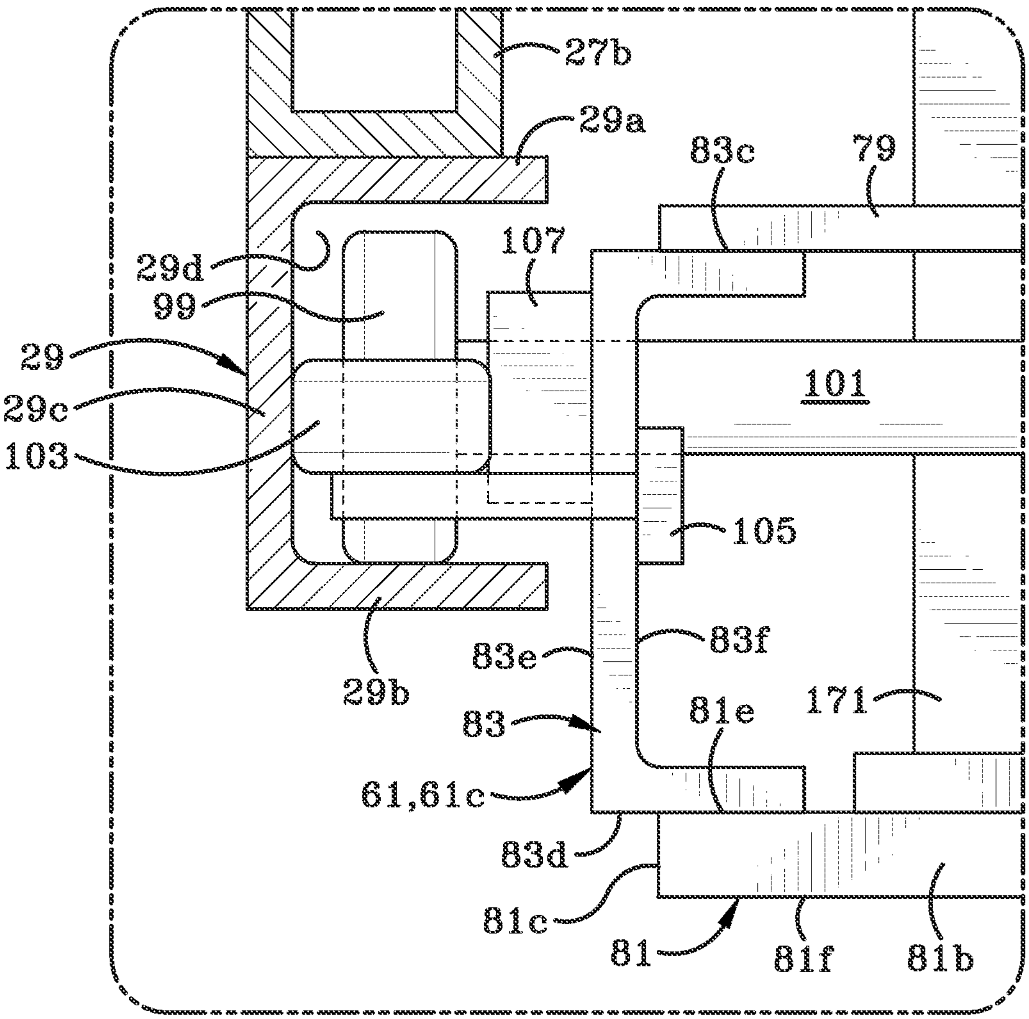
FIG. 27 is an enlarged partial view taken along the dashed box labeled SEE FIG. 27.

With primary reference to FIG. 25 and FIG. 26, the first inner horizontal support frame member 27*b* further includes a first wheel receiving channel 29. The first wheel receiving channel 29 is generally c-shaped and extends longitudinally along a length of the first inner horizontal support frame member 27*b*. The second inner horizontal support frame member 27*c* further includes a second wheel receiving channel 31. The second wheel receiving channel 31 is generally c-shaped and extends longitudinally along a length of the second inner horizontal support frame member 27*c*.

Figure 21:
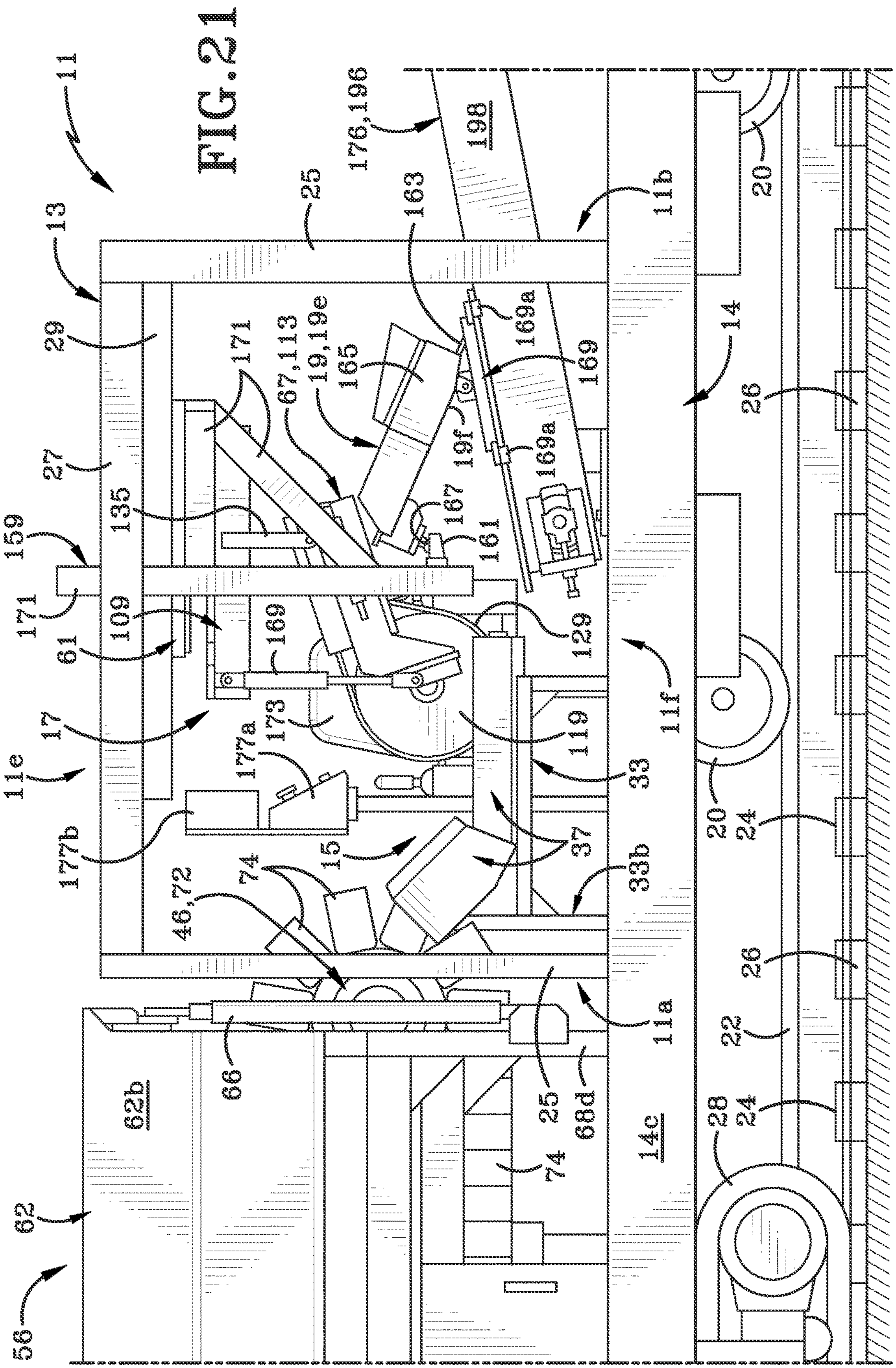
FIG. 21 is a side elevation view where the second cab and the vibration plate feeder assembly have been replaced by a singulating system in accordance with one aspect of the present disclosure.
Figure 22:
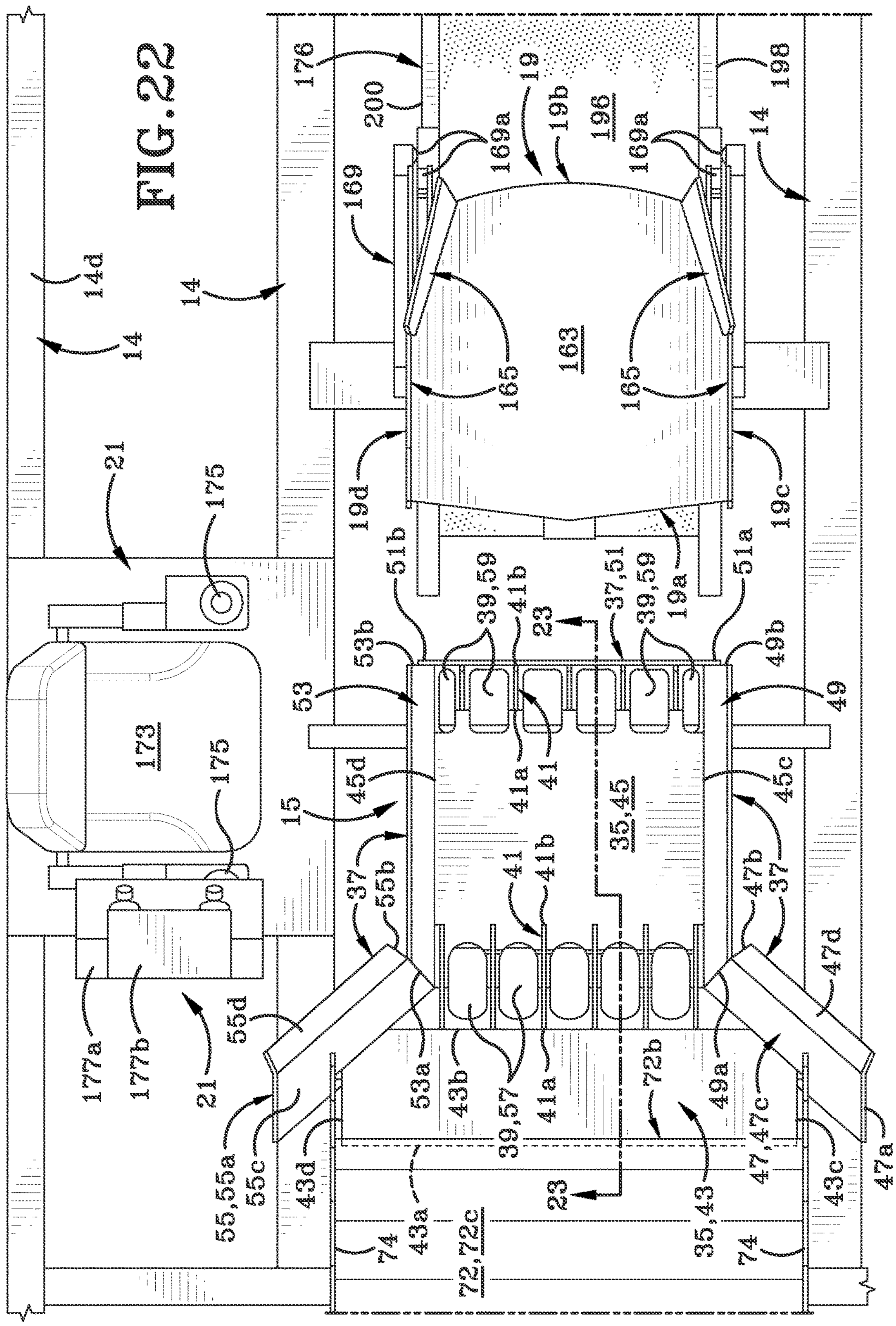
FIG. 22 is a top plan view of the singulating system and surrounding environment with parts of the singulating system removed for clarity.
Figure 23:
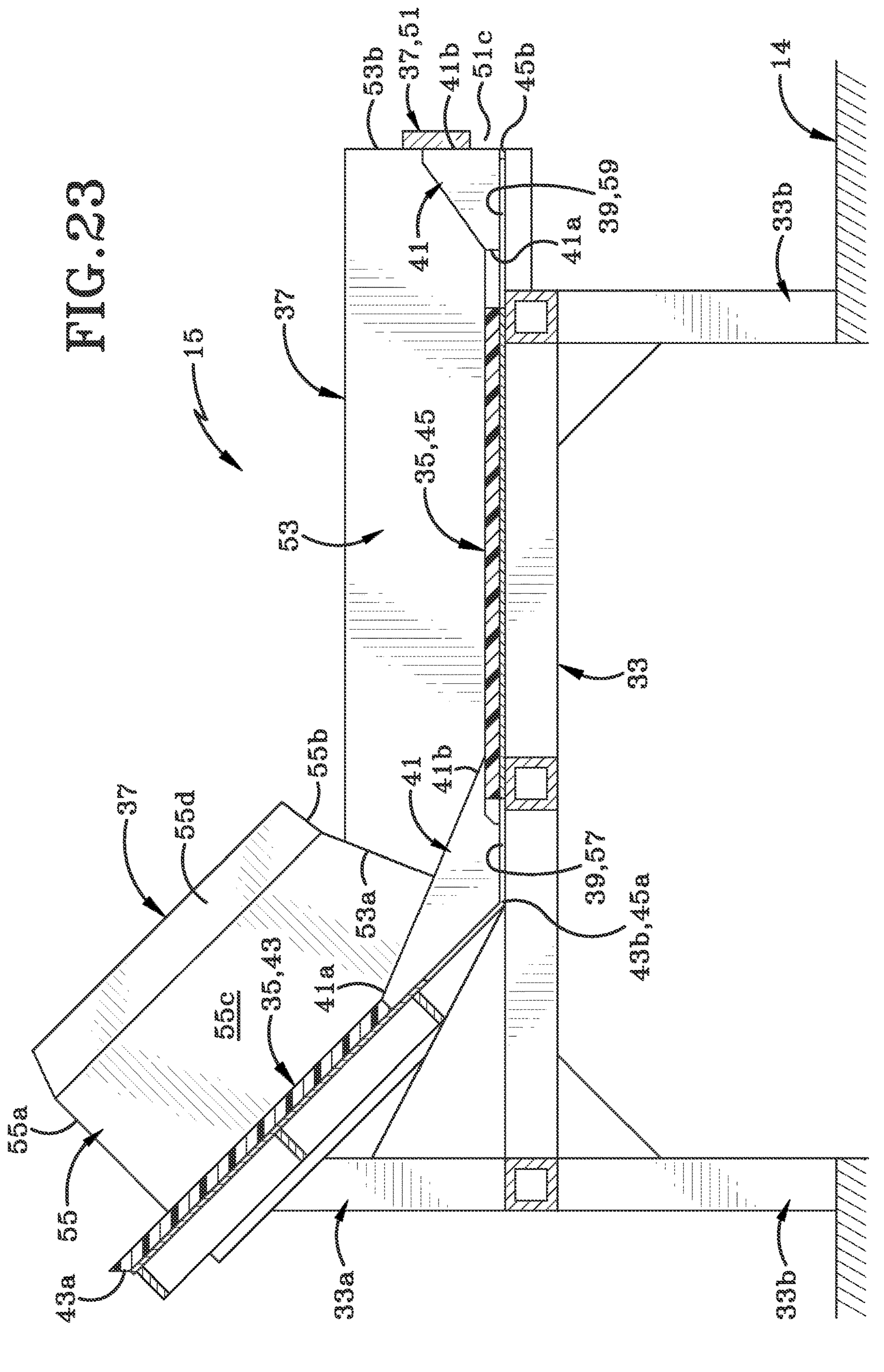
FIG. 23 is a partial section side view taken along line 23-23 of FIG. 22 with parts of the singulating system removed for clarity.

With primary reference to FIG. 21-FIG. 23, the front chute 15 includes a front chute support frame 33, a plate receiving area 35, a perimeter wall 37, a plurality of voids 39 defined in the plate receiving surface 35, and a plurality of rib members 41.

With primary reference to FIG. 23, the front chute support frame 33 includes a top portion 33*a* and a bottom 33*b* portion. The front chute support frame 33 is configured to support at least a portion of the plate receiving area 35. As such, the top portion 33*a* of the front chute support frame 33 is engaged with at least a portion of the plate receiving area 35 and the bottom portion 33*b* of the front chute support frame 33 is engaged with the second base frame 14. As shown in FIG. 23, the front chute support frame 33 may utilize support bars to support the plate receiving area 35 and engage the second base frame 14, however, the front chute support frame 33 may utilize any suitable support mechanism.

The plate receiving area 35 includes an angled portion 43, and a horizontal portion 45. The angled portion is generally pentagonal in shape and includes a front end 43*a*, a rear end 43*b*, a first side 43*c*, and a second side 43*d*. The horizontal portion 45 is generally square in shape and includes a front end 45*a*, a rear end 45*b*, a first side 45*c*, and a second side 45*d*. The front end 43*a* of the angled portion 43 is positioned proximate the second end 72*b* of the conveying mechanism 72 such that the angled portion 43 is in operable communication with the conveying mechanism 72. The angled portion 43 extends longitudinally downward at an angle from the front end 43*a* towards the rear end 43*b* and the rear end 43*b* meets the front end 45*a* of the horizontal portion 45. The angle may be any suitable angle.

The front end 45*a* of the horizontal portion 45 meets the rear end 43*b* of the angled portion 43. The horizontal portion 45 extends longitudinally from the front end 45*a* to the rear end 45*b* such that the horizontal portion 45 is in operable communication with the pickup assembly 17 as further described below.

With primary reference to FIG. 22 and FIG. 23, the perimeter wall 37 includes a first perimeter wall portion 47, a second perimeter wall portion 49, a third perimeter wall portion 51, a fourth perimeter wall portion 53, and a fifth perimeter wall portion 55.

The first perimeter wall portion 47 includes a front end 47*a*, a rear end 47*b*, a first section 47*c*, and a second section 47*d*. The first section 47*c* is engaged with at least a part of the first side 43*c* of the angled portion 43 and extends generally vertically upward. The second section 47*d* extends generally vertically upward at an angle relative to the first section 47*c* away from the central longitudinal axis X1.

The second perimeter wall portion 49 includes a front end 49*a* and a rear end 49*b*. The second perimeter wall portion 49 is engaged with at least a part of the first side 45*c* of the horizontal portion 45 and extends generally vertically upward at an angle relative to the first side 45*c* away from the central longitudinal axis X1.

The third perimeter wall portion 51 includes a front end 51*a* and a rear end 51*b*. The third perimeter wall portion 51 is engaged with the second perimeter wall portion 49 and the fourth perimeter wall portion 53 such that a gap 51*c* (FIG. 23) is defined between the third perimeter wall portion 51 and the rear end 45*b* of the horizontal portion 45.

The fourth perimeter wall portion 53 includes a front end 53*a* and a rear end 53*b*. The fourth perimeter wall portion 53 is engaged with at least a part of the second side 45*d* of the horizontal portion 45 and extends generally vertically upward at an angle relative to the second side 45*d* away from the central longitudinal axis X1.

The fifth perimeter wall portion 55 includes a front end 55*a*, a rear end 55*b*, a first section 55*c*, and a second section 55*d*. The first section 55*c* is engaged with at least a part of the second side 43*d* of the angled portion 43 and extends generally vertically upward. The second section 55*d* extends generally vertically upward at an angle relative to the first section 55*c* away from the central longitudinal axis X1.

The rear end 47*b* of the first perimeter wall portion 47 meets the front end 49*a* of the second perimeter wall portion 49, the rear end 49*b* of the second perimeter wall portion 49 meets the front end 51*a* of the third perimeter wall portion 51, the rear end 51*b* of the third perimeter wall portion 51 meets the rear end 53*b* of the fourth perimeter wall portion 53, and the front end 53*a* of the fourth perimeter wall portion 53 meets the rear end 55*b* of the fifth perimeter wall portion 55.

With primary reference to FIG. 22, and as stated above, the front chute 15 includes a plurality of voids 39 defined in the plate receiving area 35. In one example, the plurality of voids 39 includes a first plurality of voids 57 and a second plurality of voids 59. The first plurality of voids 57 is defined in the angled portion 43 and the horizontal portion 45 proximate the rear end 43*b* of the angled portion 43 and the front end 45*a* of the horizontal portion 45. The second plurality of voids 59 is defined in the horizontal portion 45 proximate the rear end 45*b* of the horizontal portion 45. The first plurality of voids 57 is generally elliptical in shape, linearly aligned and equally spaced from one another. The second plurality of voids 59 is generally rectangular in shape, linearly aligned and equally spaced from one another.

With primary reference to FIG. 22, each rib member 41 of the plurality of rib members 41 includes a front end 41*a* and a rear end 41*b*. In one example, the plurality of rib members 41 is provided proximate the first plurality of voids 57 and the second plurality of voids 59. The portion of the plurality of rib members 41 positioned proximate the first plurality of voids 57 is engaged with the angled portion 43 and the horizontal portion 45. More particularly, the front end 41*a* of each rib member 41 of the plurality of rib members 41 is engaged with the angled portion 43 and the rear end 41*b* of each rib member 41 of the plurality of rib members 41 is engaged with the horizontal portion 45. Each rib member 41 of the plurality of rib members 41 in this location extends longitudinally at a downward angle from the front end 41*a* to the rear end 41*b*.

The portion of the plurality of rib members 41 positioned proximate the second plurality of voids 57 is engaged with the horizontal portion 45 and the third perimeter wall portion 51 proximate the rear end 45*b* of the horizontal portion 45. More particularly, the rear end 41*b* of each rib member 41 of the plurality of rib members 41 is engaged with the third perimeter wall portion 51 and the front end end 41*a* of each rib member 41 of the plurality of rib members 41 is engaged with the horizontal portion 45 proximate the rear end 45*b* of the horizontal portion 45. Each rib member 41 of the plurality of rib members 41 in this location extends longitudinally at a downward angle from the rear end 41*b* to the front end 41*a*.

With primary reference to FIG. 21 and FIG. 24-27, the pickup assembly 17 includes a pickup trolley frame 61, a first roller assembly 63, a second roller assembly 65, a pickup conveyor assembly 67, a plurality of hydraulic cylinders 69, and a plurality of hydraulic cylinder mounts 71.

The pickup trolley frame 61 includes a front end 61*a*, a rear end 61*b*, a first side 61*c*, a second side 61*d*, a base 81, a first trolley frame member 83, and a second trolley frame member 85. The base 81 includes a front end 81*a*, a rear end 81*b*, a first side 81*c*, a second side 81*d*, a top surface 81*e*, and a bottom surface 81*f*. The first trolley frame member 83 extends in a longitudinal direction and defines a first generally c-shaped channel 85. The first trolley frame member 83 includes a front end 83*a*, a rear end 83*b*, a top surface 83*c*, a bottom surface 83*d*, a first side surface 83*e* and a second side surface 83*f*. The second trolley frame member 87 extends in a longitudinal direction and defines a second generally c-shaped channel 89. The second trolley frame member 87 includes a front end 87*a*, a rear end 87*b*, a top surface 87*c*, a bottom surface 87*d*, a first side surface 87*e* and a second side surface 87*f*.

The first trolley frame member 83 is engaged with the base 81 proximate the first side 81*c* of the base 81. More particularly, the bottom surface 83*d* of the first trolley frame member 83 is engaged with the top surface 81*e* of the base 81 proximate the first side 81*c* of the base 81. The second trolley frame member 87 is engaged with the base 81 proximate the second side 81*d* of the base 81. More particularly, the bottom surface 87*d* of the second trolley frame member 87 is engaged with the top surface 81*e* of the base 81 proximate the second side 81*d* of the base 81.

The first roller assembly 63 includes a first pair of rollers 89, a first shaft 91, a first pair of yoke rollers 93, a first pair of yoke roller mounts 95, and a first pair of shaft protectors 97. The first pair of rollers 89 is engaged with the first shaft 91. One of the rollers 89 is positioned within the first c-shaped channel 85 and the other of the rollers 89 is positioned within the second c-shaped channel 89. The first shaft 91 is engaged with, and extends longitudinally through, the first trolley frame member 83 and the second trolley frame member 87. One of the yoke rollers 93 is positioned within the first c-shaped channel 85 via one of the yoke roller mounts 95 and the other of the yoke rollers 93 is positioned within the second c-shaped channel 89 via the other of the yoke roller mounts 95. More particularly, one of the yoke roller mounts 95 is engaged with the second side surface 83*f* of the first trolley frame member 83 and the other of the yoke roller mounts 95 is engaged with the second side surface 87*f* of the second trolley frame member 87. One of the shaft protectors 97 is positioned within the first c-shaped channel 85 proximate the first shaft 91 while the other of the shaft protectors 97 is positioned within the second c-shaped channel 89 proximate the first shaft 91.

The second roller assembly 65 includes a second pair of rollers 99, a second shaft 101, a second pair of yoke rollers 103, a second pair of yoke roller mounts 105, and a second pair of shaft protectors 107. The second pair of rollers 99 is engaged with the second shaft 101. One of the rollers 99 is positioned within the first c-shaped channel 85 and the other of the rollers 99 is positioned within the second c-shaped channel 89. The second shaft 101 is engaged with, and extends longitudinally through, the first trolley frame member 83 and the second trolley frame member 87. One of the yoke rollers 103 is positioned within the first c-shaped channel 85 via one of the yoke roller mounts 105 and the other of the yoke rollers 103 is positioned within the second c-shaped channel 89 via the other of the yoke roller mounts 105. More particularly, one of the yoke roller mounts 105 is engaged with the second side surface **83*f* of the first trolley frame member 83 and the other of the yoke roller mounts 105 is engaged with the second side surface 87*f* of the second trolley frame member 87. One of the shaft protectors 107 is positioned within the first c-shaped channel 85 proximate the second shaft 101 while the other of the shaft protectors 107 is positioned within the second c-shaped channel 89 proximate the second shaft 101**.

With primary reference to FIG. 21 and FIG. 24-26, the pickup conveyor assembly 67 includes a pickup conveyor assembly mount 109, a slew bearing 111, a conveyor assembly frame 113, a pair of pivot mounts 115, a pair of pivot pins 117, a magnet assembly 119, a hydraulic motor 121, a drive shaft 123, a drive pulley 125, an idler pulley 127, a roller belt 129 and a pair of roller belt adjusters 131.

The pickup conveyor assembly mount 109 includes a central mount member 133, a first side mount member 135, a second side mount member 137, a first mount portion 139, and a second mount portion 141. The central mount member 133 includes a front end **133*a*, a rear end 133*b*, a first side 133*c*, a second side 133*d*, a top surface 133*e*, and a bottom surface 133*f*. The pickup conveyor assembly mount 109 is operably engaged with the base 81 of the pickup trolley frame 61 via the slew bearing 111. More particularly, the slew bearing 111 includes an inner ring 111*a* and an outer ring 111*b*. The inner ring 111*a* is mechanically attached to the base 81 of the pickup trolley frame 61 via fasteners, such as nuts and bolts while the outer ring 111*b* is mechanically attached to the central mount member 133 via fasteners, such as nuts and bolts. The outer ring 111*b* allows the central mount member 133** to rotate as more fully described below.

The first side mount member 135 includes a first plate **135*a*, a spacer 135*b*, and a second plate 135*c*. A length of the spacer 135*b* is less than a length of the first plate 135*a* and the second plate 135*b*. The spacer 135*b* is sandwiched between the first plate 135*a* and the second plate 135*c* and, since the length of the spacer 135*b* is less than a length of the first plate 135*a* and the second plate 135*c*, a gap 143 is defined between the first plate 135*a*, the spacer 135*b*, and the second plate 135*c***.

The second side mount member 137 includes a first plate **137*a*, a spacer 137*b*, and a second plate 137*c*. A length of the spacer 137*b* is less than a length of the first plate 137*a* and the second plate 137*b*. The spacer 137*b* is sandwiched between the first plate 137*a* and the second plate 137*c* and, since the length of the spacer 137*b* is less than a length of the first plate 137*a* and the second plate 137*c*, a gap 145 is defined between the first plate 137*a*, the spacer 137*b*, and the second plate 137*c***.

The first mount portion 139 is positioned proximate the front end **133*a* and the first side 133*c* of the central mount member 133. The second mount portion 141 is positioned proximate the front end 133*a* and the second side 133*d* of the central mount member 133**.

The conveyor assembly frame 113 includes a front end **113*a*, a rear end 113*b*, a first side 113*c*, a second side 113*d*, a top 113*e*, and a bottom 113*f*. The first side 113*c* of the conveyor assembly frame 113 is engaged with the first mount portion 139 of the pickup conveyor assembly mount 109 via one of the pivot mounts 115 and one of the pivot pins 117. The second side 113*d* of the conveyor assembly frame 113 is engaged with the second mount portion 141 of the pickup conveyor assembly mount 109 via the other of the pivot mounts 115 and the other of the pivot pins 117. The conveyor assembly frame 113 is pivotable about a pivot axis defined by the pair of pivot pins 117** as more fully described below.

The magnet assembly 119 includes a magnetic roller 147, a roller shaft 149, a pair of pillow block bearing units 151, a first side mount 153, and a second side mount 155. The magnetic roller 147 includes a plurality of magnets 157 positioned within an interior region **147*a* of the magnetic roller 147. The roller shaft 149 extends through, and is operably engaged with, the magnetic roller 147. One end of the roller shaft 149 is engaged with the first side mount 153 via one of the pillow block bearing units 151 while the other end of the roller shaft 149 is engaged with the second side mount 155 via the other of the pillow block bearing units 151**.

With primary reference to FIG. 24-FIG. 25, One of the plurality of hydraulic cylinders 69 is fixedly engaged on one end with the pickup conveyor assembly mount 109 via the first mount portion 139 and on the other end with the magnet assembly 119 via the first side mount 153. Another one of the plurality of hydraulic cylinders 69 is fixedly engaged on one end with the pickup conveyor assembly mount 109 via the second mount portion 141 and on the other end with the magnet assembly 119 via the second side mount 155. The hydraulic cylinders 69 operably engaged with the pickup conveyor assembly mount 109 and the magnet assembly 119 are configured to allow the pickup conveyor assembly mount 109 to pivot about the pivot axis defined by the pivot pins 117 in a direction indicated by arrow AA.

With continued reference to FIG. 24, one of the plurality of hydraulic cylinders 69 is operably engaged on one end with the top surface **81*e* of the base 81 via one of the plurality of hydraulic cylinder mounts 71 and is fixedly engaged on the other end with the third inner support frame member 27*d* via one of the plurality of hydraulic cylinder mounts 71. The hydraulic cylinder 69 in this configuration is configured to move in a direction indicated by arrow BB, which, in turn, causes the pickup trolley frame 61** to move in a direction indicated by arrow CC as more fully described below.

With continued reference to FIG. 24, one of the plurality of hydraulic cylinders 69 is fixedly engaged on one end with the base 81 of the pickup trolley frame 61 via one of the plurality of hydraulic cylinder mounts 71 and operably engaged on the other end with the with the central mount 133 of the pickup conveyor assembly mount 109 via one of the plurality of hydraulic cylinder mounts 71. The hydraulic cylinder 69 in this configuration is configured to move in a direction indicated by arrow DD, which, in turn, causes the pickup assembly 17 to rotate in a direction indicated by arrows EE as more fully described below.

In summary, the pickup assembly 17 is configured to move in different directions and/or movements. For example, the pickup assembly 17 (and its associated components), may move in a substantially horizontal rotational movement (e.g. left/right), a substantially vertical rotational movement (e.g. up/down), and substantially horizontal linear movement (e.g. front/back). The movements of the pickup assembly 17 may be controlled by an operator as further described below.

With primary reference to FIG. 21 and FIG. 25-26, the hydraulic motor 121 is operably engaged with the drive shaft 123, which, in turn, is operably engaged with the drive pulley 125 via a fastener, such as a flange unit. The hydraulic motor 121 is configured to rotate the drive shaft 123 which, in turn, causes the drive pulley 125 to rotate. The idler pulley 127 engaged with the conveyor assembly frame 113 via mounts or brackets. The idler pulley 127 is configured to regulate movement of the roller belt 129 as needed. As shown in at least FIG. 25, the roller belt 129 wraps around the drive pulley 125, the idler pulley 127 and the magnetic roller 147. One roller belt adjuster 131 is operably engaged with the conveyor assembly frame 113 and the first side mount 153 and the other roller belt adjuster is operably engaged with the conveyor assembly frame 113 and the second side mount 155. The roller belt adjusters 131 are configured to adjust the roller belt 129 as needed.

With primary reference to FIG. 21-FIG. 22 and FIG. 24-FIG. 26, the rear chute 19 includes a front end 19*a*, a rear end 19*b*, a first side 19*c*, a second side 19*d*, a top 19*e*, a bottom 19*f*, a rear chute frame assembly 159, a swivel mount 161, a rear chute transfer surface 163, a perimeter chute wall 165, a ball hitch 167, and a rear chute roller assembly 169.

The rear chute frame assembly 159 includes a plurality of interconnected rear chute frame members 171. In one example, one or more of the plurality of rear chute frame members 171 is engaged with the with the top surface 81*e* of the base 81, the first generally c-shaped channel 85, and/or the second generally c-shaped channel 89. In another example, one of the plurality of rear chute frame members 171 extends transversely below the idler pulley 127 and the swivel mount 161 is mounted on that rear chute frame member 171 with the swivel mount 161 facing the rear end 10*b* of the machine frame 10A.

The rear chute transfer surface 163 is positioned below the rear end of the pickup assembly 17 and, as such, the rear chute 19 is positioned to be in operable communication with the pickup assembly 17. The rear chute transfer surface 163 and the perimeter chute wall 165 are configured to receive and transfer articles, such as, for example, railroad tie plates 24 from the pickup assembly 17 to the second conveyor assembly 176.

The ball hitch 167 is provided proximate the front end 19*a* and bottom 19*f* of the rear chute 19. The ball hitch 167 is operably engaged with the swivel mount 161 which allows the rear chute 19 to move in a substantially horizontal linear movement (e.g., left/right) and in a substantially vertical rotational movement (e.g., up/down).

The rear chute roller assembly 169 includes a pair of guide rollers 169*a* with one guide roller operably engaged with the first guide wall 198 and the other guide roller 169*a* operably engaged with the second guide wall 200. The rear chute roller assembly 169 is configured to allow movement of the rear chute 19. For example, if the pickup assembly 17 moves causing the rear chute 19 to move (e.g., up/down), the rear chute 19 travels along the first guide wall 198 and second guide wall 200 via the rear chute roller assembly 169.

With primary reference to FIG. 22, the control station 21 includes an operator chair 173, controls 175, and monitors/displays 177. The operator chair 173 is operably engaged with the second base frame 14. The controls 175 are configured to allow an operator to move the pickup assembly 17 in various directions as further described below. The monitors/displays 177 allow an operator to view various data, alerts, videos, or the like.

Figure 28:
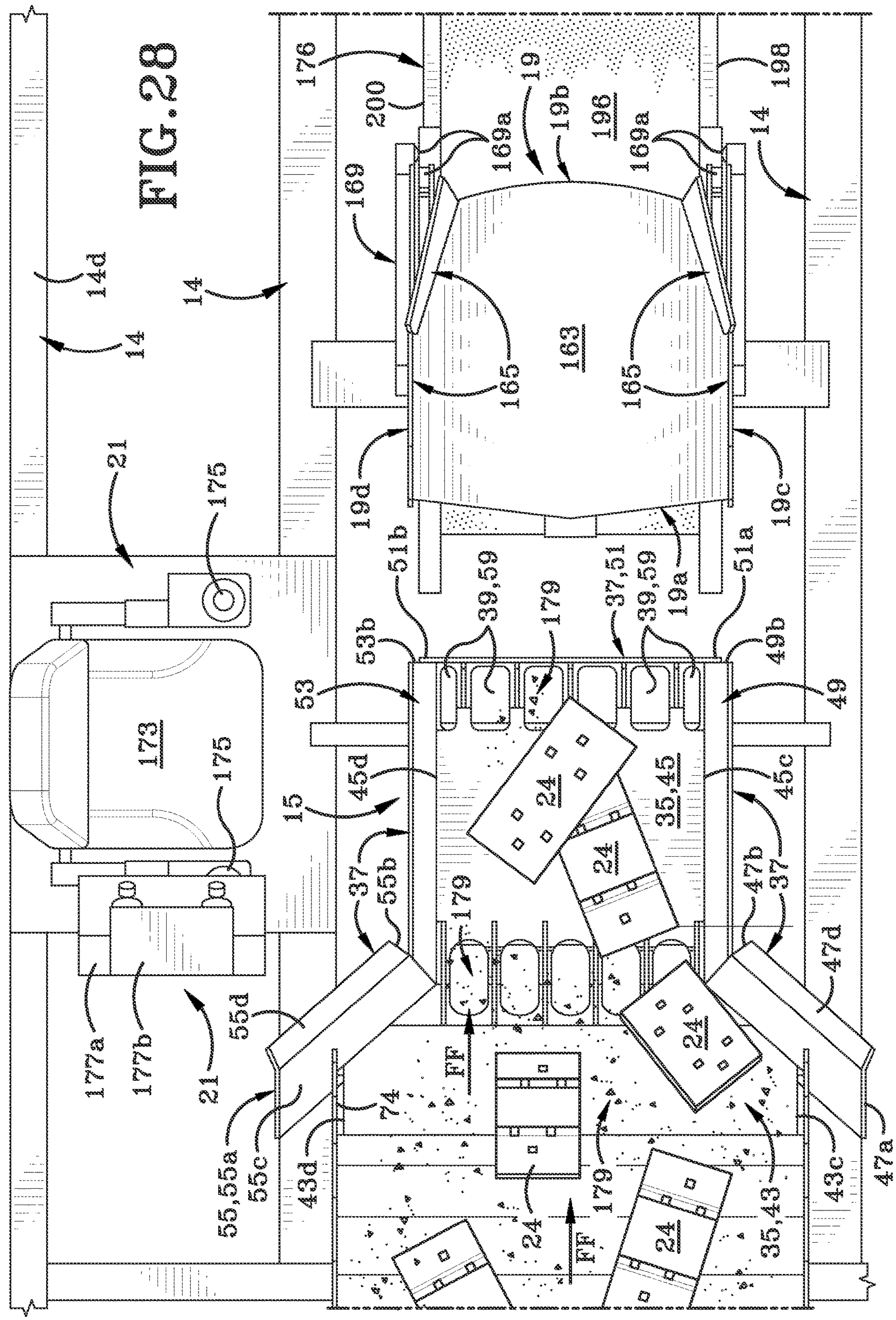
FIG. 28 is an exemplary operational view of a portion of the singulating system in accordance with one aspect of the present disclosure.

In this embodiment, the operation of the machine 10 is substantially similar to the operations described above, however, instead of having the conveying mechanism 72 drop tie plates 24 on the vibration plate feeder assembly 50, the conveying mechanism drops tie plates 24 on the front chute. More particularly, and as shown in FIG. 28, the conveying mechanism 72 moves the tie plates in a direction indicated by arrows FF. The conveying mechanism 72 drops the tie plates 24 onto the front chute 15 via gravity.

Figure 29:
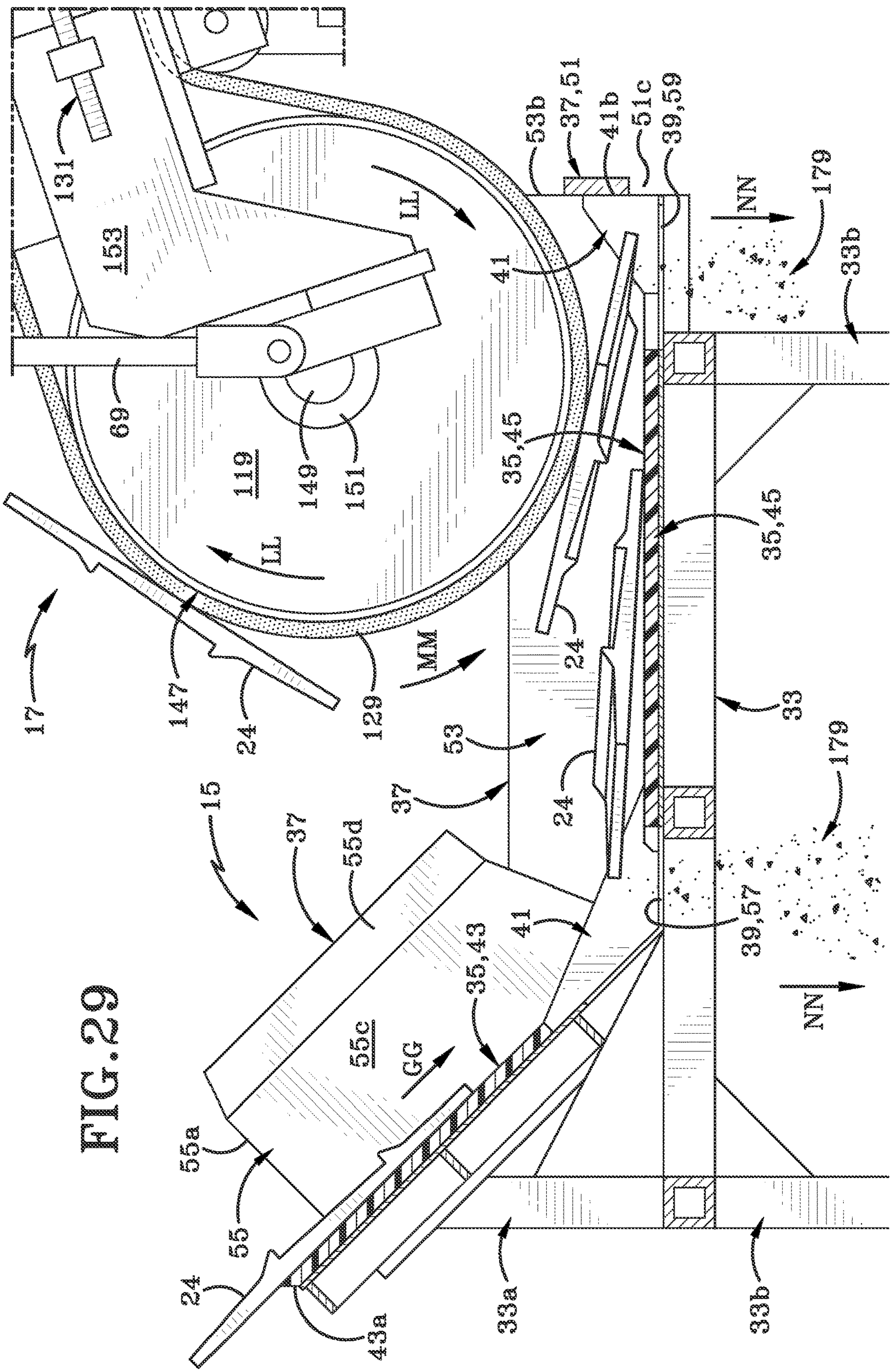
FIG. 29 is an exemplary operational view of a portion of the singulating system in accordance with one aspect of the present disclosure.

More particularly, and with primary reference to FIG. 29, the tie plates 24 are dropped from the conveying mechanism 72 onto the angled portion 43 of the plate receiving area 35 of the front chute 15. As the angled portion is at an incline, the tie plates move vertically downward along the angled portion 43 in a direction indicated by arrow GG. The tie plates 24 pass over the rib members 41, which are positioned proximate to the first plurality of voids 57, allowing the tie plates 24 to travel to the horizontal portion 45 while at least a portion of the debris/waste material 179 falls through the first plurality of voids 57 in a direction indicated by arrow HH.

As further shown in FIG. 29, the roller belt 129, which is driven by the hydraulic motor 121, causes the magnetic roller 147 to rotate in a direction indicated by arrows LL. As stated above, the pickup assembly 17, and, in turn, the roller belt 129 and magnetic roller 147, are configured to move in various directions. In one example, this may be accomplished by an operator manipulating controls 175 from the operating chair 173. As shown in FIG. 29, the pickup assembly 17, and, in turn, the roller belt 129 and magnetic roller 147, can move in a direction indicated by arrow MM to pick up a tie plate 24 via magnetic attraction. More particularly, as the roller belt 129 is driven, at least a portion of the roller belt 129 is in contact with the magnetic roller 147, which allows the roller belt 129 to pick up and transfer the tie plates 24. As further shown in FIG. 29, the roller belt 129 and magnetic roller 147 are configured to pick up the tie plates one at a time, which is beneficial in the singulating process. As the tie plates 24 are picked up by the belt roller 129 and the magnetic roller 147, debris/waste material 179 may fall through the second plurality of voids 59 in a direction indicated by arrow NN.

Figure 30:
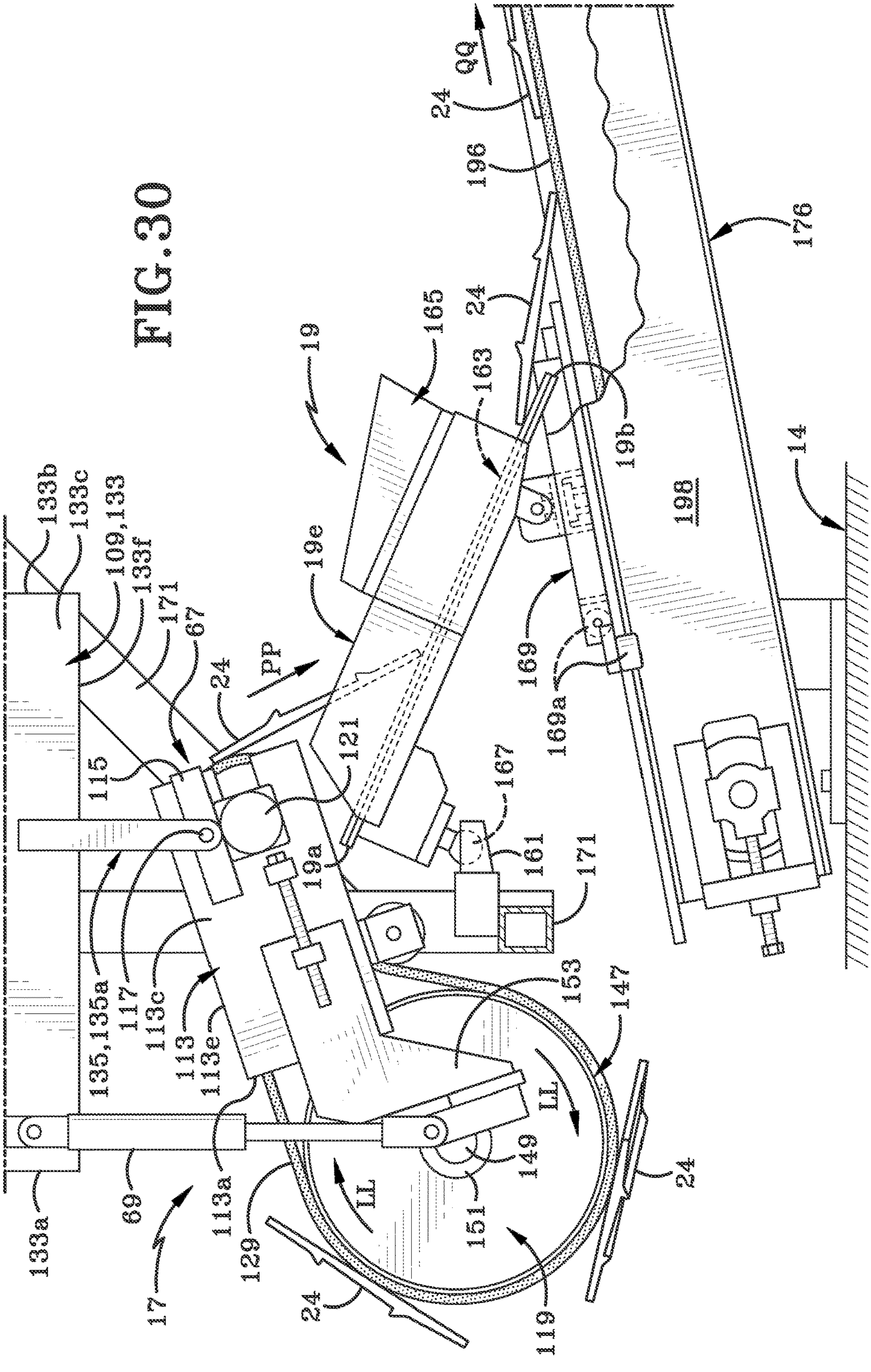
FIG. 30 is an exemplary operational view of a portion of the singulating system in accordance with one aspect of the present disclosure.

As shown in FIG. 30, the belt roller 129 conveys the tie plates 24 towards the rear chute 19, which is positioned under the belt roller 129. The belt roller 129 drops the tie plates 24 (in a direction indicated by arrow PP) into the rear chute 19 via gravity. The rear chute 19 transfers the tie plates 24 to the conveying mechanism 196 and the conveying mechanism 196 conveys tie plates 24 in a general direction indicated by arrow QQ.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments are practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A singulating system, comprising:

a front chute configured to collect one or more articles;

a singulating frame;

a pickup assembly operably engaged with the singulating frame;

a magnetic roller of the pickup assembly; and a roller belt of the pickup assembly wrapped, at least in part, around the magnetic roller; wherein the magnetic roller and the roller belt are configured to pick up the one or more articles from the front chute and transfer the one or more articles to a different location;

a first movement of the pickup assembly;

a second movement of the pickup assembly that is different than the first movement;

and a third movement of the pickup assembly that is different than the first movement and the second movement.

2. The singulating system of claim 1, wherein the magnetic roller and the roller belt are configured to pick up the one or more articles one at a time.

3. The singulating system of claim 2, further comprising:

one or more rib members provided proximate the one or more voids.

4. The singulating system of claim 1, further comprising:

a rear chute configured to transfer the one or more articles to the different location.

5. The singulating system of claim 1, further comprising:

a plate receiving area of the front chute; and one or more voids defined by the plate receiving area.

6. The singulating system of claim 1, further comprising:

an angled portion of the front chute; and a substantially horizontal portion of the front chute.

7. The singulating system of claim 1, wherein the first movement of the pickup assembly comprises a substantially horizontal rotational movement of the pickup assembly.

8. The singulating system of claim 1, wherein the second movement of the pickup assembly comprises a substantially vertical rotational movement of the pickup assembly.

9. The singulating system of claim 1, 1 wherein the third movement of the pickup assembly comprises a substantially horizontal linear movement of the pickup assembly.

10. The singulating system of claim 1, wherein the one or more articles is one or more railroad tie plates.

11. The singulating system of claim 1, further comprising a control configured to control one or more movements of the pickup assembly.

12. A machine comprising:

a machine frame;

a first end of the machine frame;

a second end of the machine frame;

a bottom of the machine frame;

a plurality of wheels provided on the bottom of the machine frame;

a conveyor assembly mounted on the machine frame and oriented to convey articles in a direction from the first end toward the second end;

at least one hopper assembly mounted on the machine frame upstream of the conveyor assembly; the hopper assembly being adapted to store and transfer at least one railroad tie plate to the conveyor assembly; and a singulating system mounted on the machine frame and positioned between the at least one hopper assembly and the second end; the singulating system being adapted to singulate the at least one railroad tie plate;

wherein the singulating system includes:

a front chute configured to collect the at least one railroad tie plate;

a singulating frame; and a pickup assembly operably encased with the singulating frame;

wherein the pickup assembly is operable to perform a first movement, a second movement that is different from the first movement; and a third movement that is different from the first movement and the second movement.

13. The machine of claim 12, further comprising:

a magnetic roller of the pickup assembly; and a roller belt of the pickup assembly wrapped, at least in part, around the magnetic roller; wherein the magnetic roller and the roller belt are configured to pick up the at least one railroad tie plate from the front chute and transfer the at least one railroad tie plate to a different location.

14. The machine of claim 13, wherein the magnetic roller and the roller belt are configured to pick up the at least one railroad tie plate one at a time.

15. The machine of claim 12, further comprising at least one crawler provided on the machine frame.

16. The machine of claim 12, further comprising a rear chute configured to transfer the at least one railroad tie plate to a different location.

17. The machine of claim 12, further comprising:

a plate receiving area of the front chute; and one or more voids defined by the plate receiving area.

18. The machine system of claim 17, further comprising one or more rib members provided proximate the one or more voids.

19. The machine of claim 12, further comprising:

an angled portion of the front chute; and a substantially horizontal portion of the front chute.

20. The machine of claim 12, further comprising a control configured to control one or more movements of the pickup assembly.

* * * * *